United States Patent [19]

Ito et al.

[11] Patent Number: 4,970,543
[45] Date of Patent: Nov. 13, 1990

[54] CIRCULATING TYPE OF AUTOMATIC DOCUMENT FEEDING APPARATUS AND DUPLEX COPYING APPARATUS PROVIDED WITH SAID APPARATUS

[75] Inventors: Fukusaburo Ito; Tadaaki Kawano; Kazuo Maeyama, all of Nara; Katsuyoshi Fujiwara, Sennan; Osamu Tashiro, Osaka; Kazushi Yamamoto, Higashiosaka; Yuji Okamoto; Atsushi Ide, both of Nara, all of Japan

[73] Assignee: Sharp Kabushiki Kaisha, Osaka, Japan

[21] Appl. No.: 212,697

[22] Filed: Jun. 28, 1988

[30] Foreign Application Priority Data

Feb. 15, 1988 [JP] Japan .................. 63-32511

[51] Int. Cl.$^5$ .................. G03B 27/32; G03B 27/52
[52] U.S. Cl. ...................................... 355/24; 355/320
[58] Field of Search ................ 355/308, 313, 318–320, 355/24, 26; 271/279, 280, 9

[56] References Cited

U.S. PATENT DOCUMENTS

| 4,099,150 | 7/1978 | Connin | 355/26 X |
| 4,140,387 | 2/1979 | Gustafson | 355/23 X |
| 4,158,500 | 6/1979 | DiFrancesco et al. | 355/26 X |
| 4,247,192 | 1/1981 | Komori et al. | 355/25 X |
| 4,537,497 | 8/1985 | Masuda | 355/320 X |
| 4,745,441 | 5/1988 | Maruta et al. | 355/24 X |

Primary Examiner—Richard A. Wintercorn
Attorney, Agent, or Firm—Birch, Stewart, Kolasch & Birch

[57] ABSTRACT

A circulating type of automatic document feeding apparatus comprising a document hopper which is adapted to take out the top document from the hopper or take it out from the bottom to return in onto the topmost side, a first carrying means for carrying the document form the document hopper to a first exposure portion, a document presentation portion having the first exposure portion and the second exposure portion, a second carrying means which is equipped with an inside and outside inverting means for inverting the carrying direction of the document between the first exposure portion and the second exposure portion, and a third carrying means for returning the document to the document hopper from the second exposure portion. One face of the duplex document may be exposed in the first exposure portion to continuously expose the other face thereof in the second exposure portion, so that the copying operation of the duplex document may be effected at higher speeds and furthermore with considerably reduced operations on the part of the operator.

22 Claims, 92 Drawing Sheets

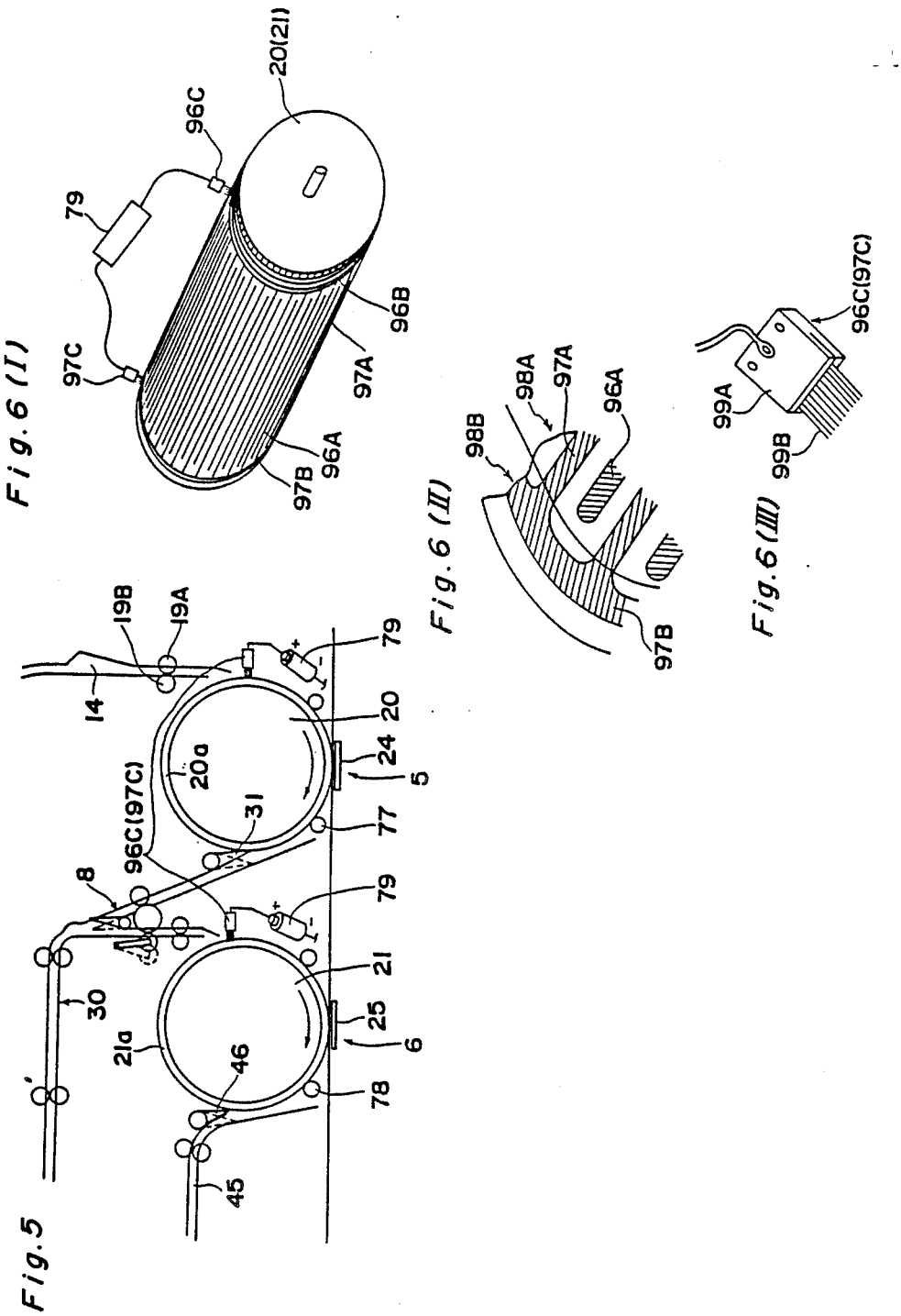

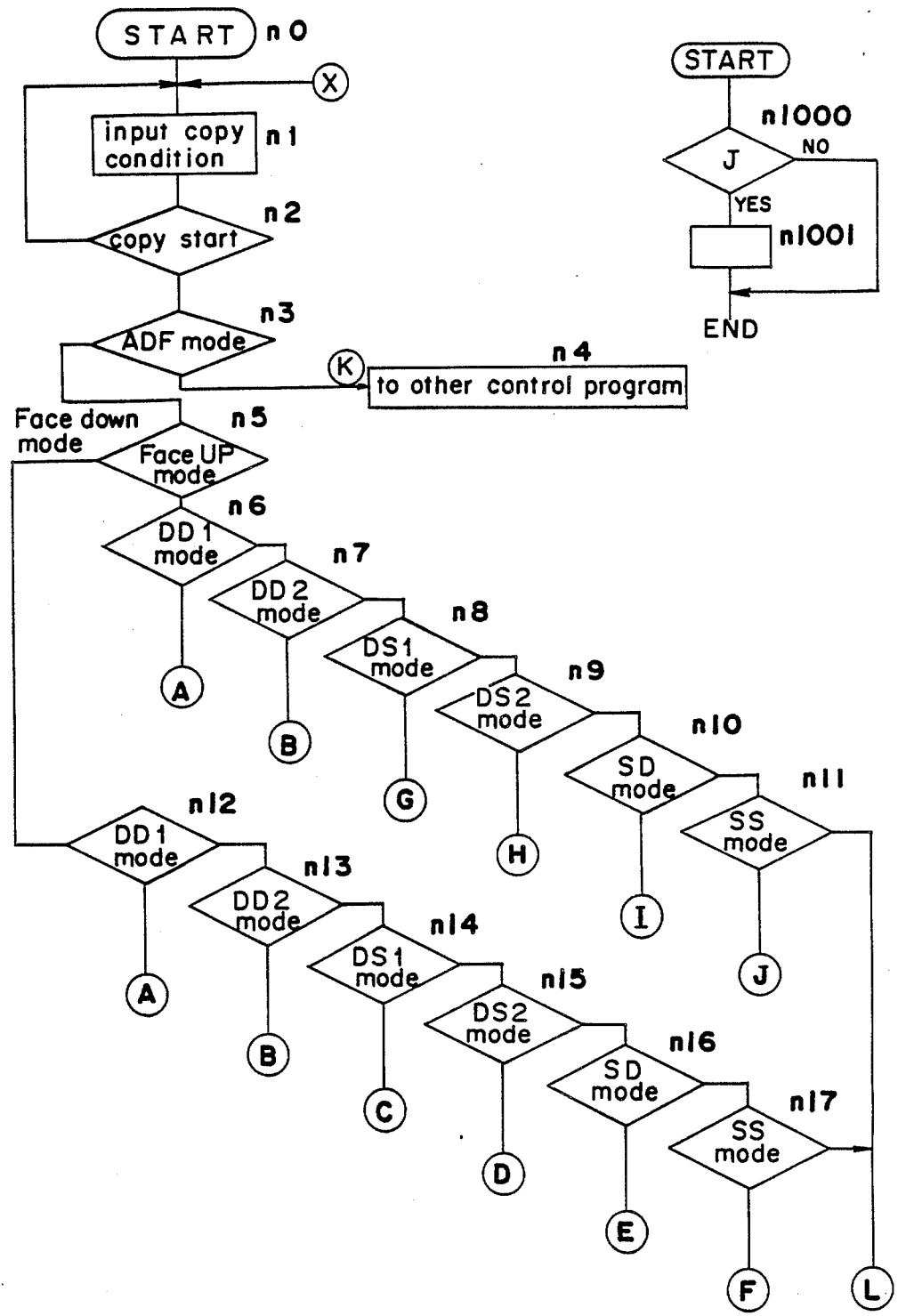
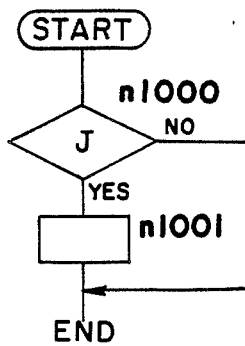
Fig. 11(II)
Fig. 11(I)

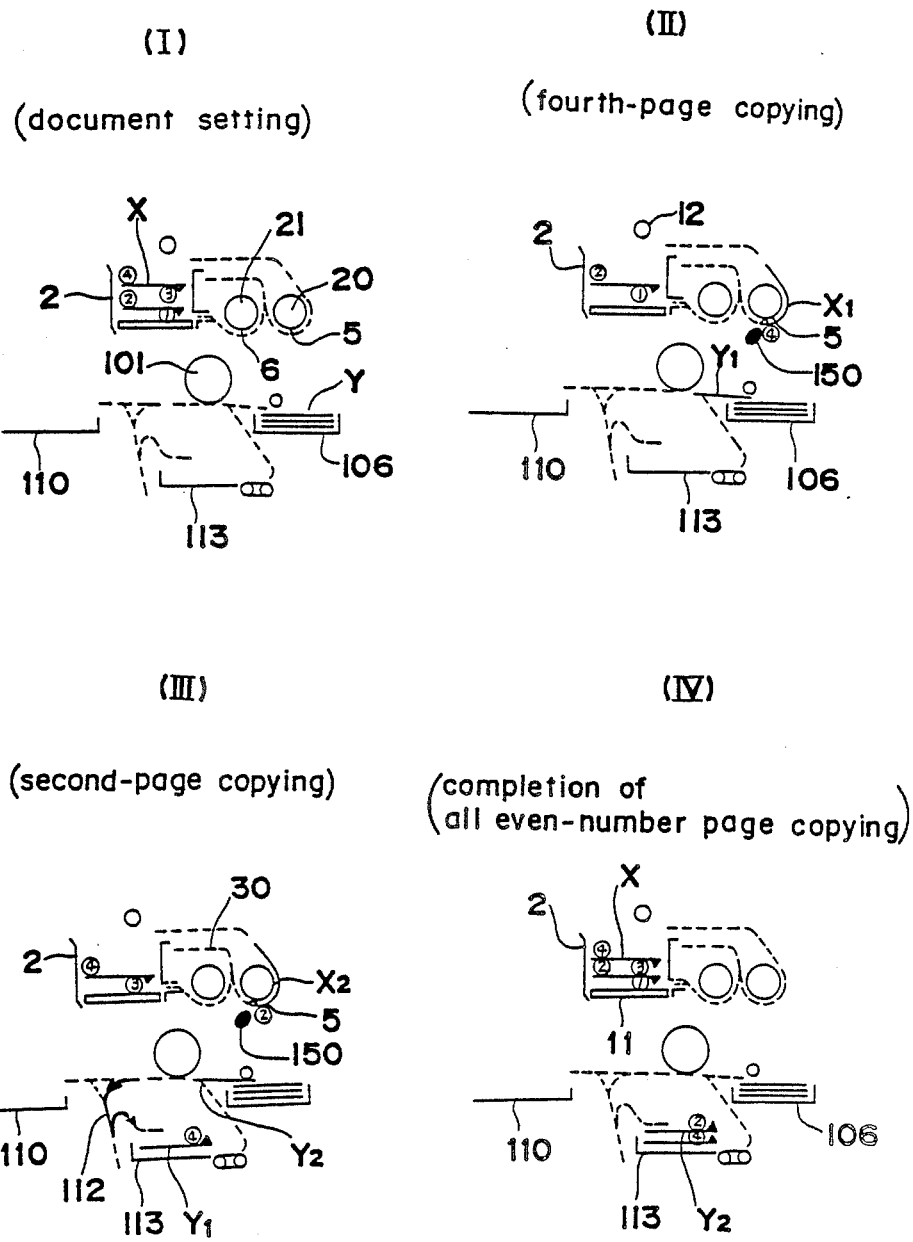
Fig. 12 [face-down DD1]

Fig. 12 (face-down DD1)
(V)
(third-page copying)
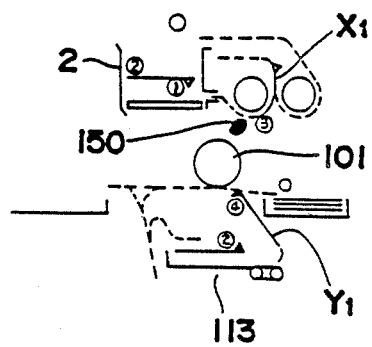
(VI)
(first-page copying)
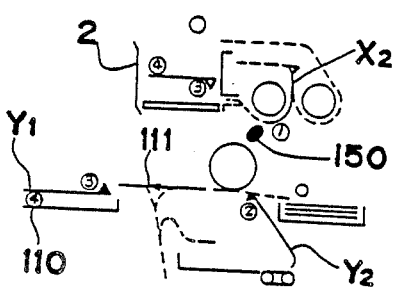
(VII)
(all the odd-number page copy completion (one-sheet copy completion))
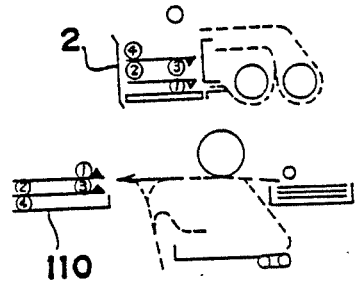
(VIII)
(completion of two-sheet copying)
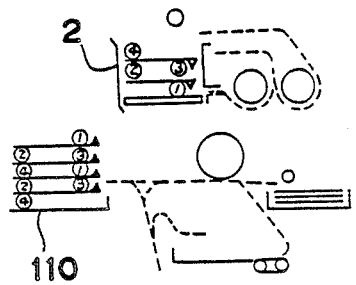

Fig. 15 (face-down DD2)
(I) (document setting)
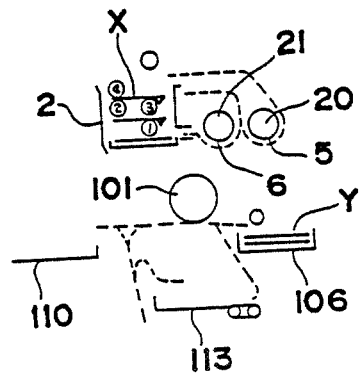
(II) (fourth-page copying)
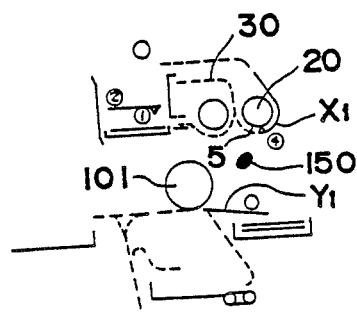
(III) (first-sheet inversion / optical-system movement)
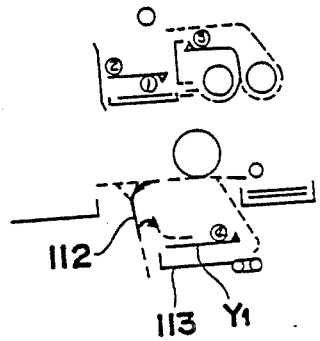
(IV) (third-page copying)
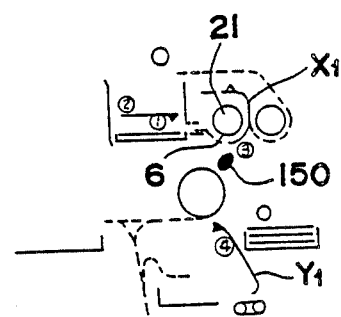

Fig. 15 [face·down DD2]
(V)
$\begin{pmatrix} \text{first-sheet return} \\ \text{optical-system movement} \end{pmatrix}$
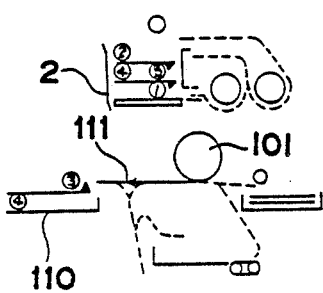
(VI)
(second-page copying)
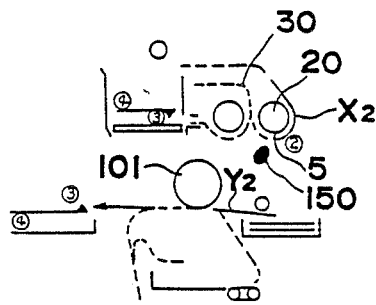
(VII)
$\begin{pmatrix} \text{second-sheet inversion} \\ \text{optical-system movement} \end{pmatrix}$
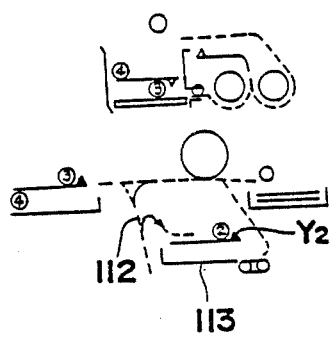
(VIII)
(first-page copying)
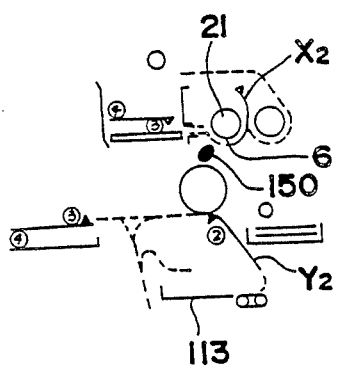

Fig. 15 (face-down DD2)
(IX)
(completion of one-sheet copying
second-sheet return optical-system
movement)
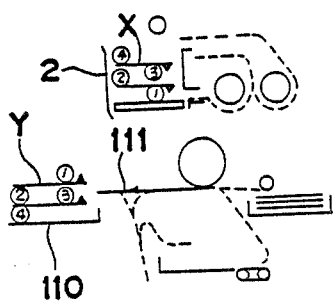
(X)
(completion of two-sheet copying)
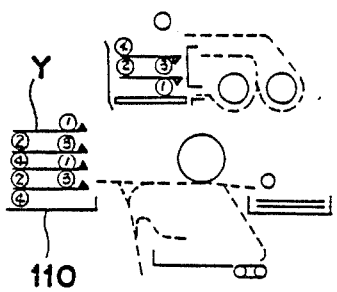

{face-down / face-up DD2}

Fig. 17  [face-down DS1]
(I)
(document setting)
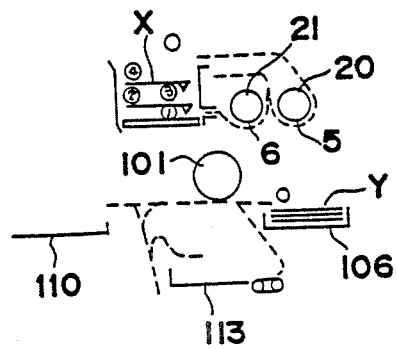
(II)
(fourth-page copying)
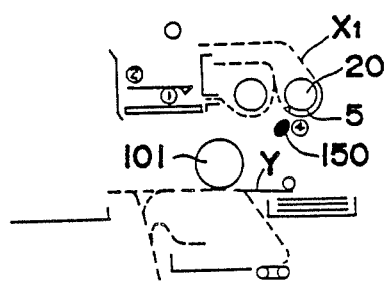
(III)
(second-page copying)
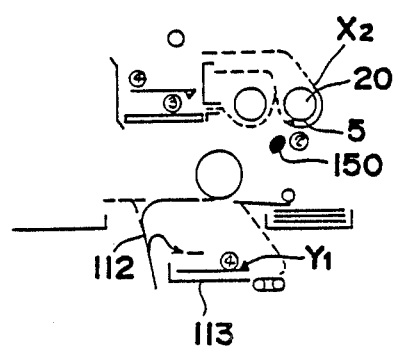
(IV)
(completion of all even-number page copying)
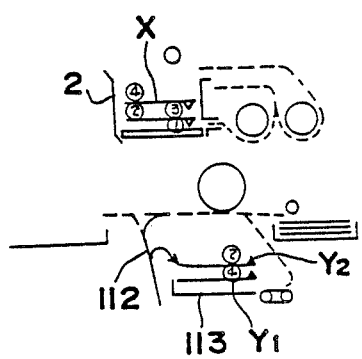

Fig. 17  (face·down DS1)
(V)  
(fourth-page idle discharging)
(VI)  
(third-page copying)
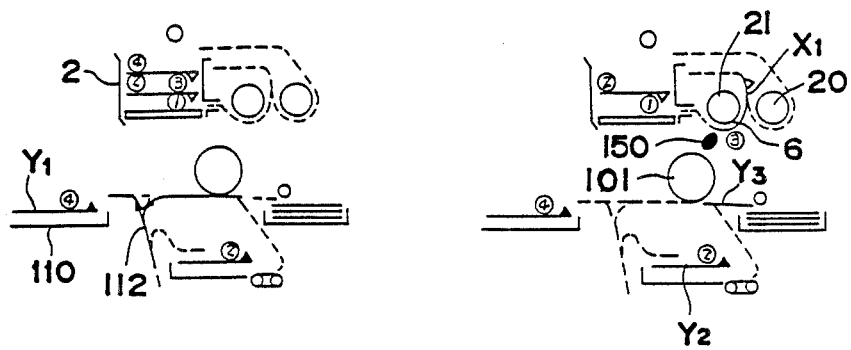
(VII)  
(second-page idle discharging)
(VIII)  
(first-page copying)
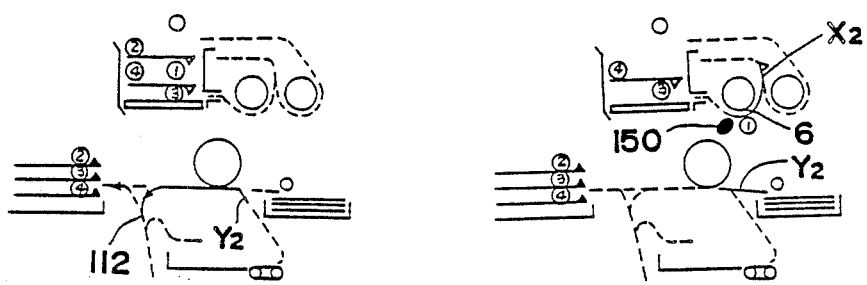

Fig. 17 [face-down DS1]
(IX)
$$\begin{pmatrix} \text{all the odd-number} \\ \text{page copy completion} \\ \text{(one-sheet copy completion)} \end{pmatrix}$$
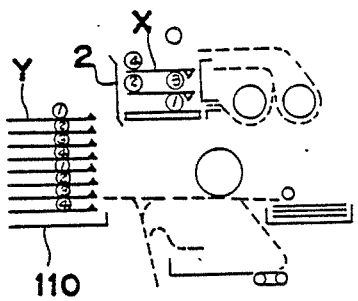
(X)
(completion of two-sheet copying)
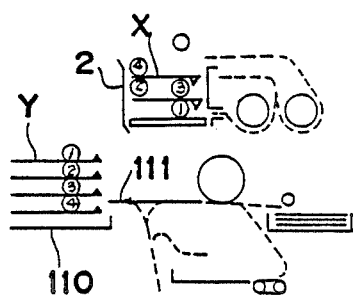

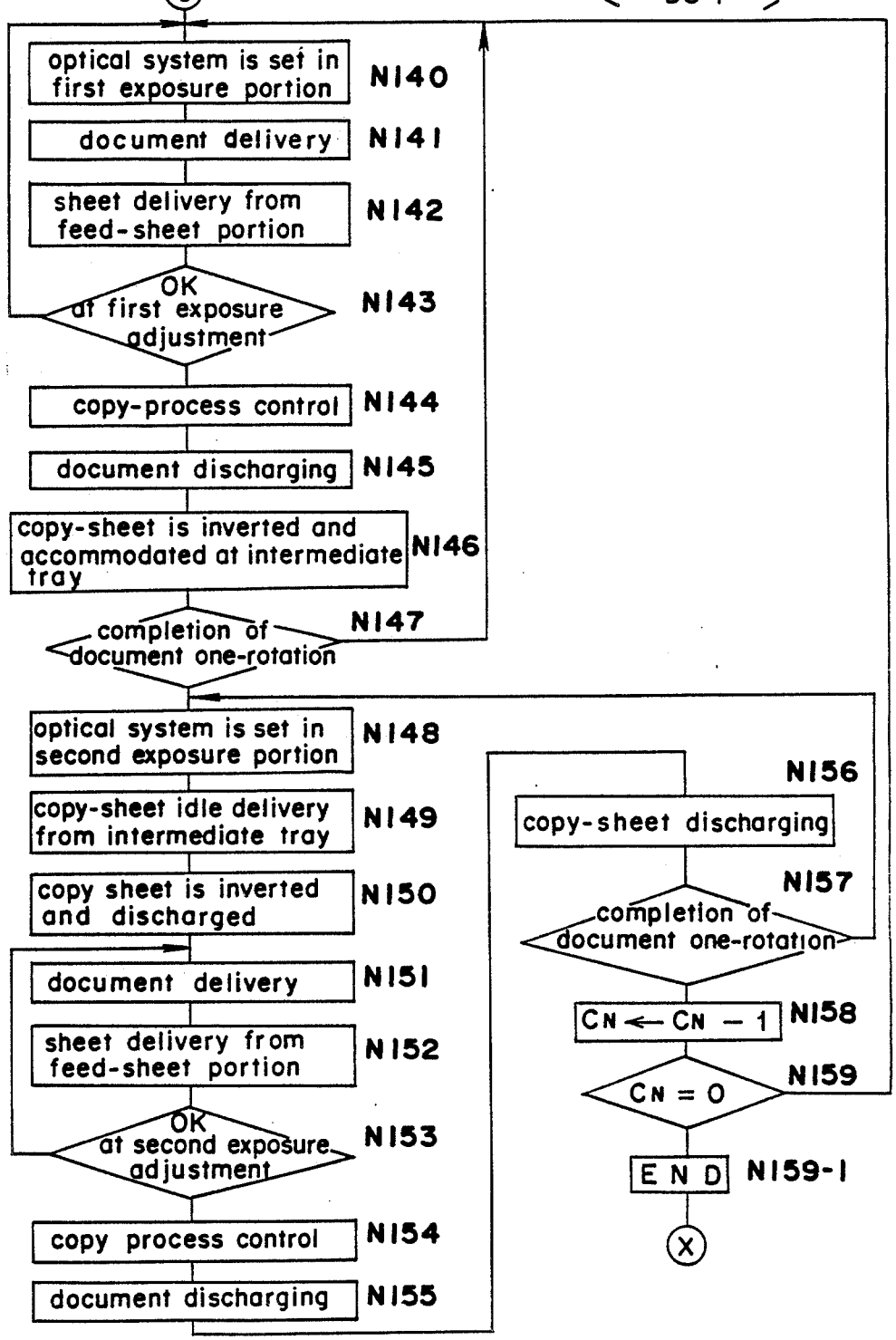

Fig. 19 [face-down DS2]
(I)
(document setting)
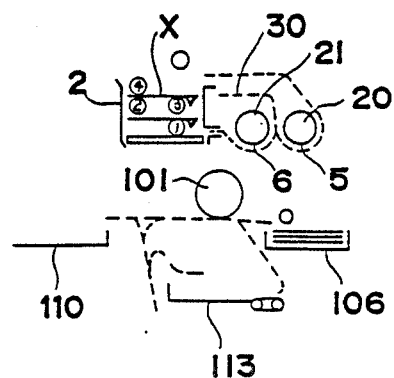
(II)
(fourth-page copying)
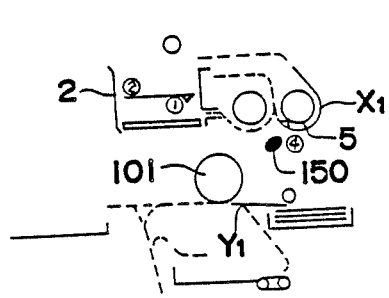
(III)
(third-page copying)
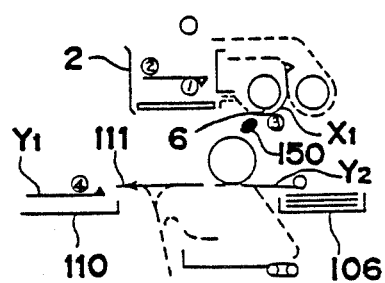
(IV)
(second-page copying)
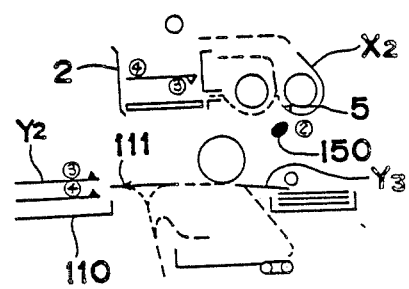

Fig. 19 (face-down DS2)
(V) (first-page copying)
(VI) (completion of all page copying / completion of one-sheet copying)
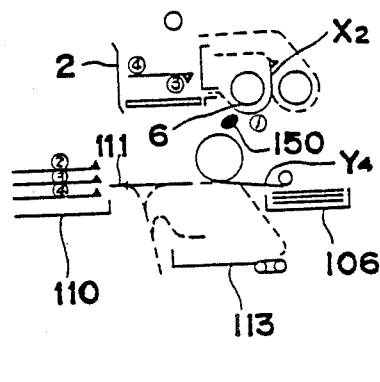
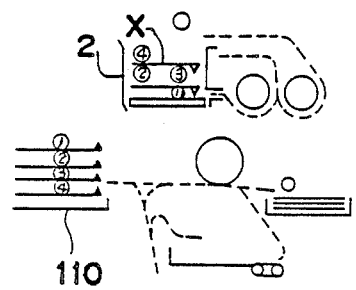
(VII) (completion of two-sheet copying)
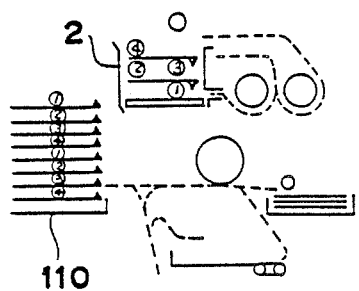

(face. down DS2)

Fig. 21 [face.down SD]
(I) (document setting)
(II) (fourth-page copying when the documents are odd-number in page, there is no step of carrying the documents)
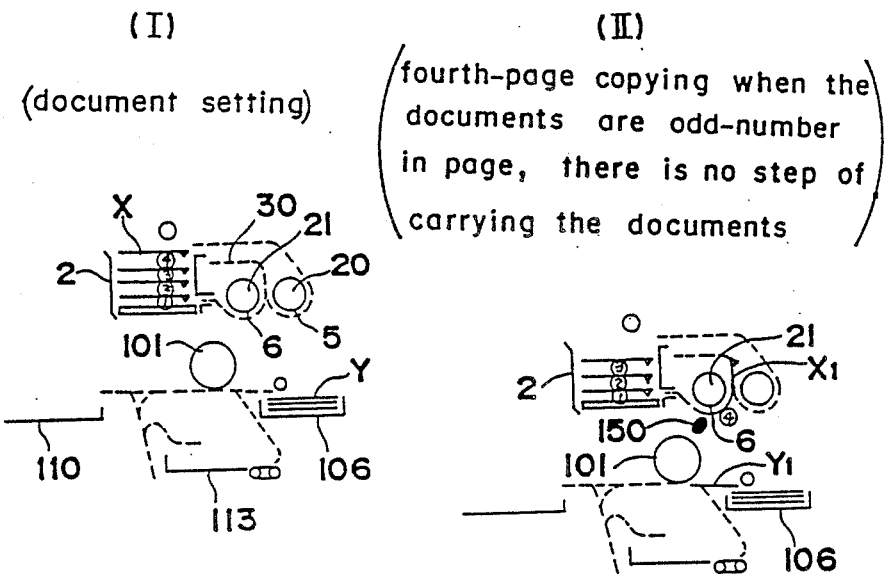
(III) (third-page idle delivery) (not copied)
(IV) (second-page copying)
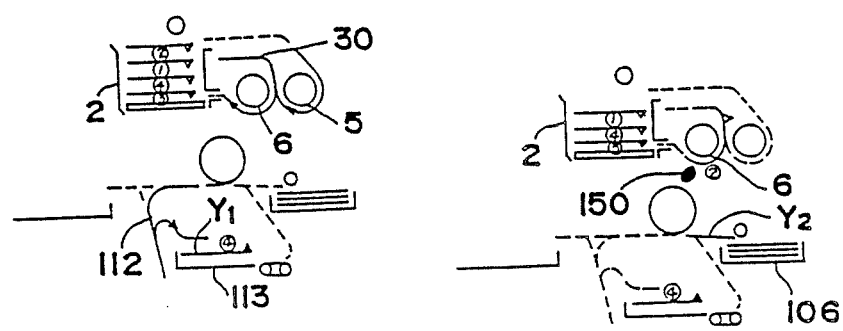

Fig. 21 (face-down SD)
(V)
(first-page idle delivery)
(not copied)
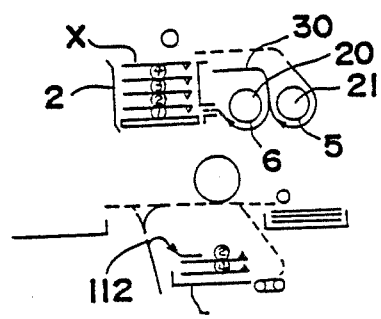
(VI)
(completion of even-number page copying)
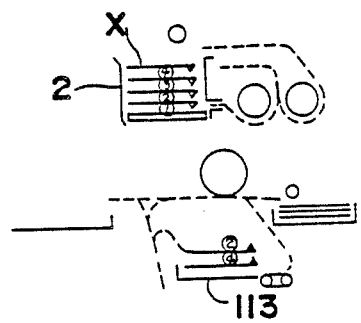
(VII)
(fourth-page idle delivery)
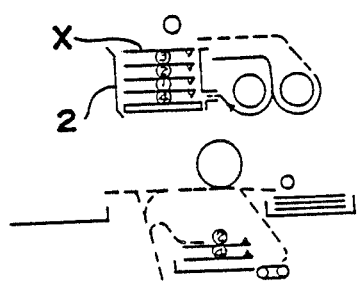
(VIII)
(third-page copying)
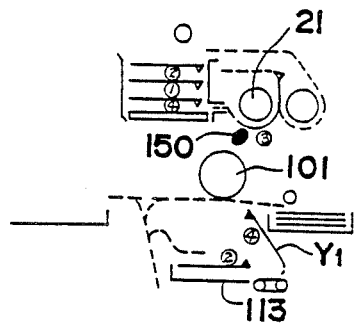

Fig. 21    (face-up DD1)
(IX)
(second-page idle delivery)
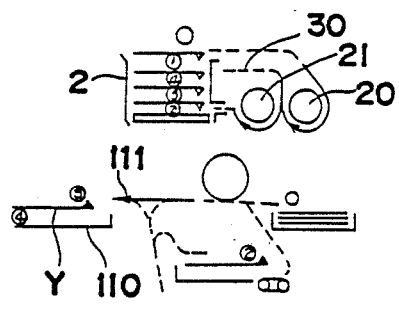
(X)
(first-page copying)
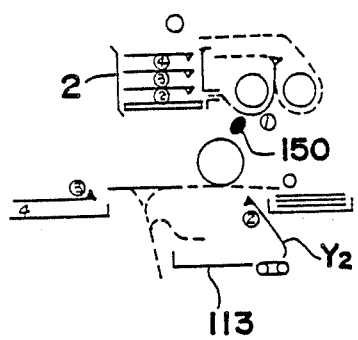
(XI)
( completion of odd-number page copying
(completion of one-sheet copying) )
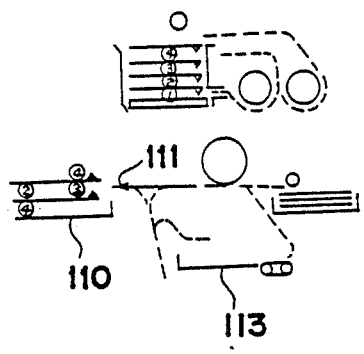
(XII)
( completion of
two-sheet copying )
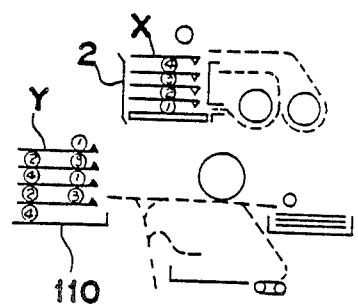

Fig. 23  (face-down SS)
(I)
(document setting)
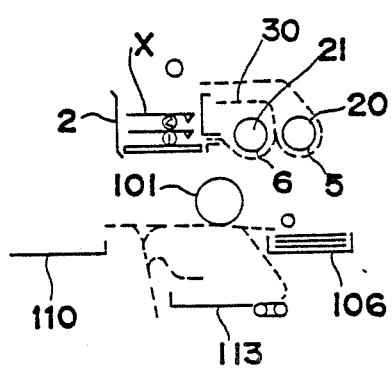
(II)
(second-page copying
(copying from last page))
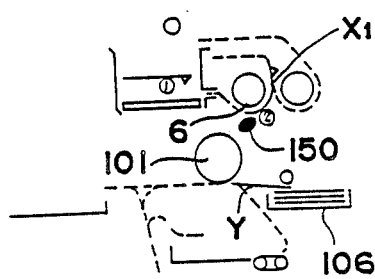
(III)
(first-page copying)
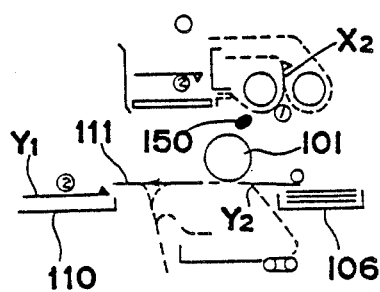
(IV)
(completion of one-sheet copying)
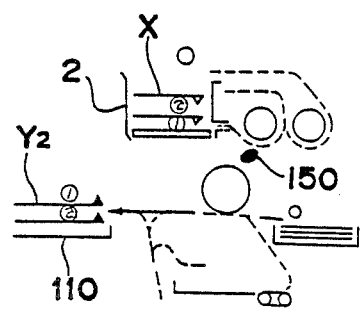

Fig. 23  (face-down SS)
(V)
(completion of two-sheet copying)
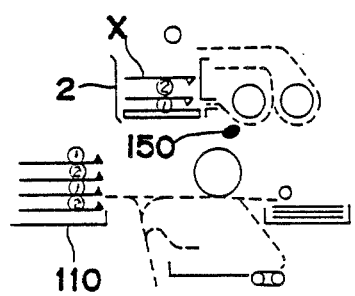

Fig. 24 (face-down SS)
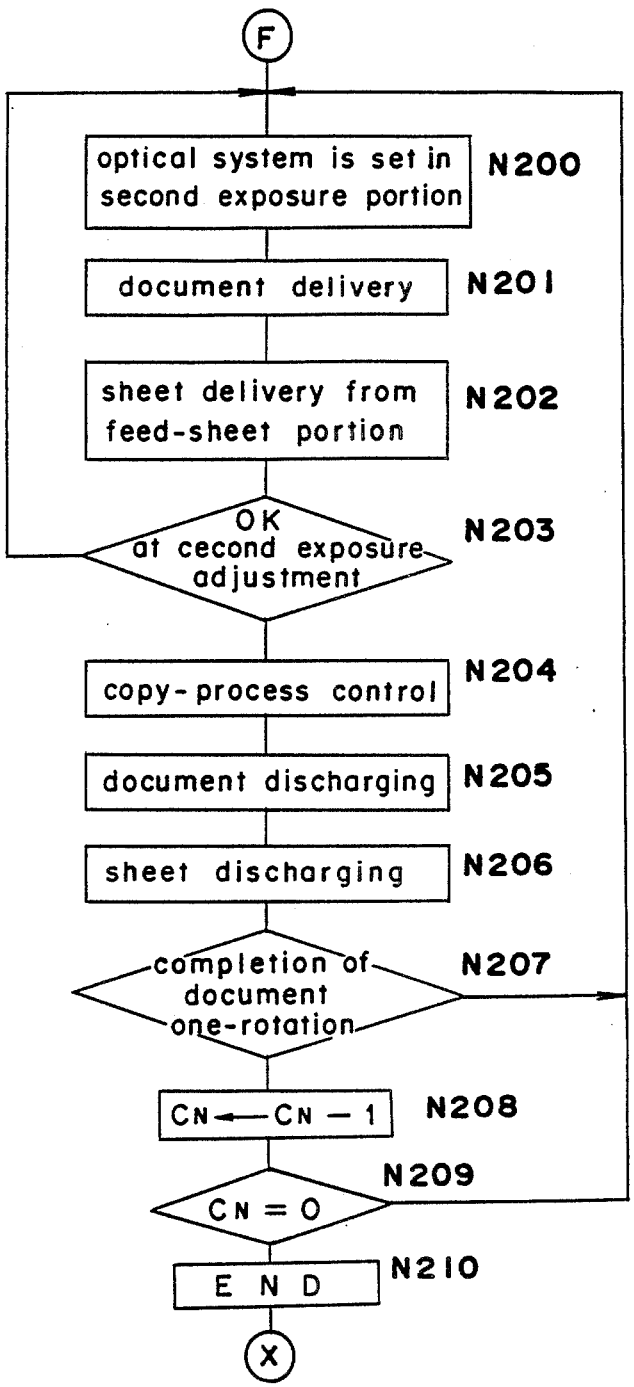

Fig. 25 (face·up DD1)
(I) (document setting)
(II) (first-page copying)
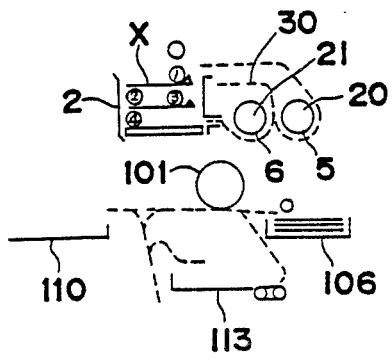
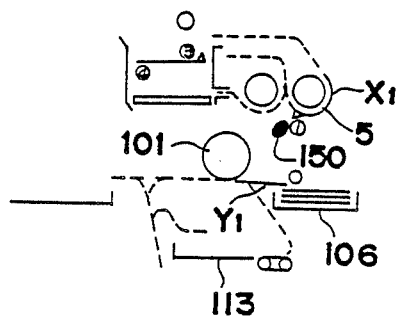
(III) (third-page copying)
(IV) (completion of odd-number page copying)
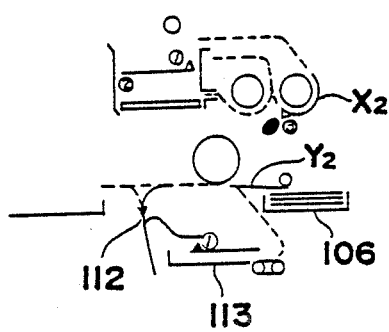
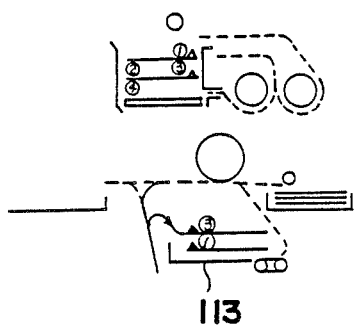

Fig. 25  (face·up DD1)
(V) (second-page copying)
(VI) (fourth-page copying)
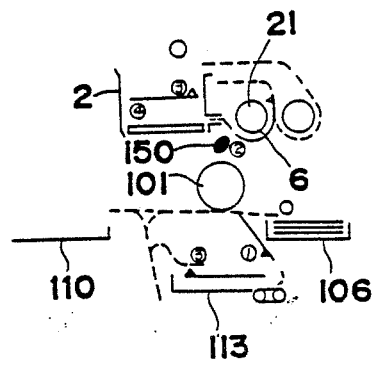
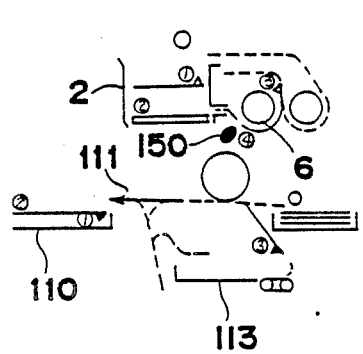
(VII) (completion of even-number page copying (completion of one-sheet copying))
(VIII) (completion of two-sheet copying)
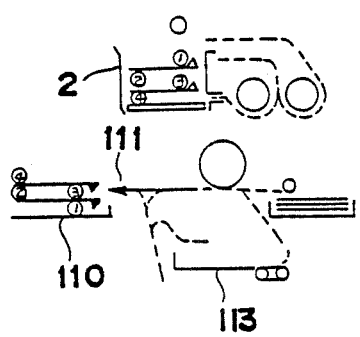
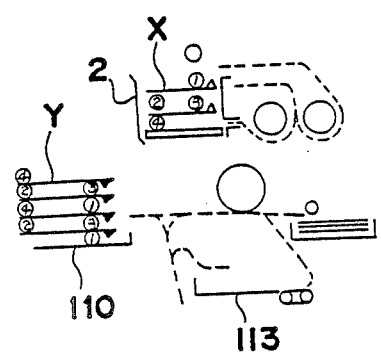

Fig. 26  (face-up DD2)
(I)
(document setting)
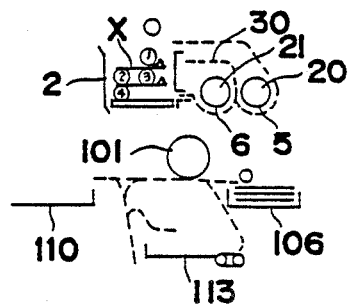
(II)
(first-page copying)
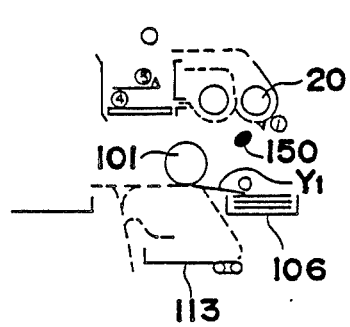
(III)
(first-sheet inversion / optical-system movement)
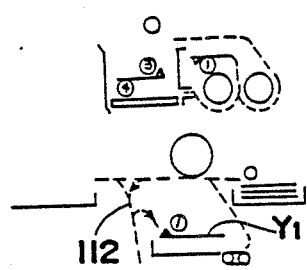
(IV)
(second-page copying)
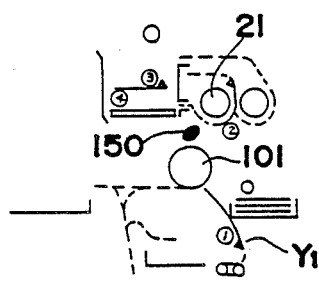

Fig. 26  (face-up DD2)
(V)
$\begin{pmatrix} \text{first-sheet return} \\ \text{optical-system movement} \end{pmatrix}$
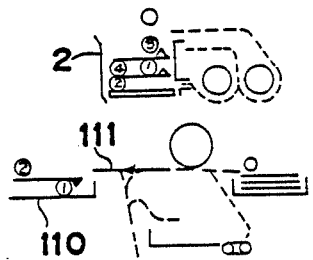
(VI)
(third-page copying)
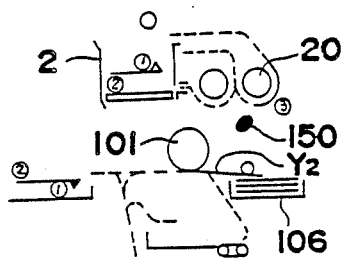
(VII)
$\begin{pmatrix} \text{second-sheet inversion} \\ \text{optical-system} \\ \text{movement} \end{pmatrix}$
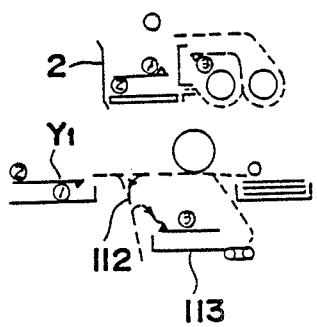
(VIII)
(fourth-page copying)
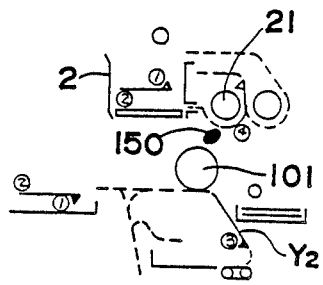

Fig. 26 (face·up DD2)
(IX) (X)
(completion of one-sheet copying / second-sheet return / light-source movement)   (completion of two-sheet copying)
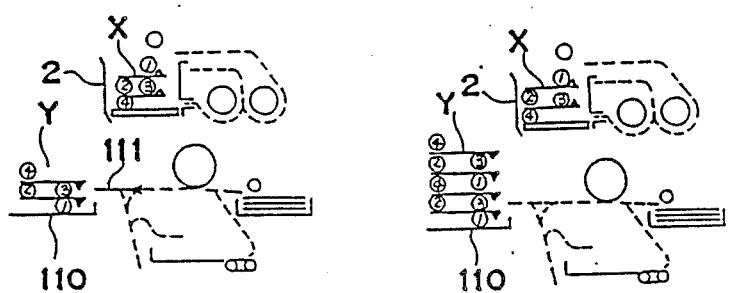

Fig. 27 (face·up DS1)
(I)
(document setting)
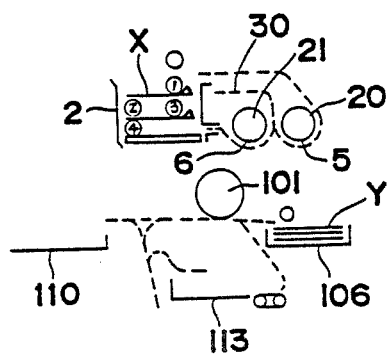
(II)
(first-page copying)
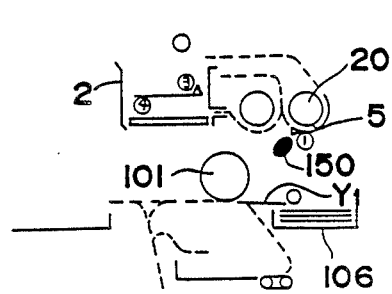
(III)
(third-page copying)
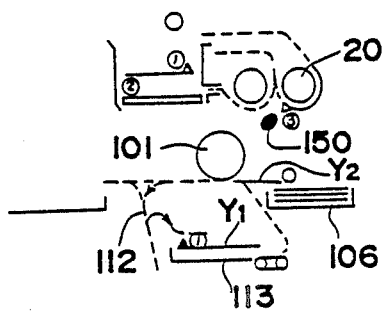
(IV)
(completion of all the odd-number page copying)
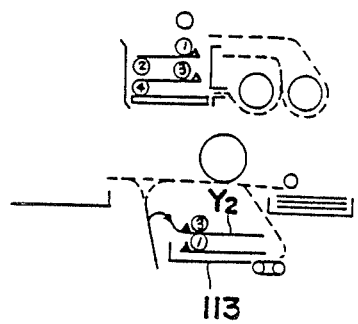

Fig. 27 [face-up DS1]
(V)
(first-page idle discharging)
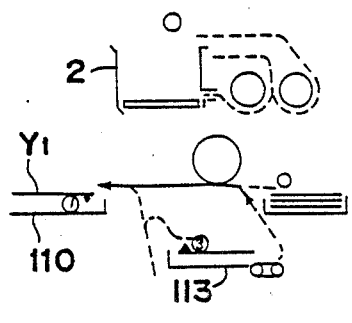
(VI)
(second-page copying)
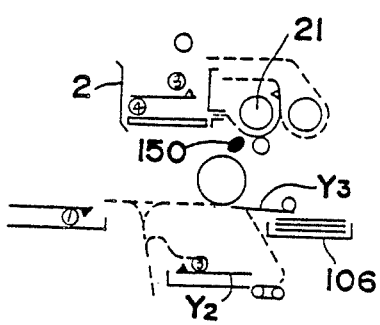
(VII)
(third-page idle discharging)
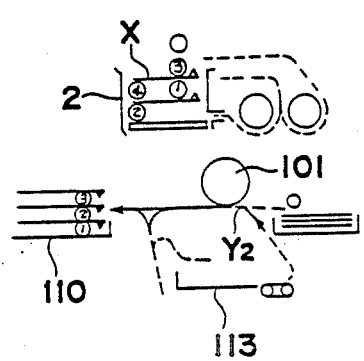
(VIII)
(fourth-page copying)
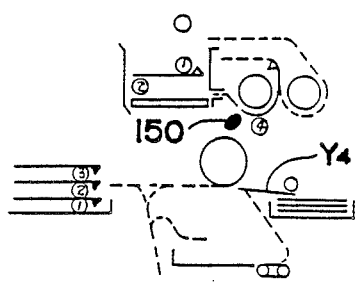

Fig. 27  [face·up DS1]
(IX)
$\begin{pmatrix} \text{completion of all the even-number page} \\ \text{copying (completion of one-sheet copying)} \end{pmatrix}$
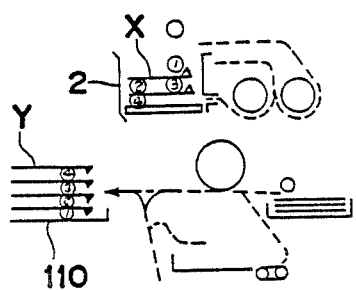
(X)
(completion of two-sheet copying)
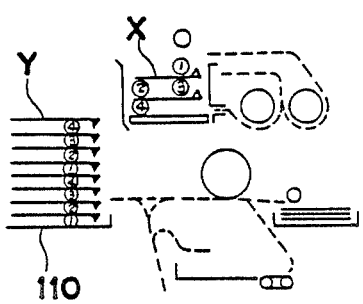

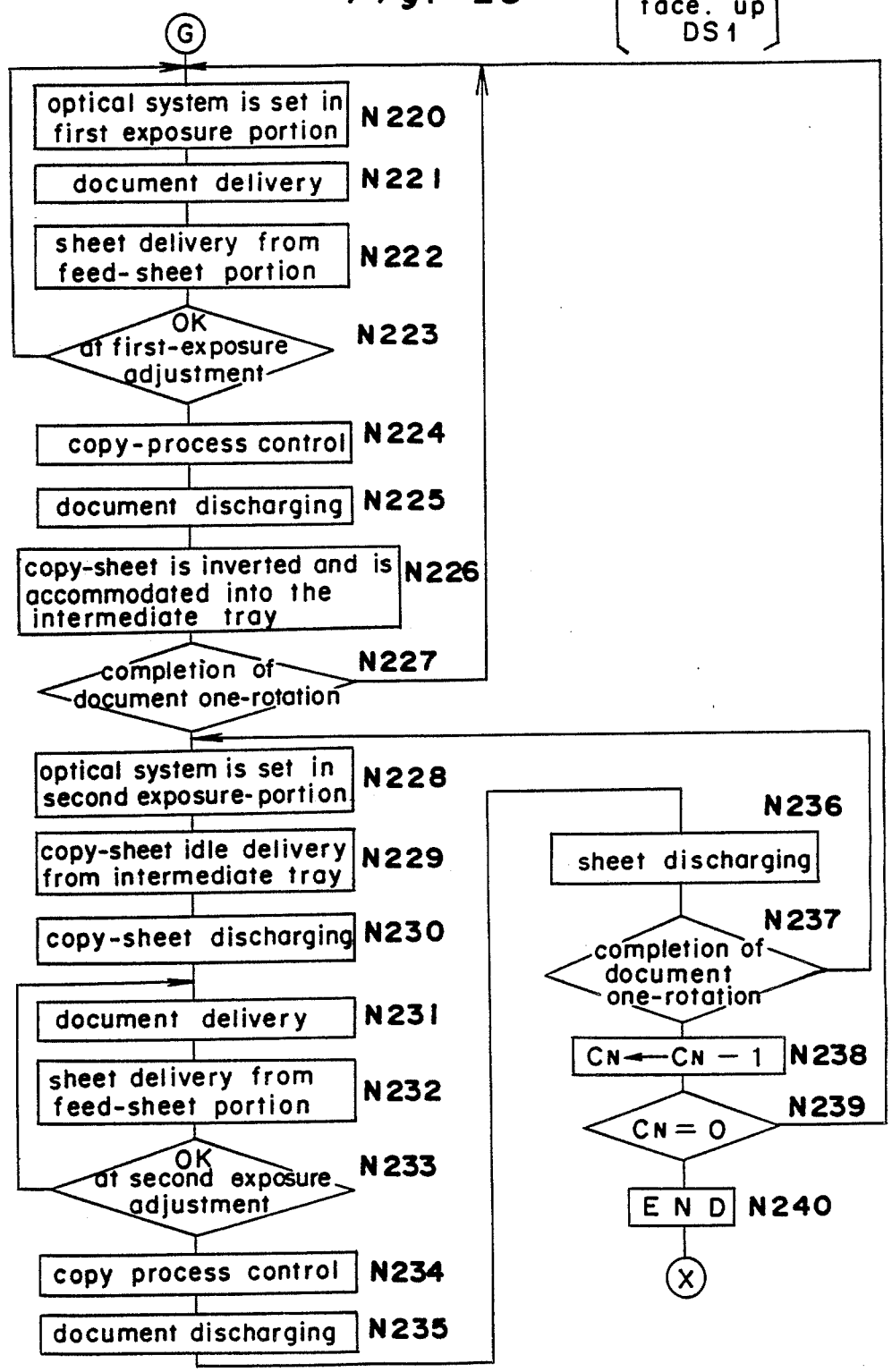

Fig. 29 (face-up DS2)
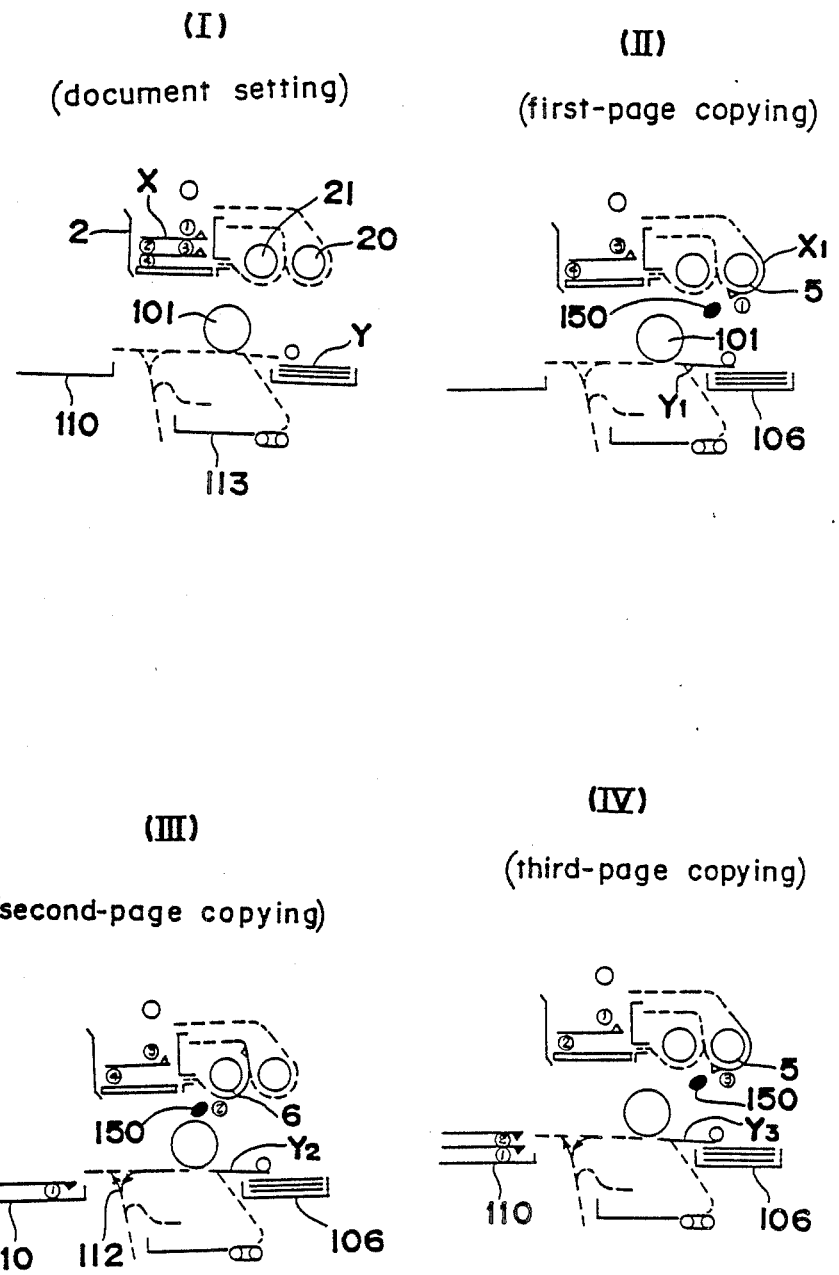

Fig. 29  [face·up DS2]
(V) (fourth-page copying)
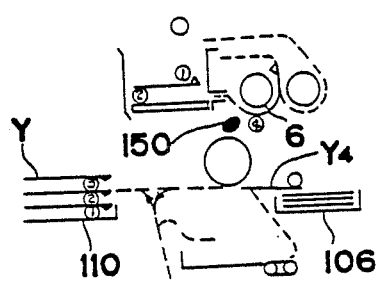
(VI) (completion of all page copying (completion of one-sheet copying))
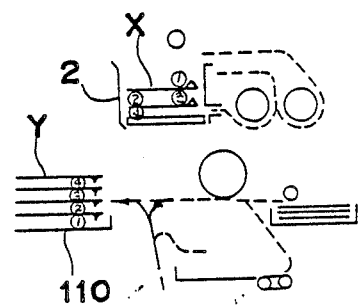
(VII) (completion of two-sheet copying)
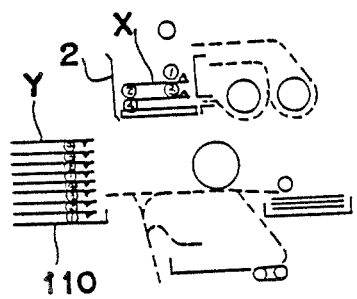

Fig. 31 (face-up SD)
(I) (document setting)
(II) (first-page copying)
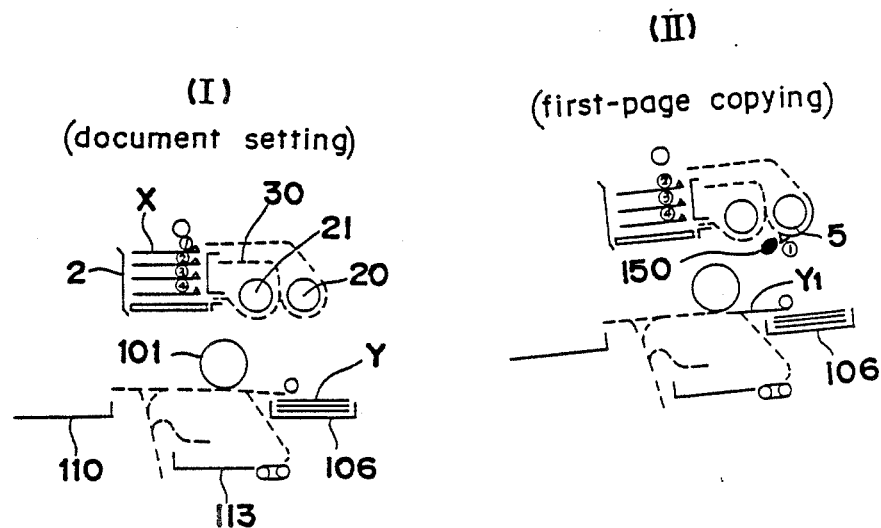
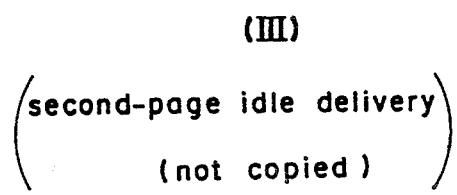
(III) (second-page idle delivery / not copied)
(IV) (third-page copying)
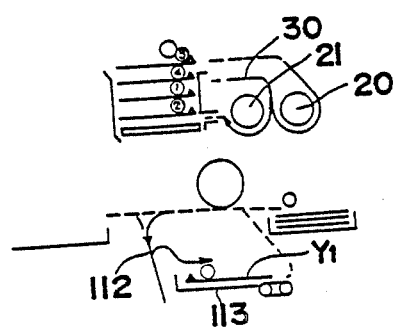
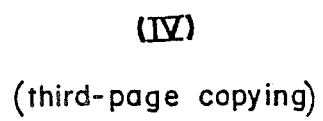

Fig. 31 [face·up SD]
(V)
(fourth-page idle delivery (not copied))
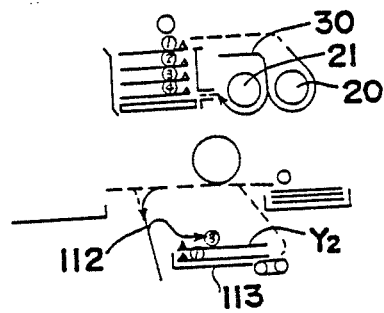
(VI)
(completion of odd-number page copying)
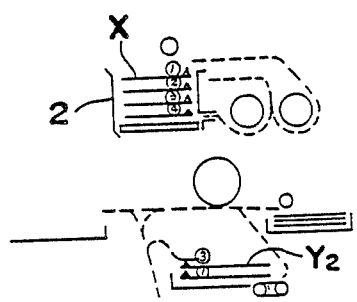
(VII)
(first-page idle delivery)
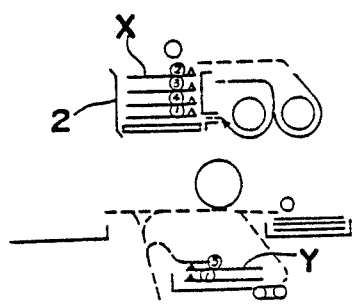
(VIII)
(second-page copying)
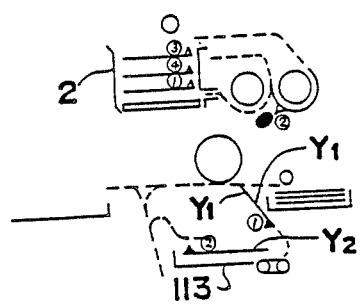

Fig. 31 (face-up SD)
(IX)
(third-page idle delivery)
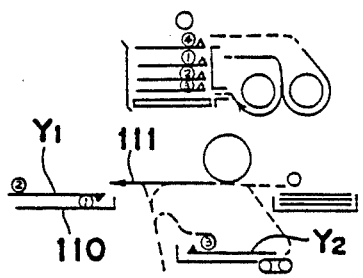
(X)
(fourth-page copying when the documents are odd-numbered in page, sheet of the intermediate tray is discharged without being copied)
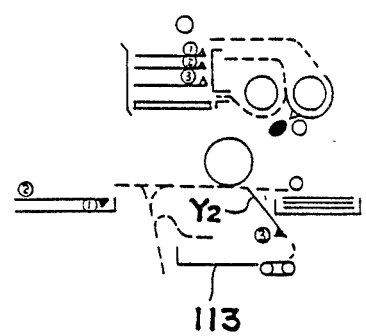
(XI)
(completion of even-number page copying (completion of one-sheet copying))
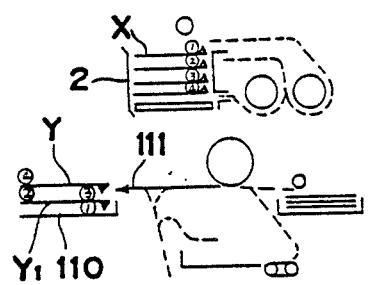
(XII)
(completion of two-sheet copying)
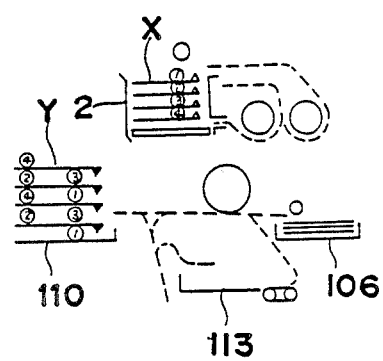

Fig. 33 [face-up SS]

Fig. 34 (face·up SS)

Fig. 38  (face-down DD1)
(I)
(document setting)
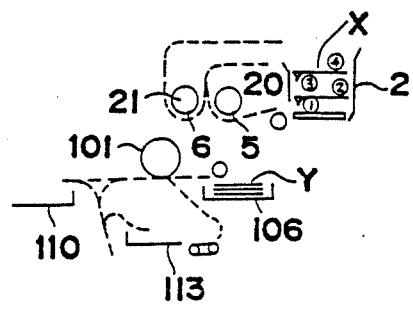
(II)
(first-page copying)
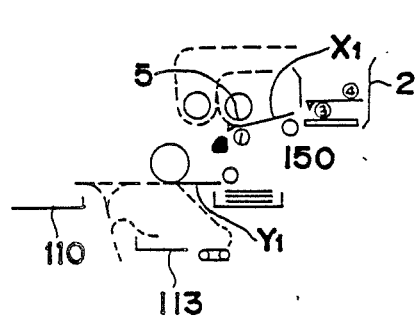
(III)
(third-page copying)
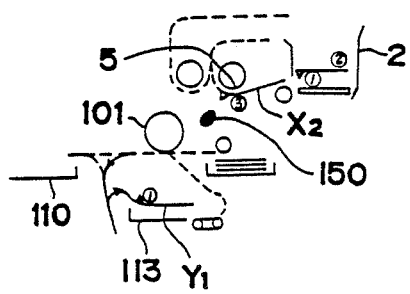
(IV)
(completion of all the odd-number page copying)
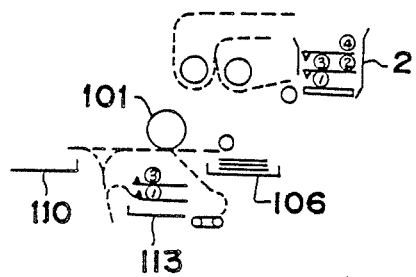

Fig.38 (face-down DD1)
(V)
(second-page copying)
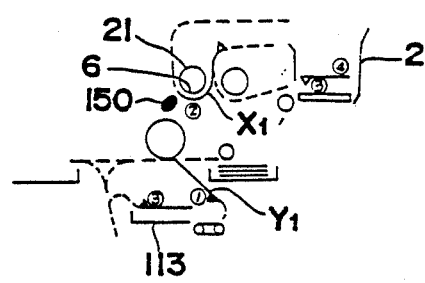
(VI)
(fourth-page copying)
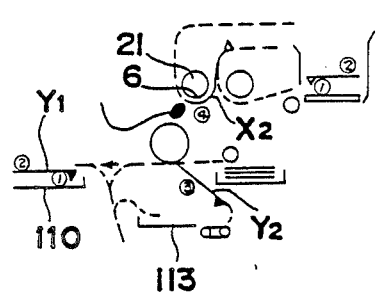
(VII)
(completion of all the even-number page copying (completion of one-sheet copying))
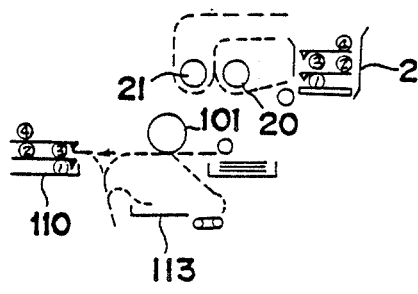
(VIII)
(completion of two-sheet copying)
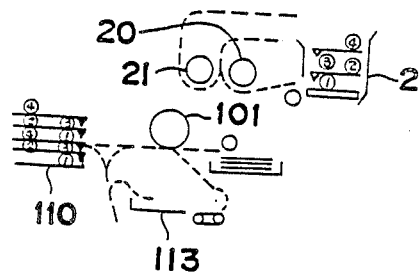

Fig. 39  (face-down DD2)
(I)
(document setting)
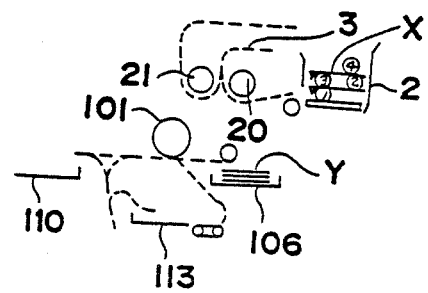
(II)
(first-page copying)
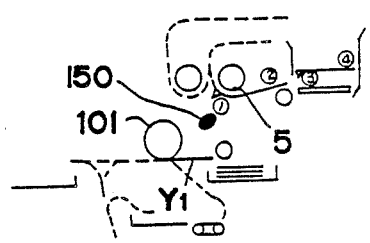
(III)
(document inversion / copy-sheet intermediate tray)
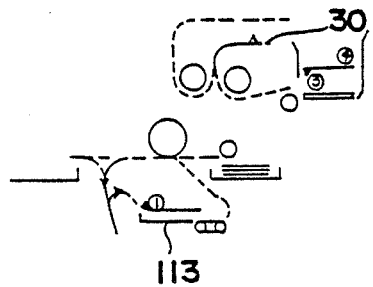
(IV)
(second-page copying)
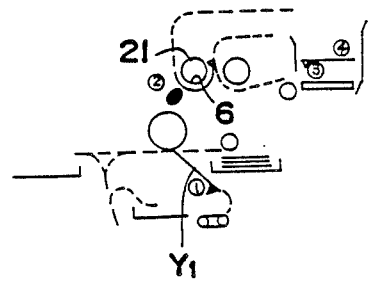

Fig. 39  (face·down DD2)
(V) (third-page copying)
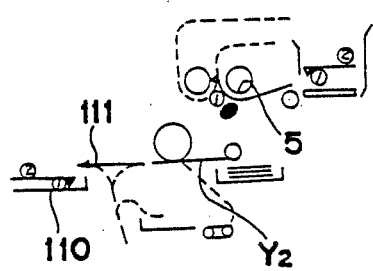
(VI) (copy inversion copy-sheet intermediate tray)
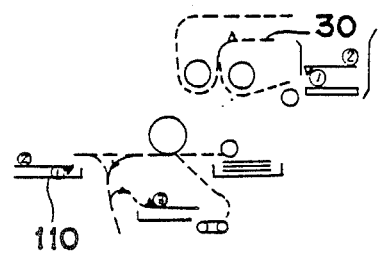
(VII) (fourth-page copying)
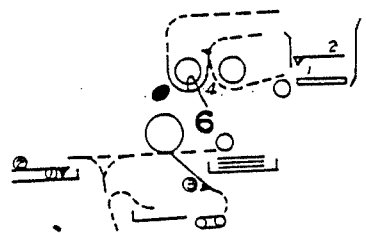
(VIII) (completion of all the page copying)
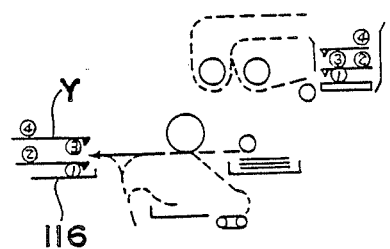

Fig. 40    [face-down DS2]
(I)  (document setting)
(II) (first-page copying)
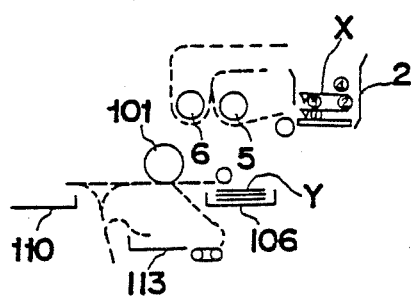
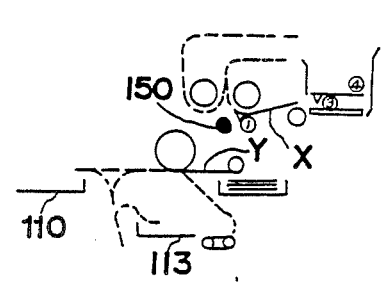
(III) (third-page copying)
(IV) (completion of all the odd-number page copying)
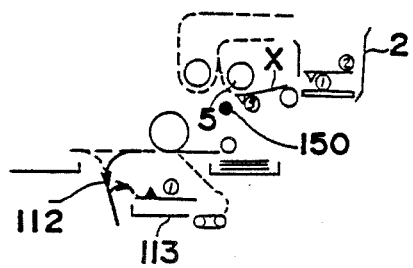
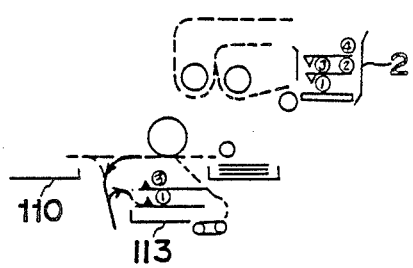
(V) (first-page idle discharging)
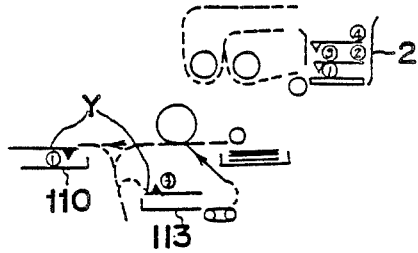

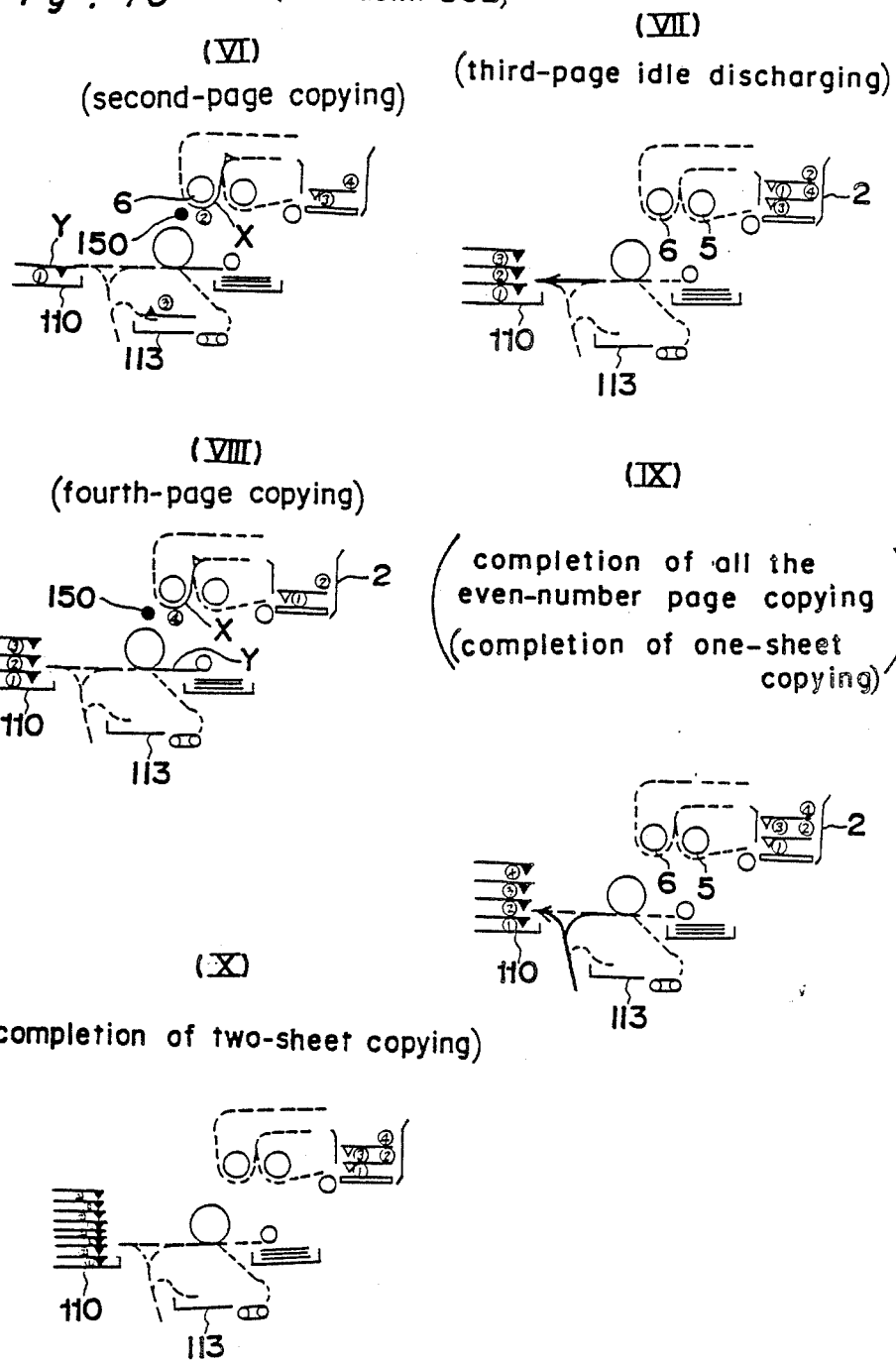
Fig. 40 (face-down DS2)

Fig. 41  [face-down DS2]
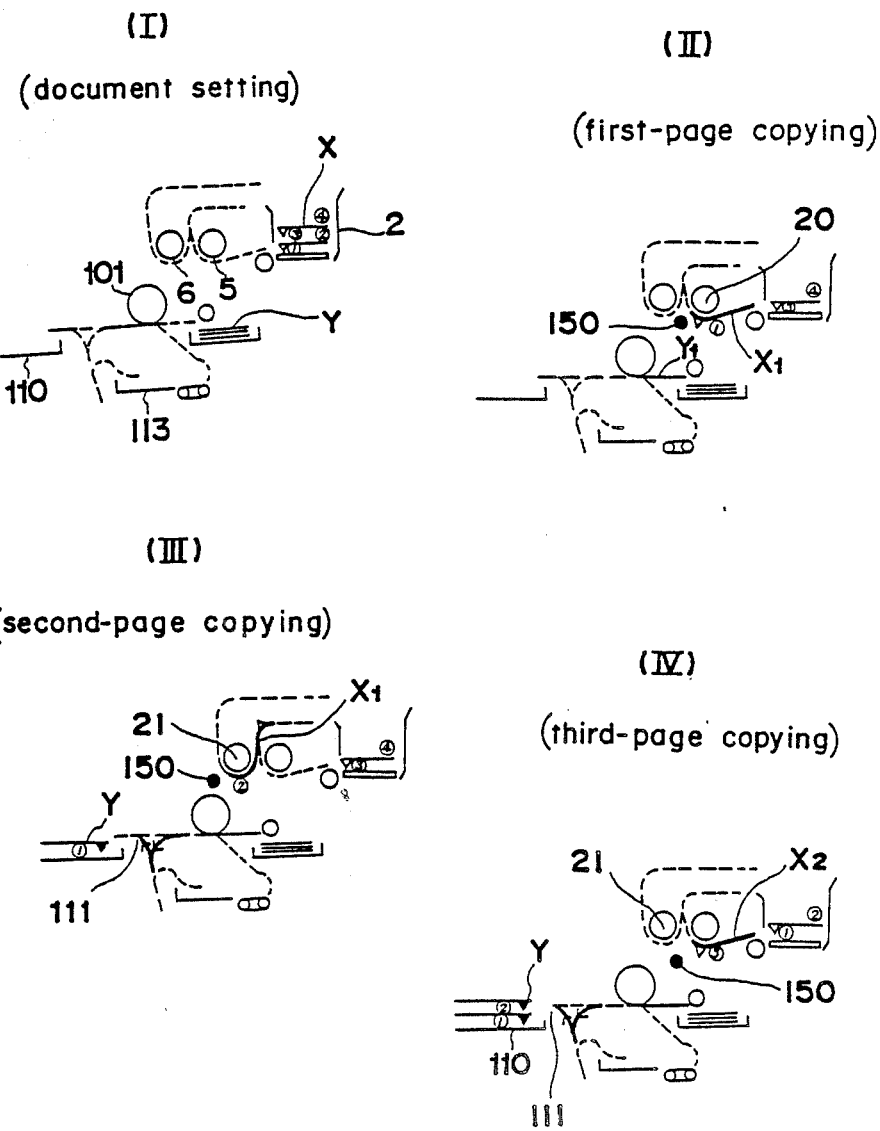

Fig. 41 [face-down DS2]
(V)
(fourth-page copying)
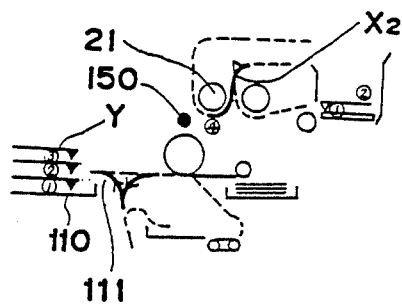
(VI)
(completion of all page copying
(completion of one-sheet copying))
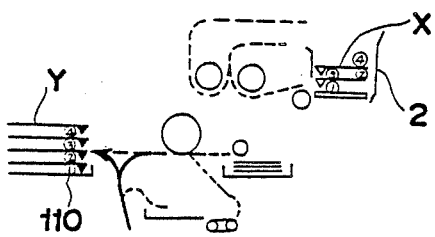
(VII)
(completion of two-sheet copying)
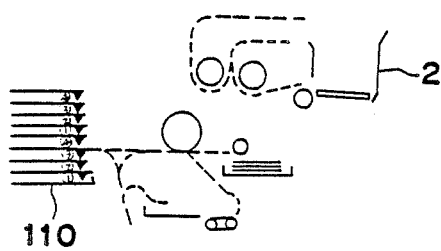

Fig. 42  [face-down SD]
(I)
(document setting)
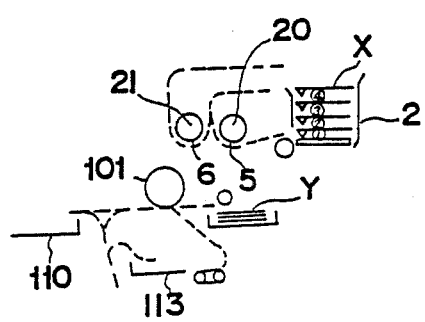
(II)
(first-page copying)
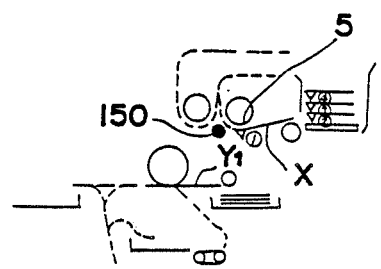
(III)
$\begin{pmatrix} \text{second-page idle delivery} \\ \text{(not copied)} \end{pmatrix}$
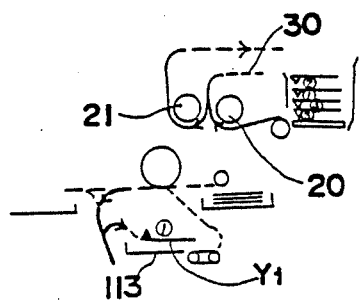
(IV)
(third-page copying)
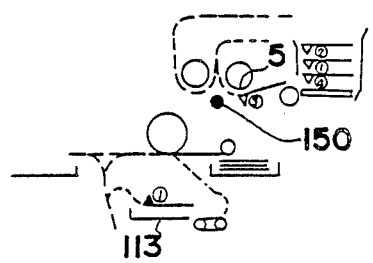

Fig. 42  (face-down SD)
(V) (fourth-page idle delivery (not copied))
(VI) (completion of odd-number page copying)
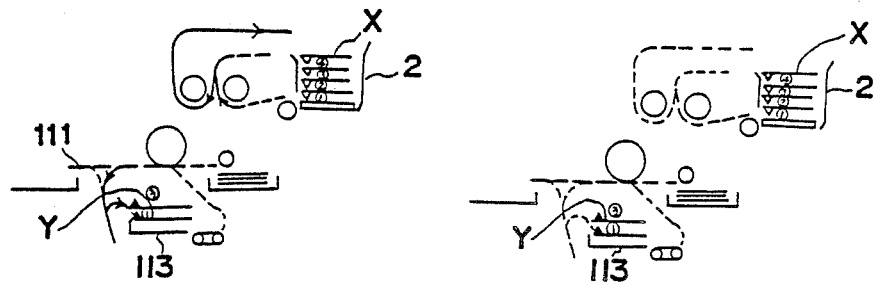
(VII) (first-page idle delivery (not copied))
(VIII) (second-page copying)
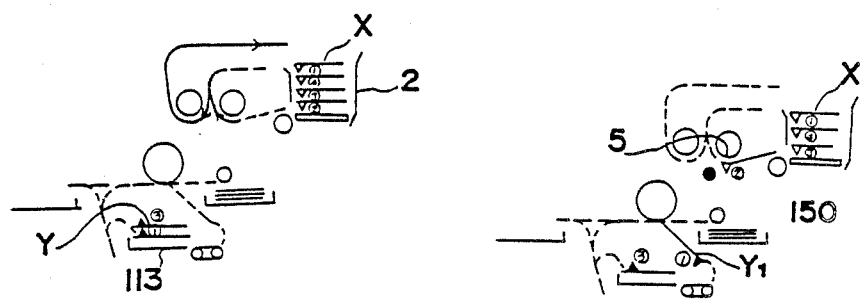

Fig. 42  (face-down SD)
(IX) (third-page idle delivery (not copied))
(X) (fourth-page copying)
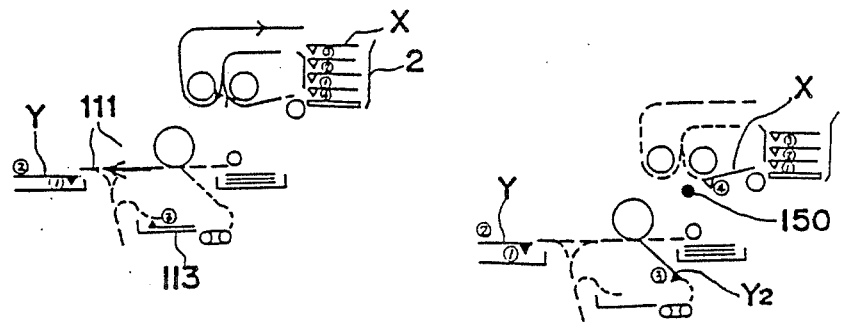
(XI) (completion of even-number page copying (completion of one-sheet copying))
(XII) (completion of two-sheet copying)
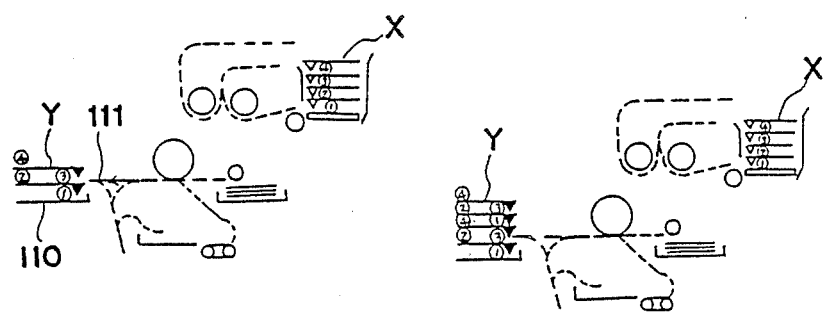

Fig. 43  (face-down SS)
(I)
(document setting)
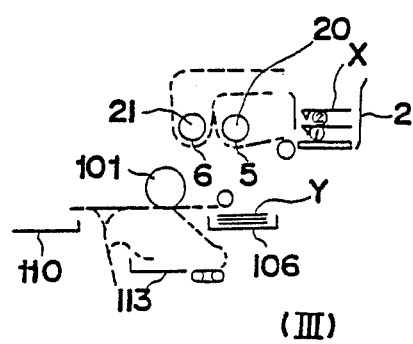
(II)
(first-page copying)
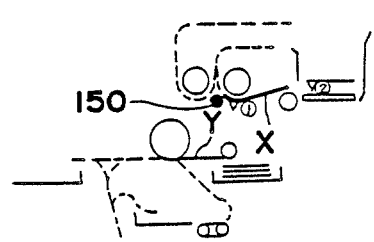
(III)
(second-page copying)
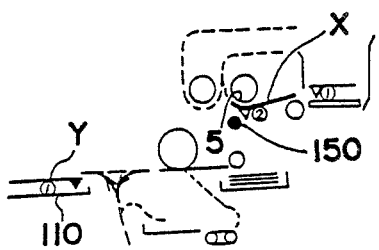
(IV)
(completion of one-sheet copying)
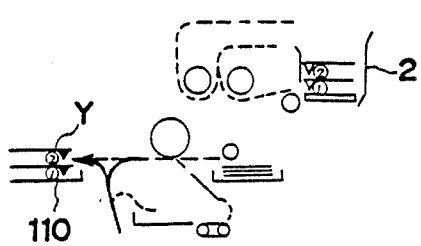
(V)
(completion of two-sheet copying)
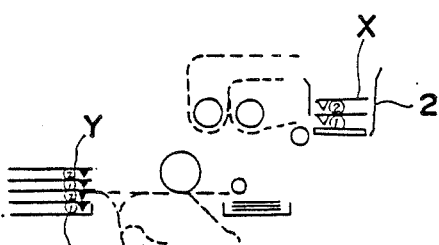

Fig. 44    [face·up DD1]
(I)
(document setting)
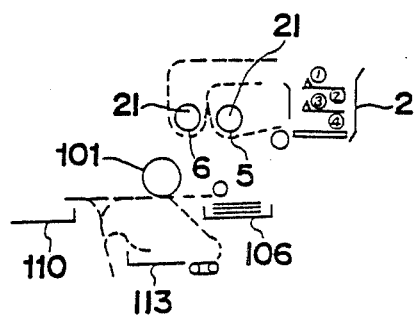
(II)
(fourth-page copying)
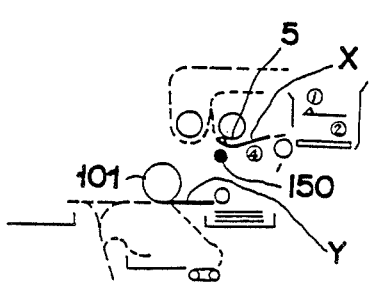
(III)
(second-page copying)
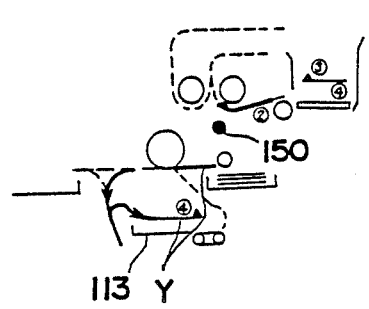
(IV)
(completion of even-number page copying)
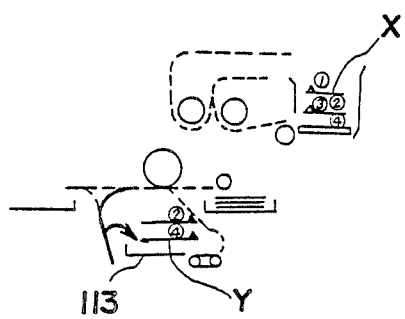

Fig. 44  (face-up DD1)
(V)
(third-page copying)
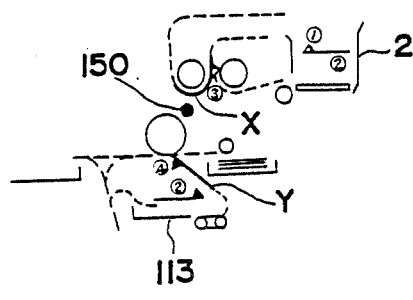
(VI)
(first-page copying)
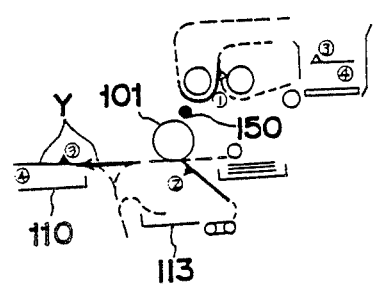
(VII)
(completion of odd-number page copying
(completion of one-sheet copying))
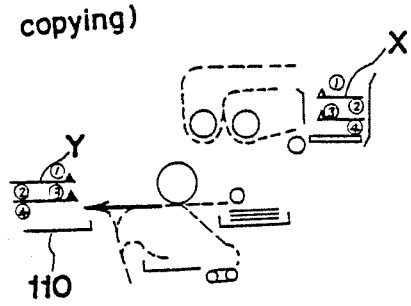
(VIII)
(completion of two-sheet copying)
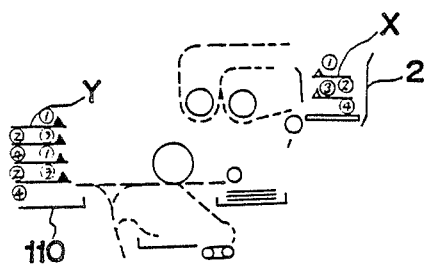

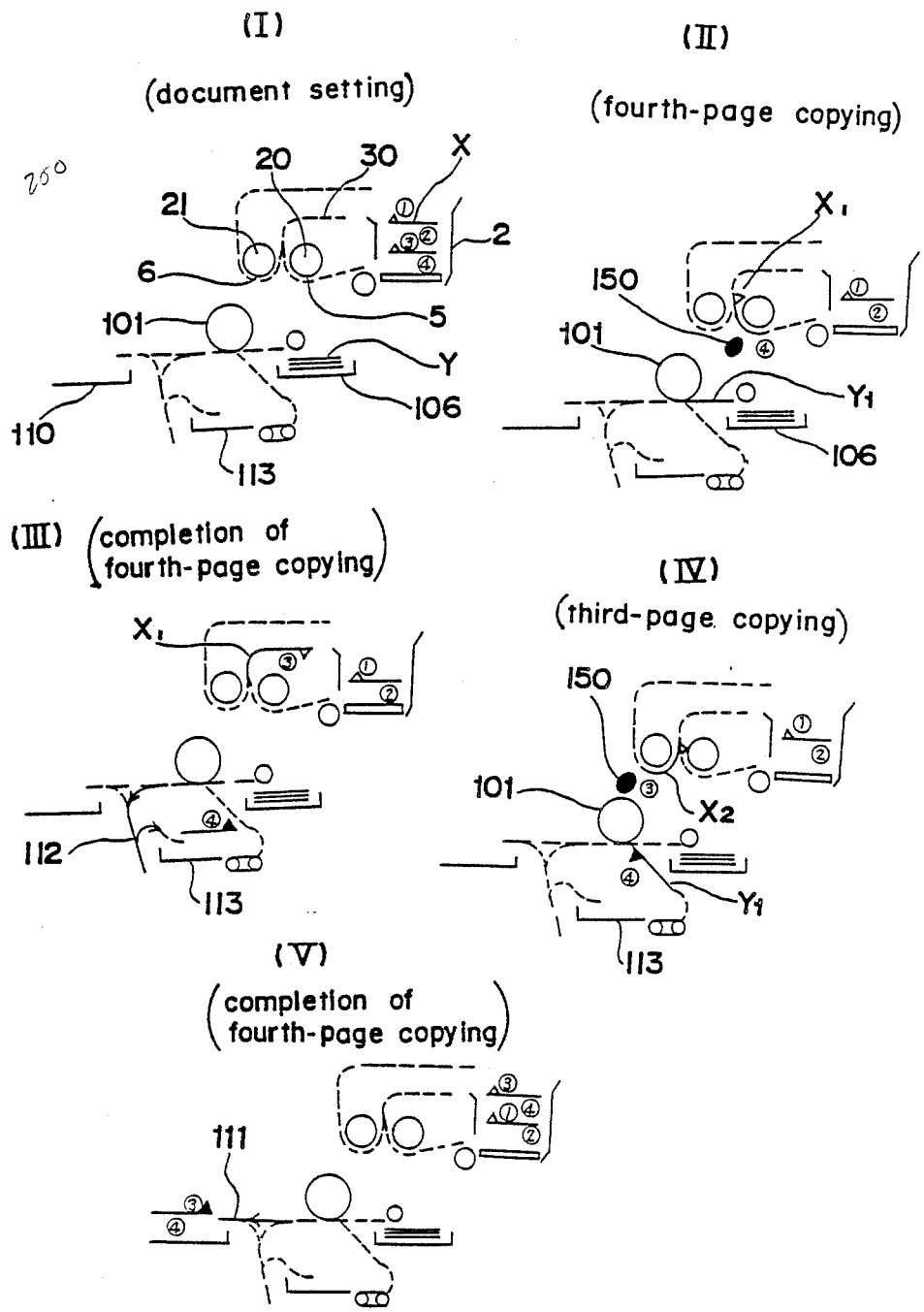
Fig. 45 (face-up DD2)

Fig. 45 (face-up DD2)
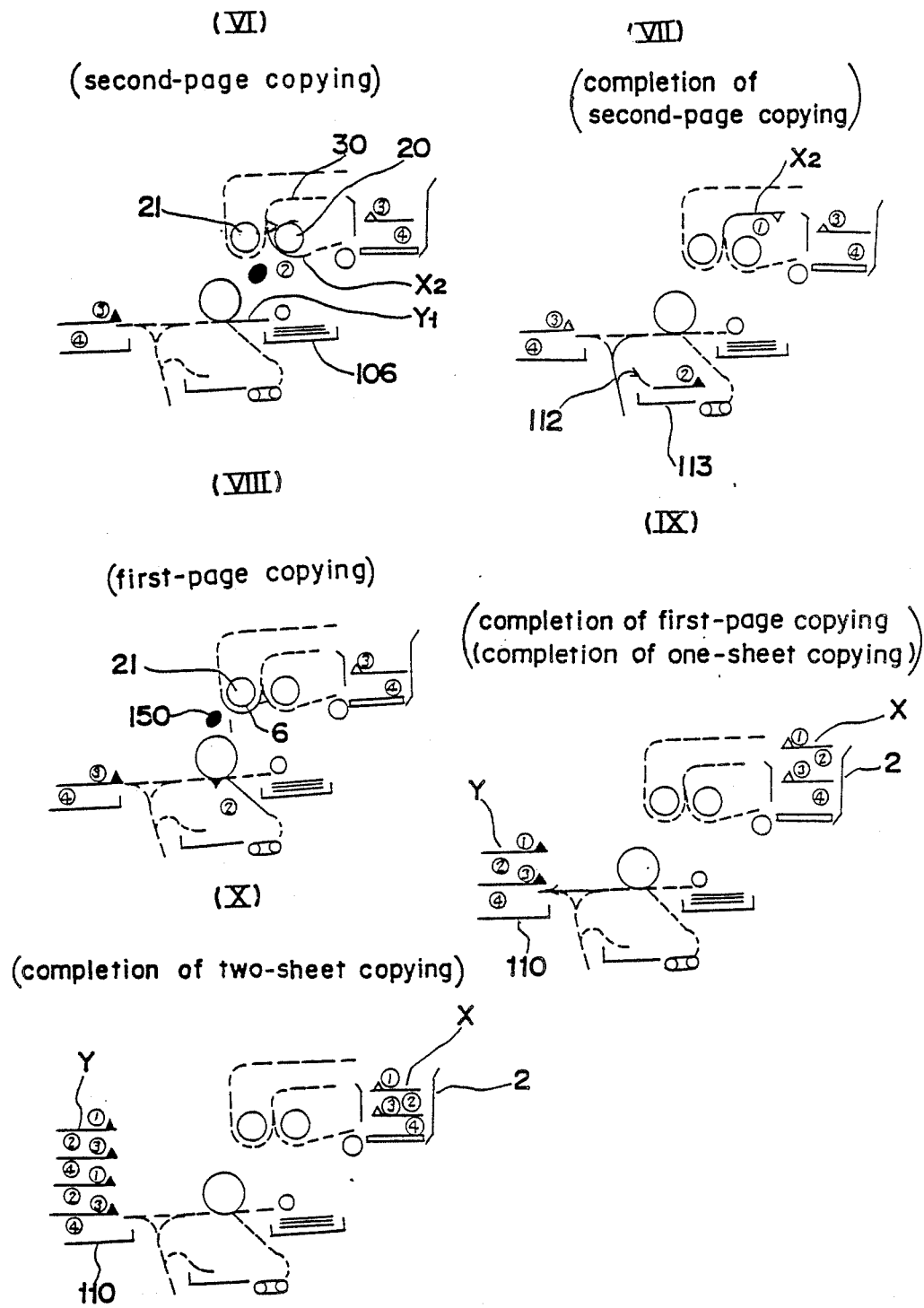

Fig. 46 [face·up DS1]
(I) document setting
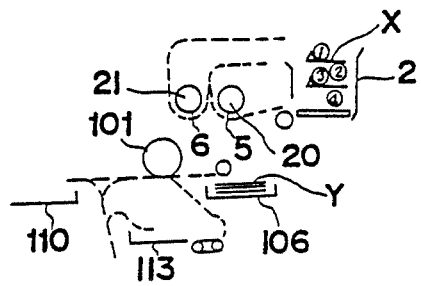
(II) fourth-page copying
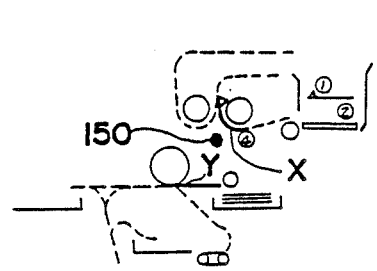
(III) second-page copying
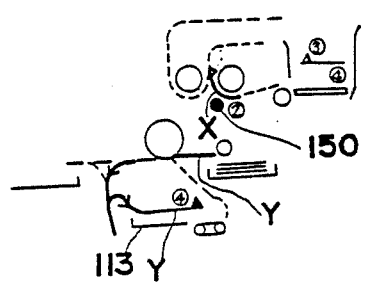
(IV) completion of all even-number page copying
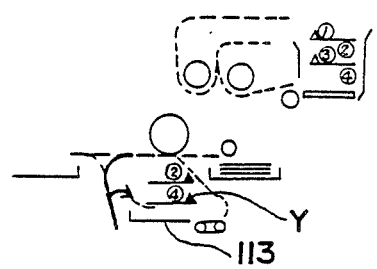
(V) fourth-page idle discharging
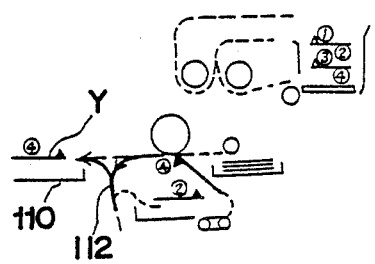

Fig. 46  [face·up DS1]
(VI)  
third-page copying
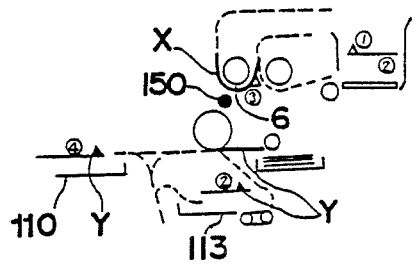
(VII)  
second-page idle discharging
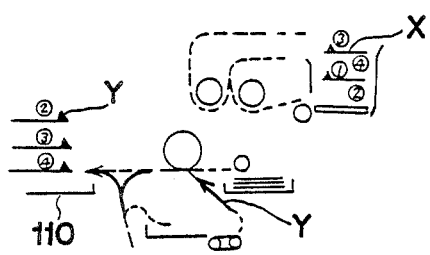
(VIII)  
first-page copying
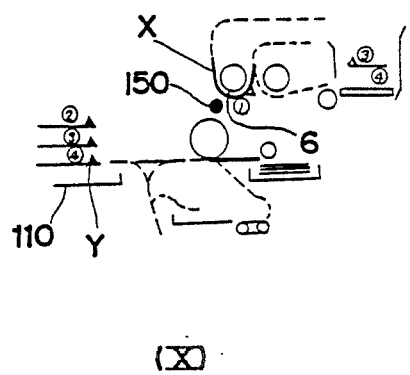
(IX)  
completion of all the odd-number page copying  
(completion of one-sheet copying)
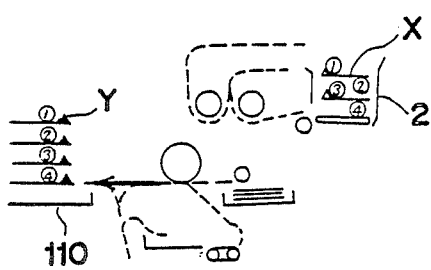
(X)  
completion of two-sheet copying
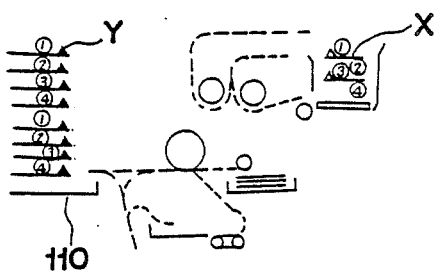

Fig. 47  [face-up DS2]
(I)
(document setting)
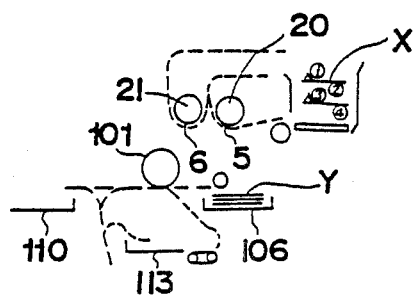
(II)
(fourth-page copying)
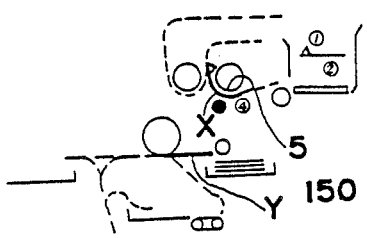
(III)
(third-page copying)
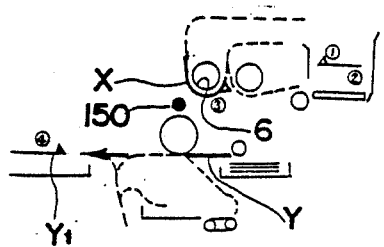
(IV)
(second-page copying)
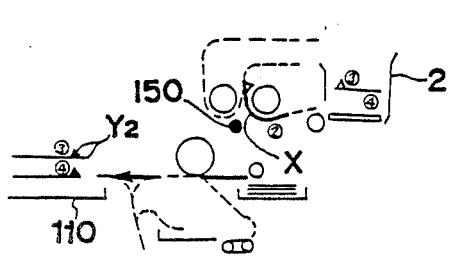

Fig. 47  (face-up DS2)
(V)
(first-page copying)
(VI)
(completion of all the page copying)
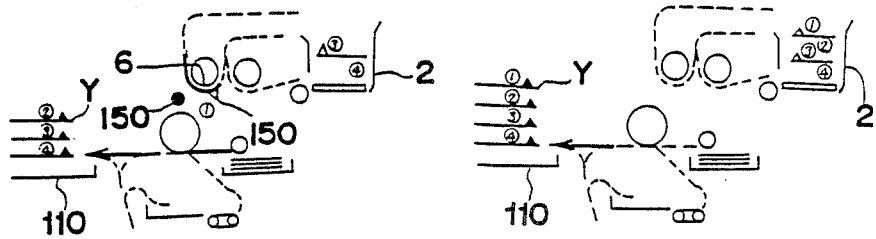
(VII)
(completion of two-sheet copying)
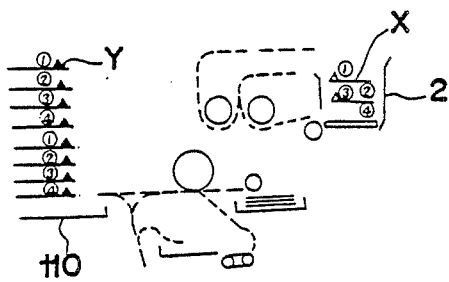

Fig. 48 (face-up SD)
(I)
(document setting)
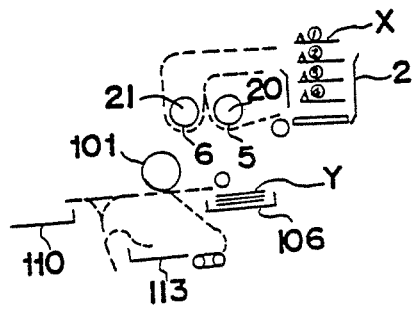
(II)
(fourth-page copying)
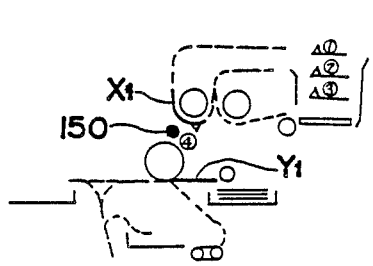
(III)
(third-page idle delivery
(not copied))
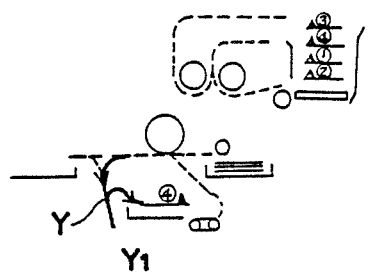
(IV)
(second-page copying)
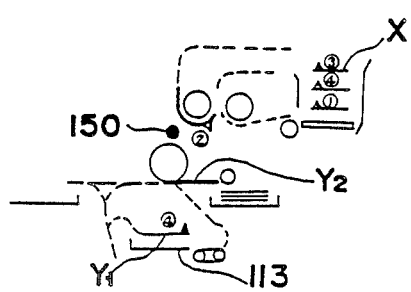

Fig. 48   (face·up SD)
(V)
(first-page idle delivery (not copied))
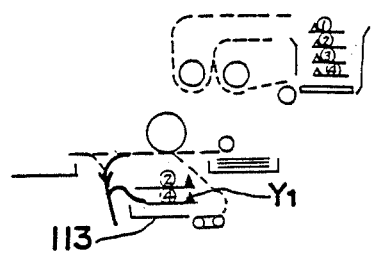
(VI)
(completion of even-number page copying)
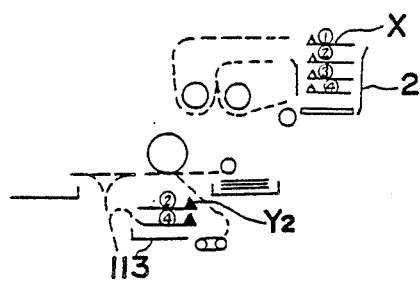
(VII)
(fourth-page idle delivery)
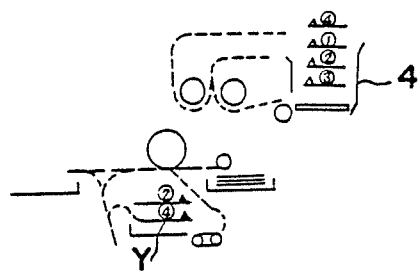
(VIII)
(third-page copying)
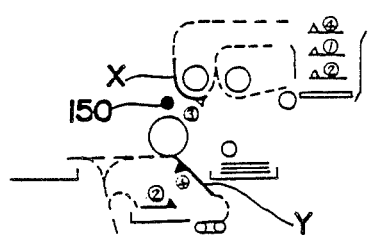

Fig. 48 (face-up SD)
(IX)
(second-page idle delivery)
(not copied)
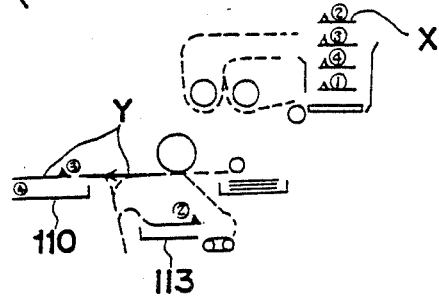
(X)
(first-page copying)
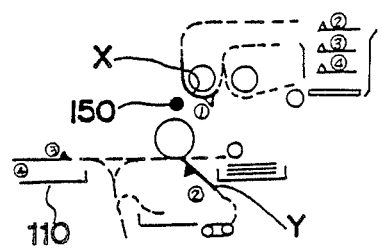
(XI)
(completion of odd-number page copying)
((completion of one-sheet copying))
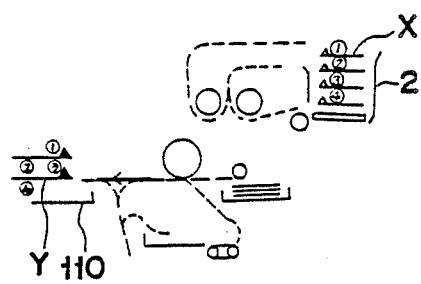
(XII)
(completion of two-sheet copying)
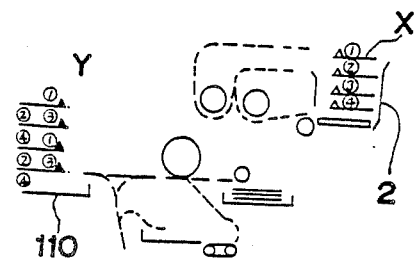

Fig. 49  [face·up SS]
(I) (document setting)
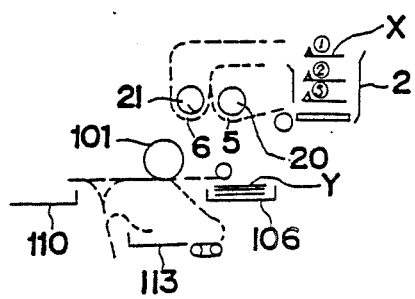
(II) (third-page copying)
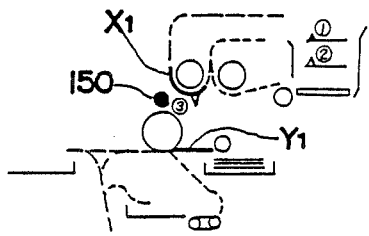
(III) (second-page copying)
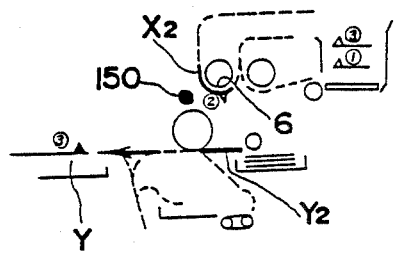
(IV) (first-page copying)
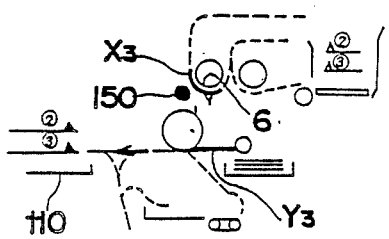
(V) (completion of one-sheet copying)
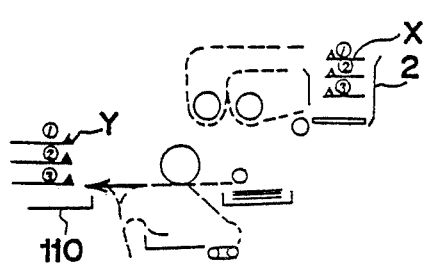
(VI) (completion of two-sheet copying)
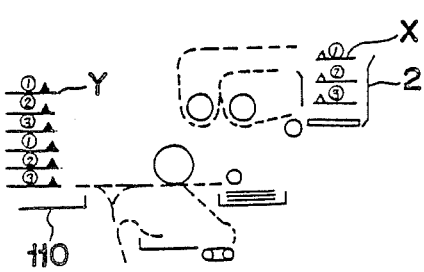

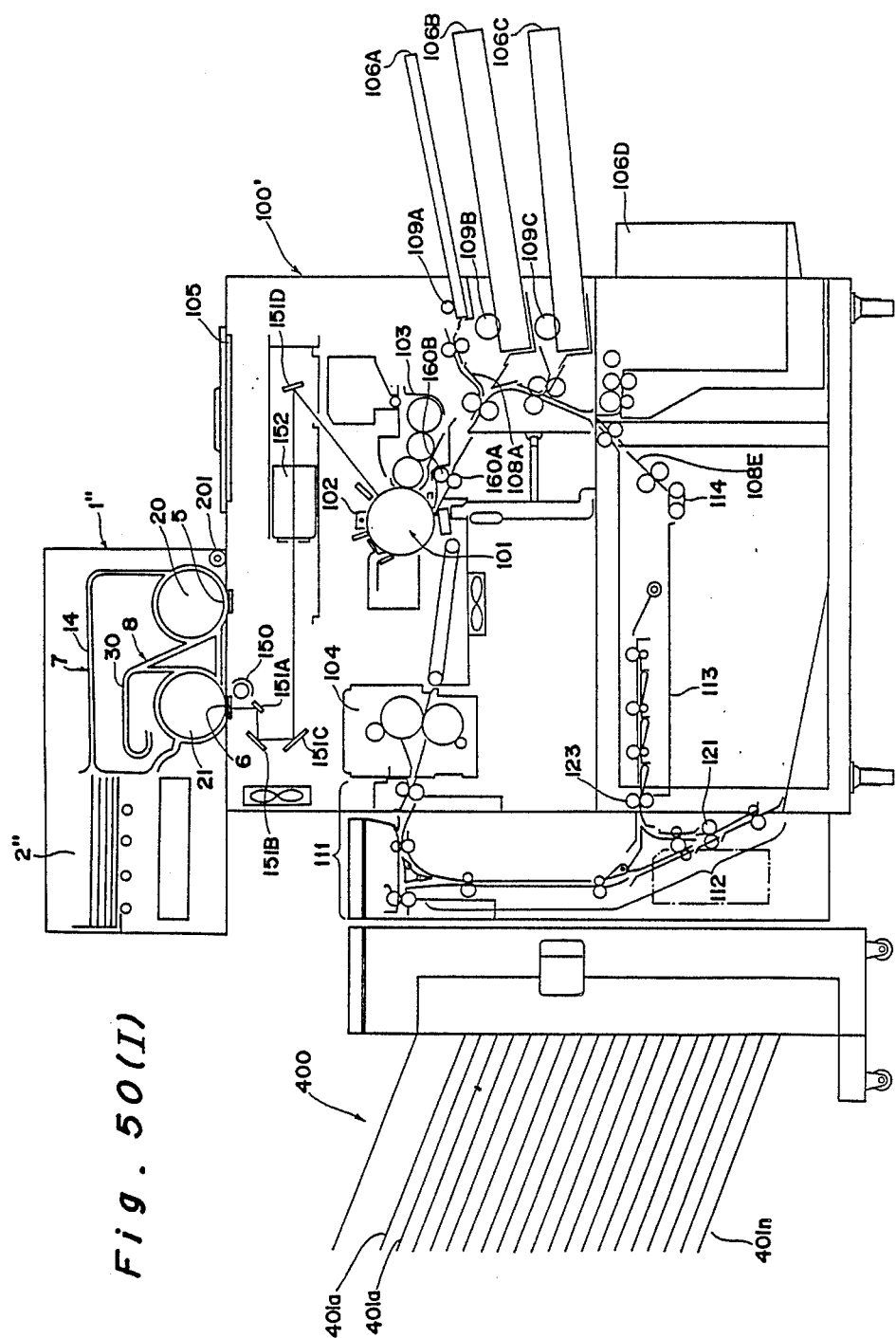

Fig. 53 (face-up DD1)

Fig. 55  (face-up ADF)
(I)'
(document setting)
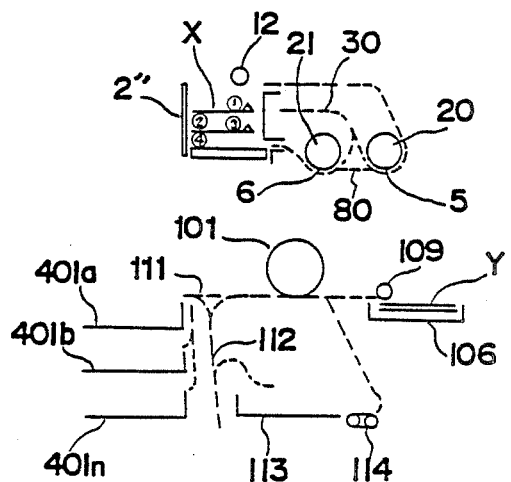
(II)
(multiple copy of first-page)
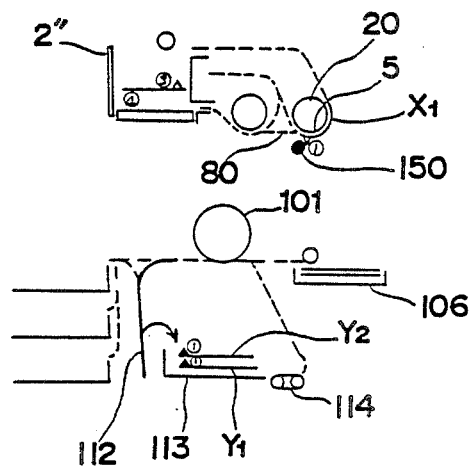

Fig. 55   (face·up ADF)
(III)
(multiple copy of third-page)
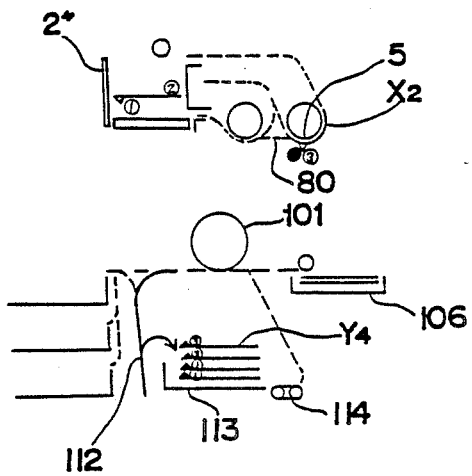
(IV)
(multiple copy of second-page)
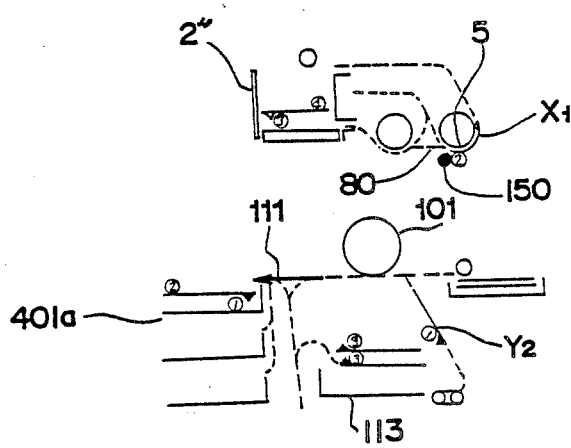

CIRCULATING TYPE OF AUTOMATIC DOCUMENT FEEDING APPARATUS AND DUPLEX COPYING APPARATUS PROVIDED WITH SAID APPARATUS

BACKGROUND OF THE INVENTION

The present invention generally relates to a circulating type of automatic document feeding apparatus and an automatic duplex copying apparatus provided with the apparatus. More particularly, when many copies are made from a plurality of documents arranged in the sequential order of the pages, copy sheets with images being formed in the page order are discharged and also a copying method of fourth types, i.e., duplex copying from a duplex document onto a copy sheet, simplex copying from a duplex document onto a copy sheet, duplex copying from a simplex document, and simplex copying from a simplex document may be effected by easier switching operations. Particularly, an inverting route, wherein after one face of the document has been exposed, the document is inverted so that the other face thereof may be exposed, is provided in the circulating type of automatic document feeding apparatus so that the duplex document may be copied in a short time.

Conventionally, in the copying machine, various types of automatic document feeding apparatuses proposed require resetting of the discharged documents into the document feeding apparatus again by manual operation when the document once copied is recopied. The operation is uncertain when the speed becomes higher. The operation becomes complicated when many copies are required to be made from the same document and when the copies are required to be made from both faces of the sheet document. Particularly, it is difficult to make many sheets of copies in page order from documents with a plurality of sheets.

Recently, a copying machine provided with a document feeding apparatus which makes it possible to copy a duplex document is proposed in, for example, U.S. Pat. No. 4,099,150 and U.S. Pat. No. 4,140,387, with such various problems as described hereinafter. Namely, in U.S. Pat. No. 4,099,150, an apparatus is proposed which circulates the duplex documents, and inverts the documents via an inverting apparatus during the duplex copying operation. When a document jam has occurred in the apparatus, it is difficult to provide the copied sheets in accordance with the order of the document pages. Also, in U.S. Pat. No. 4,140,387, an apparatus is provided which feeds the duplex documents onto an exposure stand from a document feeding portion and copies them, thereafter reverses them without returning them to the document feeding portion to make outside copies. However, in the apparatus, sheets having unfixed images thereon have to be carried through and inverted by air on the side of the main body of the copying machine in the apparatus, thus resulting in an apparatus higher in price and larger in size. As the apparatus includes a step of inverting the document which has been exposed, a waiting time is required before the exposure completion of the duplex copying step of the former document to present the following document, so that the document exchange time becomes longer, with faster copying speed becoming difficult to obtain.

SUMMARY OF THE INVENTION

Accordingly, an object of the present invention is to provide a circulating type of automatic document feeding apparatus (Recirculating Document Handler: RDH), which eliminates the above-described disadvantages, and is capable of circulating the exposure-completed document again into the exposure portion by short steps so that the duplex copying may be made continuously from the duplex document and also a plurality of sheets may be continuously copied, and the documents in sequential pages arranged are adapted to be returned into the document hopper in the order of the pages, the above-described copying operation may be efficiently effected in a short time by extremely simple operations.

Another object of the present invention is to provide an automatic duplex copying apparatus provided with the circulating type of automatic document feeding apparatus, wherein the copy sheet copies from the documents arranged in the order of the pages are discharged in the sequential order of the pages through mutually operative cooperation with the circulating type of automatic document feeding apparatus, and four types of copying operation, i.e., duplex copying onto a copy sheet from a duplex document, simplex copying onto a copy sheet from a duplex document, duplex copying onto a copy sheet from a simplex document, and simplex copying from a simplex document.

Still another object of the present invention is to provide a copying apparatus which is capable of selecting a copying mode in the copying operation from a plurality of duplex documents, of exposing the other face of the whole document on the other exposure portion after having exposed the one face of the whole document in the same exposure portion, and a copying mode of inverting the document after having exposed the single face of the document one by one to expose the other face thereof, sequentially effecting the steps for each of the documents.

In accomplishing these and other objects, according to the present invention, there are provided a circulating type of automatic document feeding apparatus and a duplex copying apparatus provided with the apparatus.

Firstly, a circulating type of automatic document feeding apparatus for automatically carrying a plurality of documents is provided, comprising a document hopper for receiving documents of the sequential order of pages, which are upward in face or downward in face, feed-sheet means for feeding the documents, from the topmost side or the bottommost side, one by one from the document hopper, document presentation means which is located away from the document which has a first presentation portion and a second presentation portion each having the documents presented with a first exposure portion and a second exposure portion, wherein the respective documents of the first presentation portion and the second presentation portion are exposed, being provided in approximately the same plane, and in nearby position, a first carrying means for carrying the documents from the hopper to the first presentation portion and the second carrying means located between the first presentation portion and the second presentation portion to include the document inverting means for inverting the document presentation face, a third carrying means for returning the documents to the bottommost side when the documents placed within the document hopper are fed from the topmost side to the first carrying means from the second presentation portion to the document hopper or for returning the documents onto the topmost side when the documents are fed from the bottommost side.

According to the above-described circulating type of automatic document feeding apparatus, the exposure-completed documents may be circulated by the short steps again to the exposure portion by the second carrying means, so that the duplex copying may be continuously made from the duplex documents. Also, when the documents have been picked up from the top from the document hopper, they are returned onto the bottommost side of the document hopper. When the documents have been picked up from the bottom, they are returned onto the topmost side, so that the documents may be returned into the document hopper in an order placed in the document hopper and with the pages being arranged. As the apparatus is simple in construction, it may be provided without being increased in price, the above-described operations by the apparatus may be effected with extreme ease, shorter time, better efficiency, and more stability.

Secondly, the present invention provides a circulating type of automatic document feeding apparatus described in the above-described claim 1, wherein the first presentation portion and the second presentation portion of the document presentation portion are composed of two first and second cylinders arranged in parallel, the first exposure portion and the second exposure portion are respectively formed vertically downwardly of the respective cylinders, the respective cylinders themselves are rotated or the carrying rollers disposed on the outer periphery of each cylinder are rotated to wind the fed documents around the cylinders to carry them to the exposure portions.

According to an apparatus provided with the above-described document presentation portion, in the case of the duplex document, both the faces of the document may be continuously copied in the first exposure portion and the second exposure portion by the inversion of the document, while a simplex document is copied, the document is exposed at one of the exposure portions, and is passed without being exposed at the other thereof, so that a change-over gate for switching the duplex document and the simplex document thereto, and the carrying route may be made unnecessary. Also, as the first exposure portion and the second exposure portion are formed on the same plane, the switching operation of the exposure portions may be effected easily, because the optical system provided on the copying machine main-body is necessary to be moved in the scanning direction. Even when the document has been placed within the document hopper with the face being up or with the face being down, the duplex document may be copied as the document is being kept inverted. Furthermore, a switching operation may be effected between a copying mode where, after one face of each document has been copied in the first exposure portion with respect to a plurality of documents set up within the document hopper, the document is inverted to copy the other face of the document in the second exposure portion so as to copy both faces for each of the documents, and a copying mode wherein, after the single face of the whole document has been copied in the first exposure portion, the other face of the whole document is copied in the second exposure portion.

Thirdly, the present invention provides a circulating type of automatic document feeding apparatus, wherein the inverting means of the second carrying means is provided with an inside and outside inverting route composed of a first route which is branched from the document carrying passage of the outer periphery of the first cylinder after having passed the first exposure portion so as to extend, a second route which is branched from the document carrying passage of the outer periphery of the second cylinder before passing the second exposure portion so as to extend, a third route having the two branch routes merged, normal, reverse carrying means is provided in the third route, the carrying direction of the document to be carried from the first route by the carrying means is inverted to carry the document to the second route so as to make it possible to expose in the second exposure portion the other face opposite to one face of the document exposed on the first exposure portion, and carrying route selecting means is respectively provided, at a branch point between the first route and the carrying passage on the outer periphery of the first cylinder, and at a branch point between the document carrying passage on the outer periphery of the second cylinder after having passed the second exposure portion and the carrying passage of the third carrying passage means, to make it possible to select the carrying direction of the document, so that the number of the exposing of the same face of the document in each exposure portion may be selected.

According to the present apparatus, the route between the first exposure portion may be shortened, so that the duplex document may be copied at a high speed. The exposure of one time only or the exposures of the required time in the first exposure portion and the second exposure portion may be effected by the operation of the gate flapper, so that a plurality of documents may be copied at a high speed.

Fourthly, the present invention provides a circulating type of automatic document feeding apparatus described in claim 1, wherein a by-pass route for carrying the document without passing the inside, outside inversion route from the first exposure portion to the document hopper is provided on the second carrying means.

According to the apparatus, as the document inversion route and the by-pass route are provided between the first exposure portion and the route to the document hopper, a plurality of duplex documents may be copied at a high speed by passing the document inversion route when they are exposed in the second exposure portion continuously after they have been exposed in the first exposure portion in the copying operation of the plurality of the duplex documents. When the other face is exposed in the second exposure portion after the single face of the whole document has been copied through the exposure in the first exposure portion, the document may be returned to the document hopper through the by-pass route after the exposure has been exposed in the first exposure portion to shorten the copying time. Also, even when the copying operation is effected from the simplex document, the copying time may be shortened by the passing of the simplex document through the by-pass route.

Fifthly, the present invention provides a duplex copying apparatus provided with a circulating type of automatic document feeding apparatus described in claim 1, wherein a circulating type of automatic document feeding apparatus is engaged with the duplex copying machine main body provided with an optical system having a light source or the like which is selectively moved into the first exposure portion and the second exposure portion of the circulating type of automatic document feeding apparatus, a copy sheet accommodating portion, copy sheet feeding means for feeding sheets one by one from the copy sheet accommodating portion, copy process processing means arranged on the periphery of the photosensitive member, discharge carrying means for discharging onto the tray the copy sheet with images being copied thereon by the copy process processing means, copy sheet circulation means, which is branched from the discharge carrying means, for carrying the copy sheets to circulate the copy sheets to the copy process processing means again after the copy sheets have been accommodated on the intermediate tray, copy sheet inverting means which is provided on the above-described copy sheet circulation carrying means inverts the carrying direction of the copy sheet to exhibit the other face of the copy sheet having the images copied on its one face when the document is exhibited again at the copy process step, and carrying passage selecting means for selecting whether or not it should circulate to the copy sheet circulation carrying means.

By the above-described apparatus, the copy sheet may be carried in mutual operative cooperation with the carrying operation of the document by the circulating type of automatic document feeding apparatus. Particularly, in the case of the duplex copying operation, the sheet with its one face being copied is inverted through the circulation carrying route. Thereafter, it is accommodated in the intermediate tray, and is carried again to the copy process means in synchronization with the document from the intermediate tray, so that the duplex copying may be easily made. In addition, as the copy sheets copied may be discharged onto the tray in the sequential order of the pages from the page-arranged documents, the complicated operation of arranging the inside and outside of the pages is not required to be effected, thus resulting in considerable reduction in operation troubles by the operation. Furthermore, four types of copying operations, i.e., duplex copying from the duplex document onto the copy sheet, simplex copying from the duplex document onto the copy sheet, duplex copying from the simplex document onto the copy sheet, and simplex copying from the simplex document, may be effected through the operative cooperation of the duplex copying operation in accordance with the types duplex document, simple document) and the copying method of the documents to be fed by the circulating type of automatic document feeding apparatus.

Sixthly, the present invention provides an automatic duplex copying apparatus provided with a circulating type of automatic document feeding apparatus described in claim 5, wherein a controlling apparatus is provided which receives key input signals corresponding to the desired copy contents of the operator and also detection signals from a document detection sensor provided in the desired position of the circulating type of automatic document feeding apparatus and the duplex copying machine to select the carrying route of the document and the carrying route of the copy sheet so as to control driving means such as a motor for driving the carrying roller for respective documents, copy sheets, and a solenoid or the like for operating the respective gate flappers, the controlling apparatus is adapted to selectively operate four types of copying operations, i.e., copying operation from the duplex document to both faces of the copy sheet, simplex copying from the duplex document, duplex copying from the simplex document, and simplex copying from the simplex document.

By the provision of the above-described controlling apparatus, in accordance with the desired copy contents through the key operations by the operator, the circulating type of automatic document feeding apparatus is operatively cooperated mutually with the duplex copying machine main body to allow it to be selectively performed by the simple selecting operation to effect four types of copying operations, i.e., copying operation from the duplex document onto both face of the copy sheet, simplex copying from the duplex document, duplex copying from the simplex document, and simplex copying from the simplex document, in which one faces of the document is exposed in the first exposure portion, continuously the other face of the document is exposed in the second exposure portion, or a mode in which each one face of all the ones of a plurality of documents is exposed in the first exposure portion to copy on the copy sheet, then each other face of all the documents is exposed in the second exposure portion to perform the copying operation when the copying operation is effected from the duplex document through the controlling operation by the controlling apparatus.

Seventhly, the present invention provides a duplex copying apparatus provided with a circulating type of automatic document feeding apparatus described in claim 6, wherein the controlling apparatus is provided with changeover means for selecting the copying mode in accordance with the construction of the circulating type of automatic document feeding apparatus, or in accordance with a case where the document is accommodated with the face being upward within the document hopper, and a case where the document is accommodated with the face being downward.

By the apparatus, a circulating type of automatic document feeding apparatus, wherein a document is accommodated within the document hopper, the feeding operation may be effected from the document on the topmost side, the exposure-finished document is adapted to return onto the lowermost side of the document which is set within the document hopper or a circulating type of automatic document feeding document hopper or a circulating type of automatic document feeding apparatus, wherein the document is accommodated within the document hopper, the feeding operation is effected from the document on the bottommost side to return the exposed document to the topmost side of the document which is set within the document hopper, may be engaged with the duplex copying machine main-body. The above-described four types of copying operations may be made even when either of the circulating type of automatic document feeding apparatuses has been engaged with.

Eighthly, the present invention provides an automatic duplex copying apparatus provided with a circulating type of automatic document feeding apparatus described in claim 6, wherein a change-over means for the copying mode composed of select switch or the like is provided on the controlling apparatus, when the duplex copying operation is effected from the duplex document, a copying mode in which copy sheets accommodated in the intermediate tray are circulated again to the copying process means after the one face of the whole document has been copied on one face of the copying sheet in the first exposure portion so as to copy the other face of the whole document on the other face of the copy sheet in the second exposure portion, and a copying mode in which, after the document has been copied on one face for each sheet on one face of the copy sheet in the first exposure portion, the document is inverted to copy the other face on the other face of the copy sheet in the second exposure portion, the step is sequentially performed for each document sheet, may be selected.

By the copying mode change-over means provided, two types of copying modes become selectable, when the circulation route of the copy sheet of the copying machine main-body is short, the duplex copying operation may be made at a high speed through the adoption of the copying mode to be described later. Also, when the copying mode has been adopted, the period of maintenance inspection may be made longer, because the switching operation between the first exposure portion of the optical system on the side of the copying machine main body and the second exposure portion thereof is fewer in number.

Ninthly, the present invention provides an automatic duplex copying apparatus provided with a circulating type of automatic document feeding apparatus described in claim 6, wherein a switching means for the copying mode is provided on the controlling apparatus, when the simplex copying operation is effected from the duplex document, a first copying mode in which these copying sheets are accommodated in the intermediate tray after the one face of the whole document has been copied on the copy sheet in the first exposure portion, then the other face of the whole document is copied on the copy sheet in the second exposure portion alternately with the discharging operation of the copy sheet accommodated in the intermediate tray to discharge the copy sheet with the document being copied thereon in the sequential order of the pages to the offset tray, and a second copying mode in which a first step of discharging the copy sheet after the documents have been copied for each face at its one face on the copy sheet, in the first exposure portion, a second step of inverting the document to carry the other face to the second exposure portion to copy the other face on the following copy sheet being carried to discharge it are sequentially effected for each document, may be selectable.

By the above-described apparatus, the two types of copying modes may be adopted through selection when the simplex copying operation is effected from the duplex document, thus having the similar operation to the one described in claim 8.

Tenthly, the present invention provides an automatic duplex copying apparatus provided with a circulating type of automatic document feeding apparatus described in claim 5, wherein a third exposure portion is provided to expose book items or sheet documents which can not be fed in the circulating type of automatic document feeding apparatus; the first exposure portion, the second exposure portion, and an optical system which selectively moves to the third exposure portion are provided.

According to the above-described apparatus, documents which can not be copied through the feeding operation of the circulating type of automatic document feeding apparatus may be copied, thus improving the utility.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3, 4, and 5 are construction views, each showing a modified example of a document retaining mechanism into the cylinder of the document presentation portion;

FIGS. 6(I), 6(II) and 6(III) show perspective views of the document retaining mechanism of FIG. 5, 6(I) shows a perspective view of the document cylinder, 6(II) shows a partially enlarged view of the document cylinder, and 6(III) shows a perspective view of an electrode brush;

FIG. 11(I) is a flow chart for illustrating the flow of the program and FIG. 11(II) is a flow chart showing respective copying mode;

FIGS. 12(I) through 12(VIII) are operation pattern views showing the DD1 mode of the face-down in the first embodiment;

FIGS. 15(I) through 15(X) are operation pattern views of the DD2 mode, of the face-down;

FIGS. 17(I) through 17(X) are operation pattern views of the DS1 mode of the face-down in the first embodiment;

FIG. 18 is a flow chart of the DS1 mode;

FIGS. 19(I) through 19(VII) are operation pattern views of the DS2 mode of the face-down in the first embodiment;

FIGS. 21(I) through 21(XII) are operation pattern views of the DS mode of the face-down in the first embodiment;

FIGS. 23(I) through 23(V) are operation pattern views of the SS mode of the face-down in the first embodiment;

FIG. 24 is a flow chart of the SS mode;

FIGS. 25(I) through 25(VIII) are operation pattern views, each showing the DD1 mode of the face-up in the first embodiment;

FIGS. 26(I) through 26(X) are operation pattern views, each showing the DD2 mode of the face-up in the first embodiment;

FIGS. 27(I) through 27(X) are operation pattern views, each showing the DS1 of the face-up in the first embodiment;

FIG. 28 is a flow chart of the DS1 mode;

FIGS. 29(I) through 29(VII) are operation pattern views, each showing the DS2 mode of the face-up in the first embodiment;

FIGS. 31(I) through 31(XII) are operation pattern views, each showing the SD mode of the face-up in the first embodiment;

FIGS. 38(I) through 38(VIII) are operation pattern views, each showing the DD1 mode of the face-down in the second embodiment;

FIGS. 39(I) through 39(VIII) are operation pattern views, each showing the DD2 mode of the face-down in the second embodiment;

FIGS. 40(I) through 40(X) are operation pattern views, each showing the DS1 mode of the face-down in the second embodiment;

FIGS. 41(I) through 41(VII) are operation pattern views, each showing the DS2 mode of the face-down in the second embodiment;

FIGS. 42(I) through 42(XII) are operation pattern views, each showing the SD mode of the face-down in the second embodiment;

FIGS. 43(I) through 43(V) are operation pattern views, each showing the SS mode of the face-down in the second embodiment;

FIGS. 44(I) through 44(VIII) are operation pattern views, each showing the DD1 mode of the face-up in the second embodiment;

FIGS. 45(I) through 45(X) are operation pattern views, each showing the DD2 mode of the face-up in the second embodiment;

FIGS. 46(I) through 46(X) are operation pattern views, each showing the DS1 mode of the face-up in the second embodiment;

FIGS. 47(I) through 47(VII) are operation pattern views, each showing the DS2 mode of the face-up in the second embodiment;

FIGS. 48(I) through 48(VII) are operation pattern views, each showing the SD mode of the face-up in the second embodiment;

FIGS. 49(I) through 49(VI) are operation pattern views, each showing the SS mode of the face-up in the second embodiment;

FIGS. 50(I) is a whole construction view of the duplex copying apparatus provided with the circulating type of automatic document feeding apparatus in the first embodiment of the present invention, and FIG. 50(II) is a partially enlarged view of FIG. 50(I);

FIGS. 53(I) through 53(VI) are operation pattern views, each showing the DD1 mode of the face-up in the third embodiment;

FIGS. 55(I) through 55(VI) are operation pattern views, each showing the ADF mode.

DETAILED DESCRIPTION OF THE INVENTION

Figure 1:
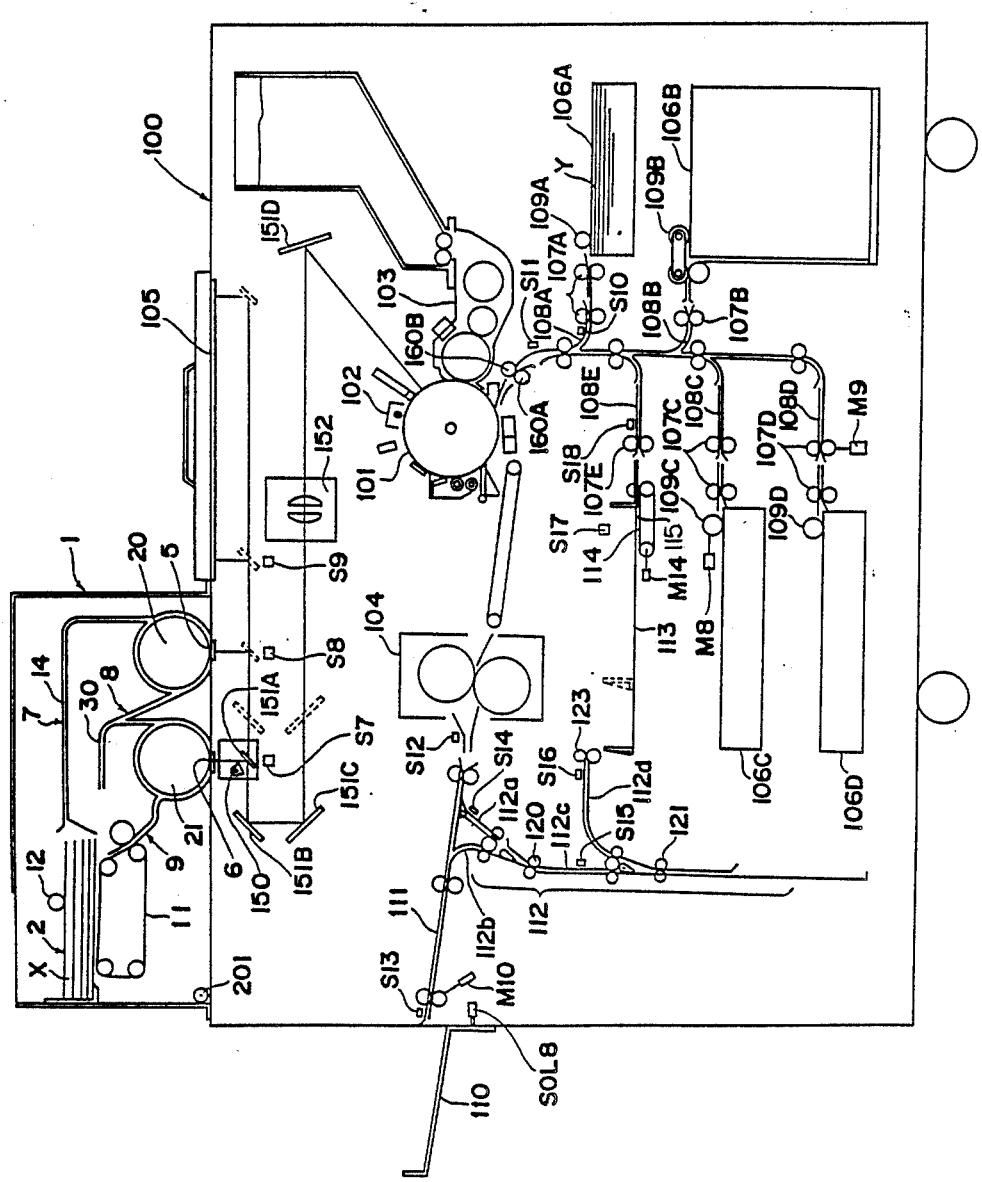
FIG. 1 is a construction view showing a first embodiment of a duplex copying apparatus provided with a circulating type of automatic document feeding apparatus in accordance with the present invention.

Before the description of the present invention proceeds, it is to be noted that like parts are designated by like reference numerals throughout the accompanying drawings.

(Circulating Type of Automatic Document Feeding Apparatus)

Figure 2:
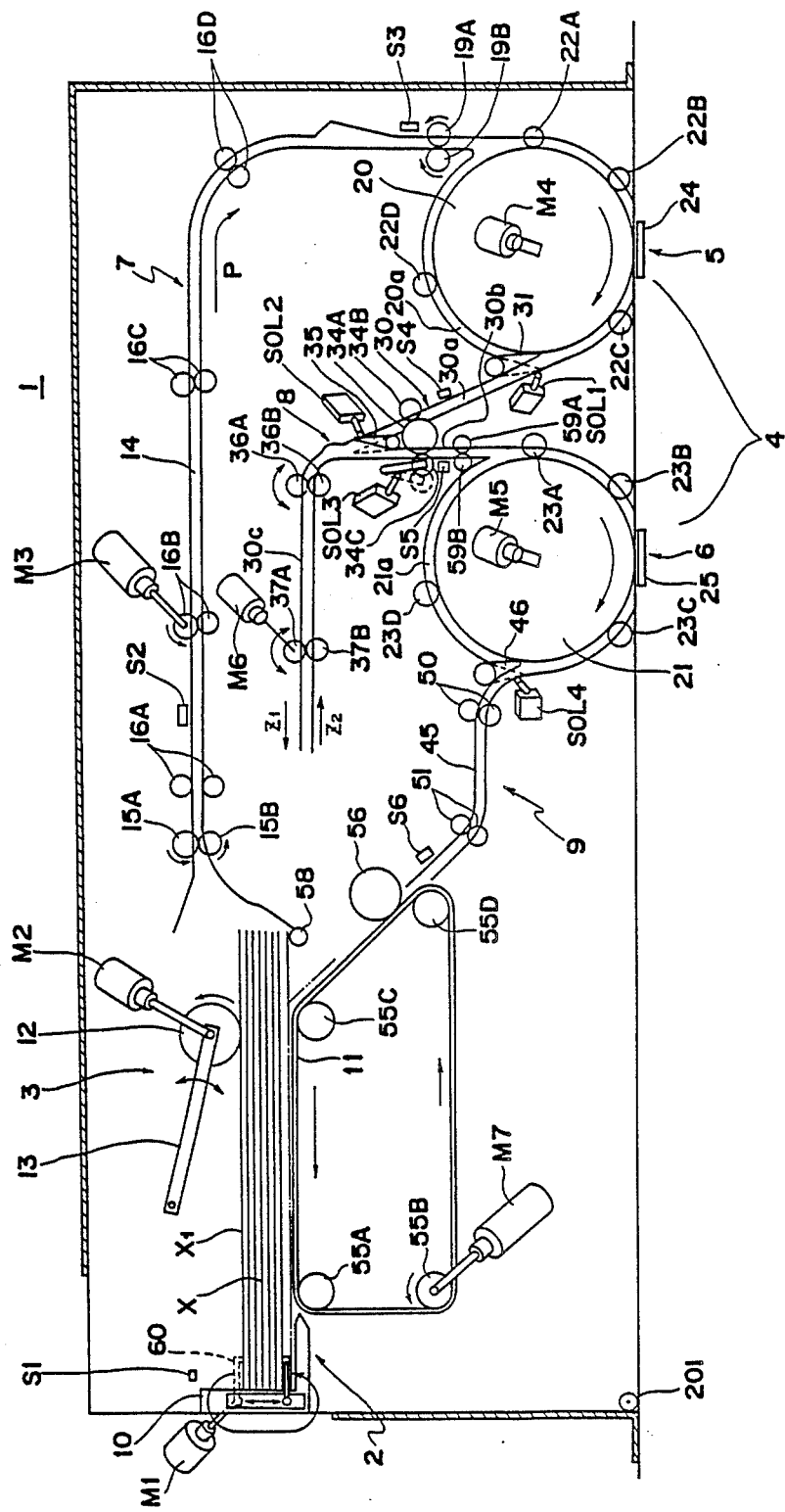
FIG. 2 is a construction view showing a circulating type of automatic document feeding apparatus of a first embodiment.

Referring now to the drawings, there is shown in FIGS. 1 and 2, a duplex copying apparatus provided with a circulating type of automatic document feeding apparatus (RDH) according to a first embodiment of the present invention, which includes a hopper 2, a document feeding means 3 for feeding documents one by one from the document hopper 2, a document presentation portion provided with a first presentation portion 5 and a second presentation portion 6 each having the document exhibited, a first carrying means 7 for carrying the document from the document hopper 2 to the first presentation portion 5, a second carrying means 8 positioned from the first presentation portion 5 to the second presentation portion and including an inversion means which inverts the document presentation face, and a third carrying means 9 for returning the document form the second presentation portion 6 to the document hopper 2.

The document hopper 2 is adapted to receive the document placed on the document carrying belt 11 with a plurality of sheet documents X in page-sequential order composed of the duplex document being arranged at their edges (left-hand edges in FIG. 1) by a side-edge aligning member 10. A sheet-feeding roller 12 composed of a document sheet-feeding means 3 is provided above the document hopper 2 to separate and feed the sheet documents X, placed within the document hopper 2, sequentially to the first carrying means 7 one by one from the topmost side. The sheet-feeding roller 12 is rotatably driven in the direction of an arrow at a timing specified by a document delivery motor M2. The sheet-feeding roller is depressed against the sheet document X on the topmost side through a lever 13 by the force of a solenoid or the like during the rotation so that it is sequentially separated and fed to the first carrying means 7 from the sheet manuscript $X_1$. It is to be noted that the sheet-feeding roller 12 may be always put in contact against the sheet document by the weight of the roller.

The first carrying means 7, to which the sheet documents X are fed one by one from the sheet-feeding roller 12 from the document hopper 2, is provided with a carrying passage curved in the downward vertical direction from the horizontal direction, and is curved again the horizontal direction so as to invert the top and bottom of the document as shown. Manipulating rollers 15A, 15B, for preventing the sheet documents X from being overlappingly fed, are disposed near the front end on the entrance side of the carrying passage k4. The upper-side roller 15A is rotated in its carrying direction and the lower-side roller 15B is inversely rotated so that the sheet document X are positively fed to the carrying passage one by one through the passing operation between these rollers. A respective pair of carrying rollers 16A, 16B, 16C and 16D are provided at intervals in their carrying directions in the carrying passage 14. Each respective pair of rollers 16A through 16D are rotatably in contact against both faces of the sheet documents X to cause the rollers 16A through 16D to rotate by a document carrying motor M3 for carrying the documents X in their arrow direction P along the carrying passage 14 through the guiding operation by each of the rollers. A document feed detecting sensor S2 is disposed close to the entrance side of the carrying passage 14, while a detecting sensor S3 located before the first exposure portion is disposed close to the exit side. Also, a pair of resist rollers 19A, 19B are disposed on the exit portion (near the first presentation portion 5) of the carrying passage 14. The resist rollers 19A, 19B (not shown) are coupled through a clutch to the driving shaft so that the rotation is set to be stopped and rotated again by the on and off control of the clutch CLT 1. The on and off control of the clutch is effected in accordance with the desired copy contents of the operator. When the exposure of the sheet documents X is required, the rotation of the rollers 19A, 19B are stopped, for the synchronous operation with copy sheets, to once stop the sheets documents X to rotate them again after the synchronous operation with copy sheets has been effected so as to feed the documents to the first presentation portion 5. On the other hand, when the exposure of the sheet document X is not necessary, the rollers 19A, 19B are normally rotated to cause the sheet documents X to pass without stopping.

A document portion 4 is composed of a first presentation portion 5 (hereinafter referred to as a first exposure portion 5) and a second presentation portion 6 (hereinafter referred to as a second exposure portion 6), which are correspondingly provided on the respective vertical lower end faces of a first document cylinder 20 and a second document cylinder 21 disposed in parallel at an interval in the horizontal direction, with the first exposure portion 5 and the second exposure portion 6 being located on the same plane as shown.

The respective document cylinders 20, 21 are respectively driven rotatably in the arrow directions of the drawings at a speed synchronized with the copying speed of a copy sheet by document carrying motors M4, M5. Inverted rollers 22A through 22D, and 23A through 23D are disposed respectively at constant intervals along the external peripheral faces of respective document cylinders 20, 21. The sheet documents X are windingly depressed against the external peripheral faces of the document cylinders 20, 21 by these inverted rollers, so that the documents X are adapted to be carried along the carrying passages 20a, 21a of the external peripheral faces of the document cylinders 20, 21. Hard transparent glasses 24, 25 are disposed vertically downwardly of the carrying passages 20a, 21a to form the above-described first exposure portion 5 and the second exposure portion 6. When the sheet documents X pass between the document cylinder 20 and the exposure glass 24, the top faces of the sheet documents X are exposed to form the top-face images, while when they pass between the document cylinder 21 and the exposure glass 25, the under faces of the sheet documents X are exposed to form underface images as described later.

It is to be noted that the sheet document X may pass as it is without being exposed in accordance with the desired copy contents of an operator in the first and second exposure portions 5, 6.

In the first exposure portion 5 of the document presentation portion 4, the sheet documents X are wound on the first document cylinder 20 by the rotating force of the resist rollers 19A, 19B for the carrying operation from the carrying passage 14 of the first carrying means 7. As shown, between the first exposure portion 5 and the second exposure portion 6 are disposed a second carrying means 8 provided with an inside, outside inversion route portion (hereinafter referred to as a switch back route portion) 30, which inverts the presentation faces of the sheet documents X. The inside, outside inversion route portion 30 is composed of a first route 30a and a second route 30b, which extend upwardly with upward inclination respectively from the portions opposite to the external peripheral carrying passages 20a and 21a of the first document cylinder 20 and the second document cylinder 21, a third route 30c which extends in the horizontal direction from a junction point of the routes 30a and 30b. A gate flapper 31 is provided in the entrance portion of a route 30a leading to the carrying passage 20a of the first document cylinder 20. The gate flapper 31 is operated by a solenoid SOL 1 so as to selectively carrying the sheet documents X onto the route 30a or the carrying passage 20a of the first document cylinder 20. Namely, when the sheet document X, which has passed through the first exposure portion 5, requires one exposure in accordance with the desired copy contents of the operator, the gate flapper 31 is operated into the solid-line operation shown so as to carry the sheet document X into the route 30a. When a plurality of exposures are required for the documents, the gate flapper 31 is operated into a chain-line position shown so as to rotate by a plurality of times along the external peripheral carrying passage 20a of the first document cylinder 20. After the completion of the exposures, the gate flapper 31 is operated into a solid line position to carry the sheet documents X into the route 30a. A first exposure-portion rear-detection sensor S4 which detects the rear end of the sheet document X, a pair of rollers 34A and 34B, and a gate flapper 35 are sequentially provided from the upstream side on the route 30a. The following inside, outside inversion operation (switch back operation) is controlled by the detection signal of the detection sensor S4.

The sheet documents X are carried into the route 30c through the gate flapper 35 by the rotation of the rollers 34A and 34B disposed, with the rollers 36A, 37A normally being inversely rotated by a motor for document inversion use M6. These carrying rollers advance the sheet document X, which has come from the gate flapper 35, into the route 30c in an arrow direction $Z_1$. Thereafter, when the rear end of the sheet document X has passed the tip end portion of the gate flapper 35, the motor M6 is inverted to carry the sheet document X in the inverse arrow direction $Z_2$. At this time, the gate flapper 35 is operated into a position for closing the route 30a, shown by a solid line in the drawing, by a solenoid SOL2 to retain the carrying operation onto the side of the route 30b of the sheet document X. The route 30b has the roller 34C disposed. The roller 34C is separated by a solenoid SOL3 so that it may become a pair of the roller 34A. The switch back operation described hereinabove is performed in the document by the normally reversely rotating roller, and may be effected by, for example, a belt carrying apparatus, an air carrying apparatus, or the like.

The sheet document X is wound on the second document cylinder 21 by the rotating forces of the rollers 34A, 34C to be guided to the second exposure portion 6. A detection sensor S5 before a second exposure-portion provided for detecting the passing of the rear end of the sheet document X is disposed in the downstream position of the roller 34C.

A pair of resist rollers 59A, 59B are provided downstream of the sensor S5. The resist rollers 59A, 59B (not shown) are coupled through a clutch CLT 2 to a driving shaft, so that the rotation is set to stop and rotate again by the on and off control of the clutch CLT 2. The turning on and off of the clutch CLT 2 is controlled in accordance with the desired copy contents of the operator. When the exposure of the sheet document X is necessary, the rotation of the rollers 59A, 59B is stopped, for synchronism with the copy sheet, to once stop the sheet document X. After the synchronism with the copy sheet has been provided, it is rotated again to feed the document to the second exposure portion 6. When the exposure of the sheet document X is unnecessary, the rollers 59A, 59B are always rotated to pass the sheet document X without stopping. The operation of the solenoid SOL 3 is controlled in accordance with the rotating operation of the rollers 59A, 59B.

As described hereinabove, the carrying direction of the sheet document X is inverted at the switch back carrying passage 30 to cause the top-face side of the sheet document X to come into contact against the outer peripheral face of the second document cylinder 21 so that the under face side of the sheet document X becomes the external face side to be wound around the second document cylinder 21. In the second exposure portion 6, the under face side of the sheet document X is exposed to form the underface images. It is to be noted that in the second exposure portion 6, the sheet document may be sometimes caused to pass and advance without being exposed in accordance with the desired copy contents of the operator.

After it has passed the second exposure portion 6 of the second document cylinder 21, the external peripheral carrying passage 21a is branched from the carrying passage 45 of the third carrying means 9 for the connecting operation, and the gate flapper 46 is operated on the branch portion. The gate flapper 46 is operated by a solenoid SOL 4 to selectively open and close the carrying passage 45 and the external peripheral carrYing passage 21a. Namely, in accordance with the copy contents of the operator, the carrying passage 21a is closed to feed the sheet document X to the carrying passage 45 when the exposure in the second exposure portion 6 is one time only. When a plurality of exposures are effected, the carrying passage 45 is closed, it is fed to the carrying passage 21a, is rotated the necessary amount of times, and thereafter the sheet document X is carried to the carrying passage 45.

As described hereinabove, in the document presentation portion 4, the top face of the sheet document X is exposed in the first exposure portion 5 and the bottom face is exposed in the second exposure portion 6, so that both the top and bottom faces of the sheet content X may be copied. As the exposure may be made the necessary number of times in the first exposure portion 5 and the second exposure portion 6, a plurality of necessary sheets may be copied.

The carrying passage 45 of the third carrying means 9 for returning the sheet document X into the document hopper 2 from the second exposure portion 6 is connected with the lower end tip-end portion of the carrying belt 11, so that the sheet document X may be carried into the carrying belt 11. Namely, the respective pair of carrying rollers 50, 51 are disposed on the carrying passage 45 to advance the sheet document X. A detecting sensor S6 before a document hopper-return, which is adapted to detect the passing of the sheet document X, is provided near the exit of the carrying passage 45. The detection signal of the detection sensor S6 is adapted to control the operation control portion of the carrying belt 11 of the document hopper 2.

The carrying belt 11 is entrained on driving rollers 55A, 55B, 55C, and 55D disposed vertically and horizontally as shown. The driving roller 55B is rotated in its arrow direction by a return carrying motor M7 to drive the carrying belt 11 in its arrow direction for the circulation driving operation, with the motor M7 being driven by the detection signal of the detection sensor S6. The top side face of the carrying belt 11 composes the placement portion of the sheet document X. A document inducing roller 56 is provided in a position adjacent to the carrying passage 45. The sheet document X is adapted to be fed into the lowermost side of the sheet document X placed and on the top face of, the carrying belt 11 by the carrying force by the rollers 56 and the carrying belt 11. At this time, a document rear-end jumping roller 58 is provided on the underside of the rear-end position of the sheet document X as is smoothly delivered, so that the rear-end portion underside of the accumulated sheet document X may be floated and the opening for the feeling operation into the lowermost end portion may be positively provided widely. When the tip end of the sheet document X fed into the lowermost end position has reached a side-portion aligning member 10 for aligning the edge portions, a motor M7 for driving the carrying belt 11 comes to a stop to stop the sheet document X.

Also, a detecting actuator 60 for detecting one circulation of the sheet document X placed as shown is placed on the document hopper 2. The actuator 60 is located in the lower-end position, shown by a solid line in the drawing, before the sheet document X is placed into the hopper 2 by the operator, so that the sheet document X is placed on it. The sheet documents X are delivered one by one and are sequentially raised as they return again respectively. They arrive at the its topmost position, as shown by the dotted line in the drawing, when all the sheet documents X have made one circulation. The actuator 60, reaching the topmost position, is detected by a document hopper so as to generate a detection signal which shows the completion of one circulation. The signal is used to control the operation on the side of a copying machine main body for the desired number of copy sheets by the operator. Thereafter, the actuator 60 rotates by 180° through the driving operation of a document one-circulation detection actuator driving motor Ml to return the sheet document X into the lowermost side position (the original position) of the sheet document X.

The document retaining mechanism of the first document cylinder 20 and the second document cylinder 21 may be constructed as shown in the modified examples of FIGS. 2 through 6 without being restricted to such construction as shown in FIG. 2.

Figure 3:
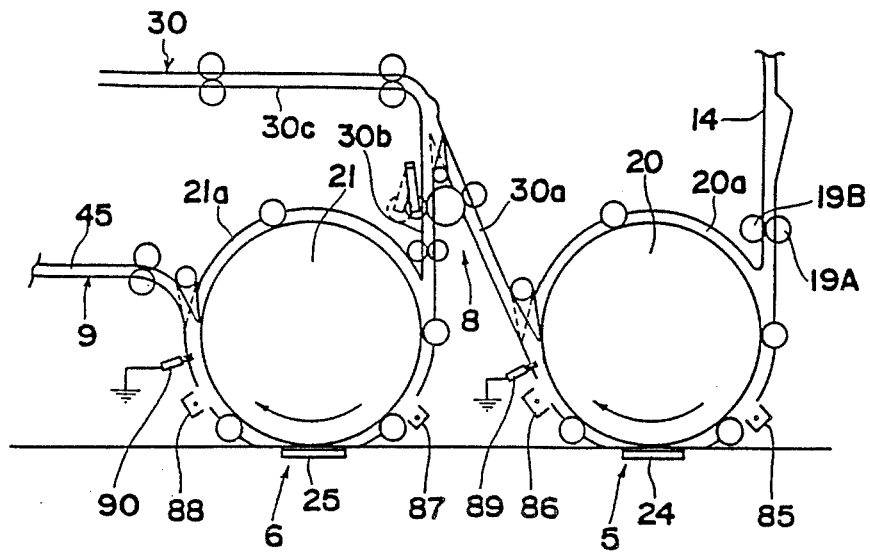

In the modified embodiment shown in FIG. 3, chargers 85 and 87, and power removers 86 and 88 are respectively provided on the entrance portion and the exit portion of the first exposure portion 5 of the first document cylinder 20 with the surfaces of the first and second document cylinders being insulated, similarly on the entrance portion and the exit portion of the second exposure portion 6 of the second document cylinder 21. The surfaces of the document cylinders of the first exposure portion 5 and the second exposure portion 6 are electrically charged and removed to adhere the sheet documents X on the document cylinders 20 and 21, or to separate the documents from them. Also, the power removing brushes 89 and 90 are set in the respective downstream positions of the power removers 86 and 88 of the exit portion to remove the electric charge on the surfaces of the document cylinders 20 and 21 to remove the adhering force onto the document cylinder.

When the document is carried to the carrying passage 20a (21a) of the document cylinder 20 (21), the power-removing brushes 89 and 90 required to be kept away from the carrying passage 20a (21a) or the earth of the power-removing brushes are required to be removed, with the gate flapper 31 (46) being moved to the position of the chain line, the power removers 86 and 88 being turned off.

Figure 4:
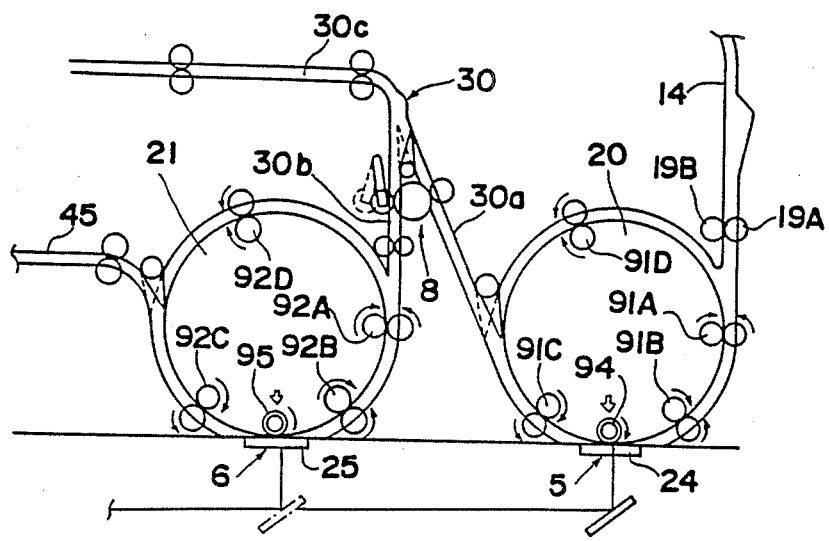

In the modified embodiment shown in FIG. 4, the document cylinders 20, 21 are composed of cylindrical paper guides fixed without being rotated. The carrying rollers 91A through 91D, and 92A through 92D are rotatably driven in the arrow direction and are disposed on the external peripheral portion of the cylinders 20, 21 by these carrying rollers. Depressing rollers 94 and 95 are provided on the first exposure portion 5 and the second exposure portion 6. These rollers depress the documents X through the light pressure application against the glass faces 24, 25 to effect the exposure.

In the other embodiment shown in FIG. 5 and FIG. 6(I) through 6(III), +electrode 96A and −electrode 97A are pasted (or on the cylinder external peripheral surface) on the external peripheral faces of the document cylinders 20 and 21, these electrodes 96A and 97A are respectively connected with +electrode terminal 96B and −electrode terminal 97B disposed near both ends. The documents X are wound on the manuscript cylinders 20 and 21 by the use of static electricity through the application of the voltage upon these electrode terminals. At this time, the document cylinders 20 and 21 are normally rotated, and the voltage is applied by +electrode brush 96C and −electrode brush 97C upon the electrode terminals 96B and 97B. In FIG. 6, reference character 98A shows Teflon coating region for the protection of the electron, reference character 98B represents −electrode exposure region, reference character 99A depicts an electrode plate, reference character 99B represents conductive fiber, and reference character 79 is a DC power supply which is controlled in on and off, when necessary, by the I/O 203 of FIG. 8.

Also, the documents X which have finished being exposed are peeled off from the document cylinder by peeling pawls 31, 46. In the present modified embodiment, an improvement is performed in this point. The voltage to be applied upon the electrode is cut off at a time point when the tip end of the sheet document X has passed the rollers 77, 78 in the downstream of the exposure position so as to peel off the sheet document from the document cylinders 20, 21. The carrying force is given to the documents X by the rollers 77, 78 and the document cylinders 20, 21. Also, the gate flappers are not always needed in each embodiment when the thickness, waist-strength of the document, and furthermore the diameter of the cylinder are properly selected.

It is to be noted that instead of the document cylinders, belt carrying means of an air suction type or grip carrying means for carrying the document with the tip end being grasped by a grip or the like may be used.

(Duplex Document Copying Apparatus)

FIG. 1 shows the construction of the both-face copying apparatus which is provided with the above-described circulation type of automatic document feeding apparatus (hereinafter referred to as RDH). The RDH1 is rotatably mounted above with a rotation shaft 201 as a center with respect to the copying machine main body 100 on the lower end portion on the side face of the RDH1 and is fixed in the position of FIG. 1 during the copying operation. The opening and closing operations are effected when the document jam has been caused, the split releasing may be effected so as to open the carrying passages 20a, 21a. A photosensitive member drum 101 is rotatably provided at the central portion within the copying machine main body 100, with a changing charger 102, a developing apparatus 103 and so on, together with various copying process portions which are image forming means, being provided on the external peripheral portion, and a fixing apparatus 104 being provided on the left-hand side portion in the drawing. A circulation type automatic document feeding apparatus 1 in the first embodiment is provided on one side portion on the top face of the copying machine main body 100, with the first exposure portion 5 and the second exposure portion 6 which are downwardly disposed vertically of the first document cylinder 20 and the second document cylinder 21 of the apparatus 1 are disposed in parallel on almost the same plane of the top end face of the main body 100. Also, a third exposure portion 105 corresponding to the book document is provided on the other side portion on the top face of the copying machine main body to constitute an optical system having an exposure system of two series.

The sheet feed cassettes 106A and 106B, each being different in accommodation size for the copy sheet Y, are engaged on one side face of the copying machine main body 100, the sheet feed cassettes 106C and 106D are also engaged on the left-hand side. The copy sheets Y placed within the sheet feed cassettes 106A through 106D are picked up from the top to feed the sheets to the sheet feed routes 108A through 108D. The sheet feed rollers 109A through 109B disposed on the top face of each of the sheet feed rollers 106A through 106D are respectively rotated selectively by driving means such as M8 for the sheet feed driving use so as to feed the sheets one by one to the sheet feed routes 108A through 108D. The resist rollers 160A, 160B provided on the carrying route between the sheet feed routes 108A through 108D and the photosensitive member drum 101 are coupled to the motor M9 through the clutch CLT 2 which is not shown in FIG. 1, so that the images on the photosensitive member and the copy sheet Y may be carried controllingly synchronous relation. Rollers 107A through 107E for sheet carrying use are disposed on the sheet feed routes 108A through 108D and the sheet feed route 115 from an intermediate tray 113 to be described later. These carrying rollers are rotatably driven by a driving motor M9 to feed the copy sheet Y to the copy process step. An offset tray 110 is provided on the other side face of the copying machine main body 100, and has a solenoid SOL 8 mounted. When the solenoid SOL 8 is on for a given time, the offset tray 110 is shifted in the direction on this side of the sheet face in FIG. 1. Then, when the solenoid SOL 8 is turned on for a given time, it is shifted in the direction on the reverse side of the sheet. Thus, the offset tray 110 is able to receive with a plurality of copy sheets Y being sorted out with respect to one portion of the documents. The sheets are fed to the offset tray 110 for the copy process portion, with a discharge route 111, which discharges the copy sheet Y through the image receiving means, the fixing apparatus 104, and a copy sheet inside, outside inverting route (switch back route) 112 branched from the discharging route 111. The copy sheet Y passes the copy process portion and the fixing apparatus 104. The copy sheets Y which have the document copied on one face are discharged into the offset tray 110 by the following three types of methods in accordance with the desired copy contents of the operator.

(i) The copy sheet Y is discharged into the offset tray 110 after passing as it is through the discharge route 111.

(ii) After moving from the discharge route 111, the copy sheet Y is inverted by the switch back 112 so as to copy on the other side of the copy sheet Y, and is temporarily accommodated onto the intermediate tray 113 to be carried to the copy process again. The copy sheet Y accumulated on the intermediate tray 113 is fed into a recarrying route 115 by the sheet feed roller 114, which is rotatably driven by a motor M14 sequentially from the lowermost portion, is fed into the copy process, and passes through the fixing apparatus 104 to pass the discharge route 111 for discharging into the offset tray 110.

(iii) After moving from the discharge route 111, the copying sheet Y is inverted in the switch back route 112. Thereafter, the sheet is discharged into the offset tray 110 from the discharging route 111.

Figure 7:
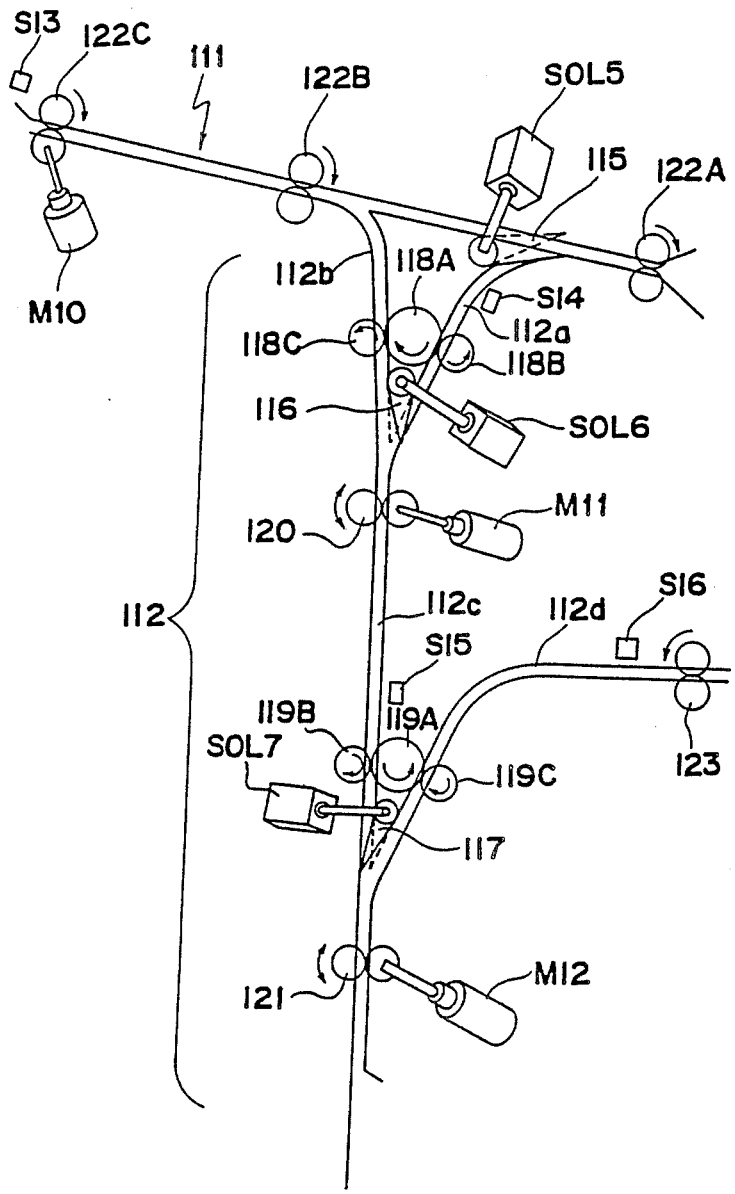
FIG. 7 is a partially enlarged view of FIG. 1.

In order to make the three above-described types of methods feasible to carry out, the discharge route 111 and the switch back route 112 are composed as shown in FIG. 7. Namely, the switch back route 112 is composed of routes 112a, 112b branched from two positions of the discharge route 111, a route 112c with these routes 112a, 112b being merged, a route 112d which is branched from the route 112c to lead to the intermediate tray 113. A gate flapper 115 is disposed in the branch portion of the route 112a and the discharge route 111, a gate flapper 116 in the branch position of the route 112a and 112b, and a gate flapper 117 is disposed in the branch position of the routes 112c and 112d, so that they are respectively operated by driving solenoids SOL 5, SOL 6, and SOL 7 to automatically select the carrying route of the copy sheet Y in accordance with the desired copy contents of the operator. Rollers 118A, 118B, and 118C are disposed near the branch portion of the routes 112a and 112b, rollers 119A, 119B, and 119C are disposed near the branch portion of the routes 112c, 112d to feed the copy sheet Y. Also, a roller 120 for inverting use is disposed on the route 112c near the branch portion of the routes 112a, 112b, is rotated in its normal, reverse way by the driving motor M11 to invert the carrying direction of the copy sheet Y, and an inverting roller 121 is provided in the downstream position of the branch portion between the route 112c and the route 112d to rotate in its normal, reverse way by the driving motor M12. A paper delivery detecting sensor S13 is disposed near the exit of the discharge route 111, sheet inversion detecting sensors S14, S15 are delivered near the entrance portion of the route 112a, and the route 112c are disposed near the entrance portion of the route 112a, and the route 112c, an intermediate tray entrance detecting sensor S16 are disposed near the exit of the route 112d. In the drawings, carrying rollers 122A through 122C are disposed along the discharge route 111, a carrying roller 123 is disposed on the route 112d. The carrying rollers 122A through 122 are driven by a motor M10 in synchronous relation, together with a copy process portion of photosensitive member drum 101 or the like and the fixing apparatus 104.

By the above-described construction, the route 112a is closed by the gate flapper 115 in the case of the above-described (i) so as to discharge the copy paper Y along the discharge route 111. In the case of the [ii], the discharge route 111 is closed by the gate flapper 115 to guide the copy sheet Y to the route 112a of the switch back route 112, the route 112c is opened by the gate flapper 116 to pass the paper Y through the route 112c to invert it in the carrying direction by the inverting roller 121, and the route 112d is opened by the gate flapper 117 to guide the copy sheet Y into the intermediate tray 113. In the case of the (iii), after the copy sheet Y has been guided into the route 112c, the carrying direction is inverted by the inverting roller 120 to open the side of the route 112b by the gate flapper 116 so as to guide the copy paper Y into the discharge route 111 from the route 112b.

An optical system provided on the copying machine main body 100 will be described hereinafter in further reference to FIG. 1. An optical apparatus system provided with a light source 150 for effecting a slit exposure of the document face, mirrors 151A, 151B, 151C, 151D and a lens 152 is disposed for its free scanning operation above the interior of the copying machine main body 100. In the optical apparatus system, the light of the light source 150 is applied upon the image face of the document X, the reflection lights are applied upon the surface of the photosensitive member drum 101 through mirrors 151A through 151D and the lens 152. Also, in the optical apparatus system, in accordance with the sheet document X of the circulation type of automatic document feed apparatus 1, the exposure portion 5 of the first document cylinder 20 and the second exposure portion 6 of the second document cylinder 21, or the exposure is effected, with the optical system being scanned when the book document or the like has been placed in the third exposure portion 105. These two systems are adopted, with the mirror system being driven by a driving motor M13 (not shown).

It is to be noted that the lens is composed of a self-focusing light transmission member array and so on with the top face of the photosensitive member as a belt photosensitive member being arranged parallel to the face formed by the first, second and third exposure portions, so that the images may be formed on the exposure member without the use of the mirrors.

In the present copying apparatus, detection sensors are provided in the respective positions. They are an optical system second exposure position detection sensor S7, an optical system first exposure position detection sensor S8, an OC portion document tip-end position detection sensor S9, a copy sheet hopper exit detection sensor S10, a detection sensor S11 before copy sheet transfer, a detection sensor after fixing S12, an intermediate tray in sheet existence detection sensor S17, and an intermediate tray exist detect sensor S18. Though not shown in FIG. 1, in the present apparatus, a clutch CLT 1 for delivering the document into the first exposure portion 5, a clutch CLT 2 for delivering the document into the second exposure portion 6 are provided within the circulation type automatic document feed apparatus 1, a copy sheet and a document tip-end exposure synchronizing clutch CLT 3 are provided within the copying machine main body 100.

By a duplex copying apparatus provided with the above-described circulating type automatic document feed apparatus, the copy operation may be freely effected by the circulating operation of the document a plurality of times in accordance with the desired copy contents of the operator even in either of:

(i) a plurality of assorted simplex copy sheets from simplex documents;
(ii) a plurality of associated duplex sheets from simplex documents;
(iii) a plurality of associated simplex sheets from duplex documents; and
(iv) a plurality of associated duplex sheets from duplex documents.

Also, the exposure is effected with the sheet document being wound around the document cylinder a plurality of times in accordance with the desired copy contents of the operator, so that a plurality of copies may be effected in one circulation of the sheet document.

Various types of copying modes will be described later. The controlling apparatus for the whole copying apparatus which may make it possible to effect various types of copying operations will be described hereinafter.

(Controlling Apparatus for Copying Apparatus)

Figure 8:
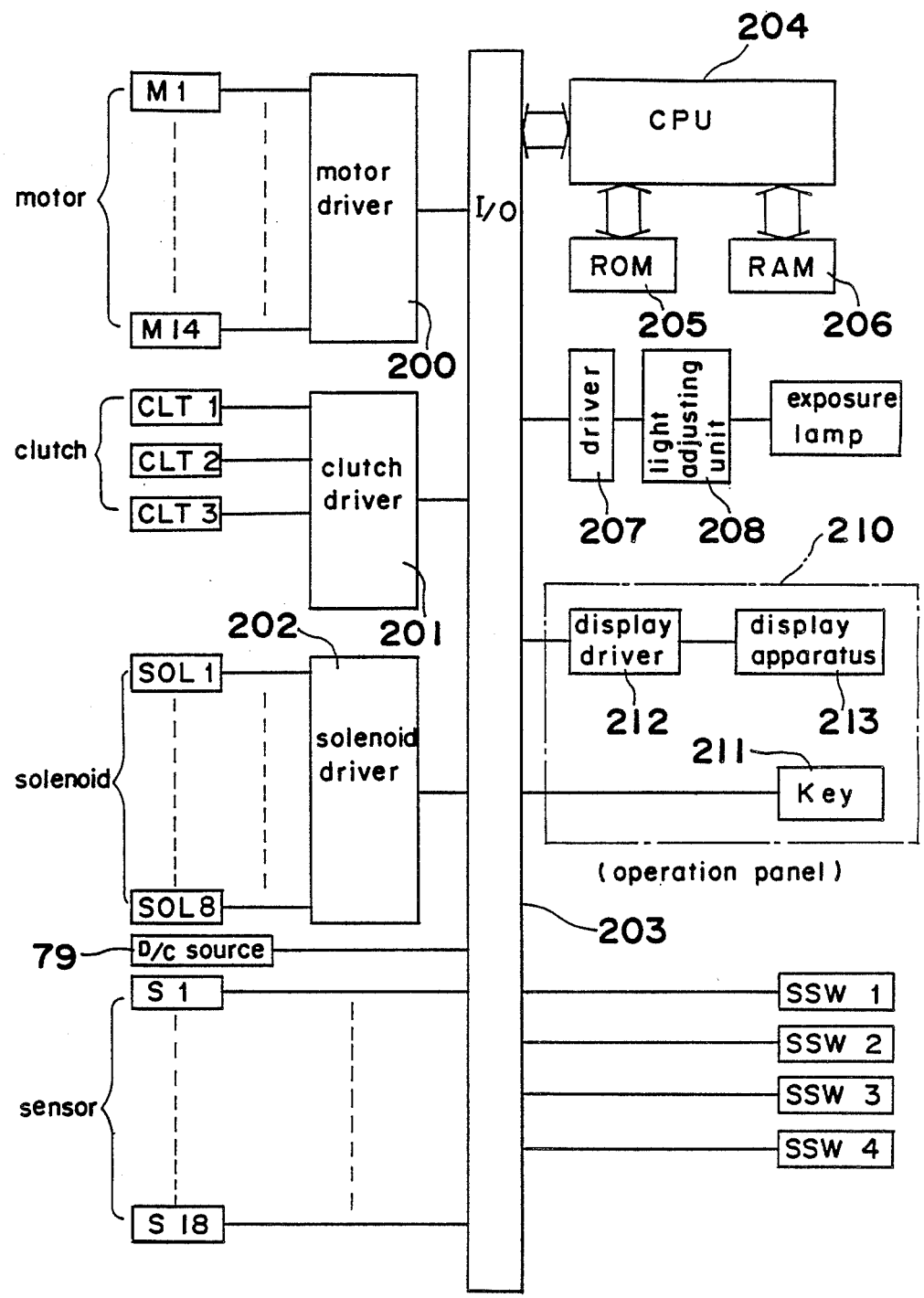
FIG. 8 is a block diagram of a control portion of a copy apparatus.

A copying apparatus 100 provided with the abovedescribed circulation type of automatic document feed apparatus 1 causes the copying machine main-body to operatively cooperate with a circulation type of automatic document feed apparatus 1 for controlling operation by the controlling apparatus shown in a block diagram of FIG. 8. Namely, the respective motors M1 through M14 are connected with a motor driver 200, the clutches CLT 1 through CLT 3 are connected with a clutch driver 201, the respective solenoids SOL 1 through SOL 8 are connected with a solenoid driver 202, the respectively drivers 200 through 202 and controlling elements which are used for controlling the DC power supply 79, document carrying operation, sheet carrying operation process portion are connected with an interface circuit (1/0) 203, the respective detection sensors S1 through S18 are also connected with the interface circuit 203. The interface circuit 203 is connected with a microcomputer 204 so as to output the detection signal from the detection sensor into the micro-computer 204 and to controllingly operate the respective drivers 200 through 203 in accordance with the control signal from the microcomputer 204. The microcomputer 204 is connected with a ROM 205 and a RAM 206, with the microcomputer 204 being adapted to effect its controlling operation in accordance with a controlling program stored in advance in the ROM 205. The RAM 206 includes flag, counter, timer and the other operating region to be described later which become necessary for the buffer memory or copy control.

Also, the interface circuit 203 is connected with a light adjusting unit 208, an exposure-light lamp 150 through a driver 207, is connected with an operator manipulating key 211 of an operation panel 210 and a display driver 212, which is connected with a display apparatus 213. The interface circuit 203 is connected with selection switches SSW 1 through SSW 4 to be described later.

Figure 9:
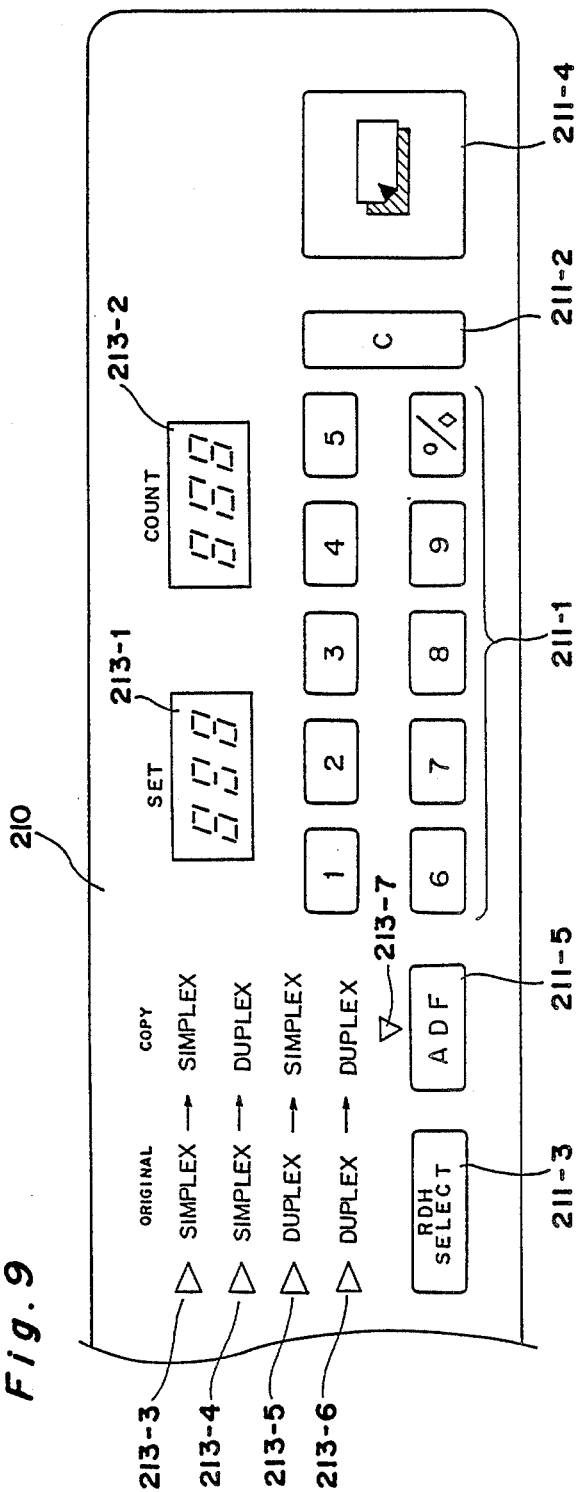
FIG. 9 is a plan view of an operation panel portion.

The above-described operation panel 210 is constructed as shown in FIG. 9, having 10 keys 211 - 1 for setting the number of copy sheets, clear key 211 - 2, an RDH - SELECT key 211 - 3 for setting copying conditions, an ADF key 211 - 5, a print switch 211 - 4, a SET display portion 213 - 1, COUNT display portion 213 - 2, four types of copying mode display portions 213 - 3 through 213 - 6 for RDF, a mode display portion 213 - 7 for ADF.

The RDF copying mode display portions 213 - 3 through 213 - 6 show four copying modes of a single-face copying operation from a single-face document (SIMPLEX --- SIMPLEX), a both-face copying operation from a single-face document (SIMPLEX --- DUPLEX), a single-face copying operation from a both-face document (DUPLEX --- SIMPLEX), both-face copying operation from a both-face document (DUPLEX --- DUPLEX). Every time the RDF SELECT key 211 - 3 is depressed one, the lamps are sequentially lit from the top. The lamp returns to the topmost position from the bottommost position. In the initial condition, the position automatically returns to the topmost position. The number of the necessary copy sheets is set by the 10 key 211 - 1, and the set number is displayed by the SET display portion 231 - 1. When the copy operation is started, the number of the finished sheets is sequentially displayed on the COUNT display portion 213 - 2. When the number of the SET copies is confirmed to the number of the COUNTs, the machine comes to a stop, the SET counter automatically returns to the "0 display". The COUNT counter is maintained till the following print switch 211 - 4 is turned on.

(Copy Mode)

Figure 10:
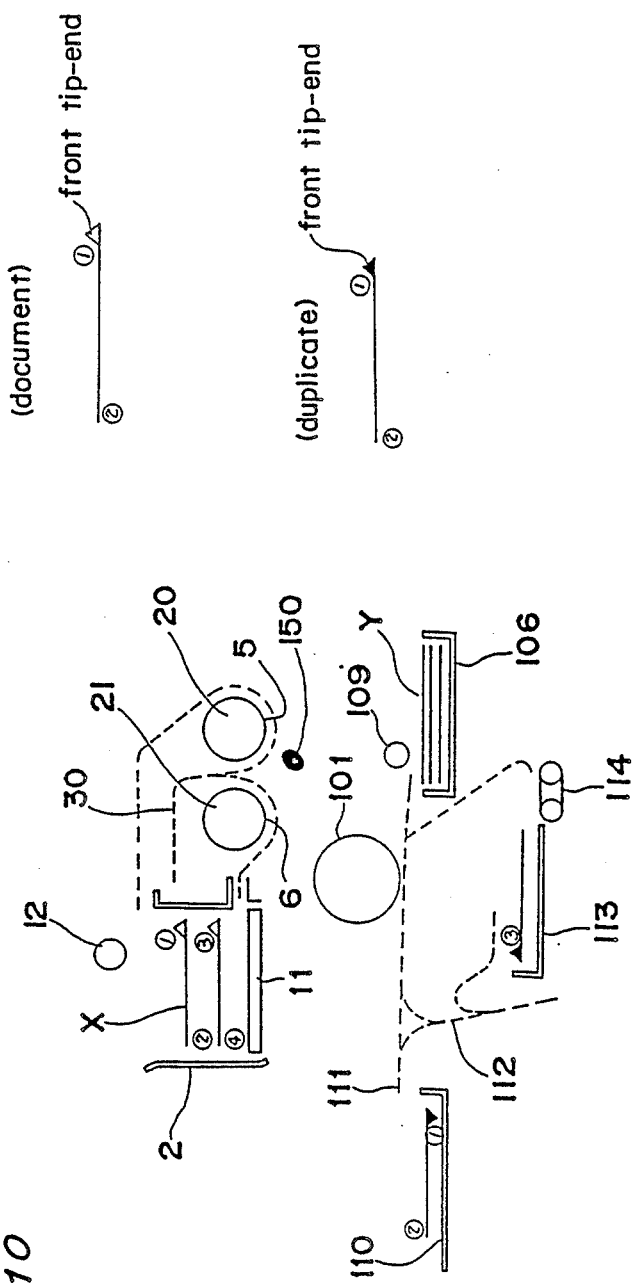
FIG. 10 is a basic operation pattern view showing the construction and arrangement of the essential portions of the duplex copying apparatus provided with a circulating type of automatic document feeding apparatus.

According to the duplex copying apparatus provided with the circulation type automatic document feed apparatus 1, it may be used through the switching operation into the various copying modes shown in the flow chart of FIG. 11. FIG. 10 shows a pattern model for illustrating the operation patterns of the copying modes shown in FIG. 12 and its subsequent.

In FIG. 10, when the document is exposed through the scanning by the front document cylinder 20 by the exposure pattern of the sheet document X, an exposure-light lamp (light source) 150 is described under the first exposure portion 5 on behalf of the optical system, with the optical system exposing the light with the system being stopped in the first exposure portion. Also, when the document is scanned in exposure likewise by the second document cylinder 21, the exposure-light lamp 150 is described in the pattern model under the second exposure portion 6 of the second document cylinder 21.

The sheet document X has Δ marks and page number on the sheet document X, while the copy sheet Y has marks and page numbers thereon. These marks and page numbers are given in accordance with the following regulation. In the document, (a) all the △ marks given to the document are given to the tip end of the document in the advancing direction of the document when the feeding operation of the document X has been started from the document hopper 2, (b) in the duplex document, the △ mark is given only on the side of the odd-number of the document, (c) in the simplex document, the △ mark is given on the side of the tip end in the sheet feeding direction of all the pages, (d) in the illustrating view of FIG. 12 and its subsequent operation patterns, all the pages of all the documents which have been set are given in the order of the pages like ①, ②, .... in the drawing of the "document set-up" which is a first operation.

On the other hand, in the copy sheet Y, (a) when images have been formed on the copy sheets, the page numbers ①, ②, .... of the document corresponding to the formed picture images are given, (b) the ▲ marks on the copy sheets are given corresponding to the positions of the △ marks of the document images. However, the ▲ marks are given only to the odd-number pages on the copy sheets with the images being formed on both the front, reverse faces, the ▲ marks are given in accordance with the positions where the page number of the document is given corresponding to the picture image on the copy sheet with the picture-images being formed on the single face.

The simplex copy and the duplex copy in accordance with the present apparatus will be schematically described in the copying step with reference to FIG. 10. Two duplex documents each having images on its both faces are accommodated in the document hopper 2 with faces being upward (a first page is upward). The topmost document X which has been picked from the top by the document sheet feeding roller 12 is carried along the document carrying passage shown in broken line to pass the first exposure portion 5 through the inversion in the vertical direction. It passes through the switch back carrying passage 30 so as to be inverted in the vertical direction, and passes the second exposure portion 6. Thereafter, without being inverted in its vertical direction, the document X is restored into the hopper in its original direction from the bottommost side of the document X from the lower opening of the document hopper 2.

On the other hand, the copy sheet Y is fed from the sheet feeding cassette 106 by the sheet feeding roller 109 and is carried along the carrying passage shown in broken line towards the lower portion (copy process portion) of the photosensitive member drum 101. The copy sheet Y which has images copied by the photosensitive member drum 101 is discharged towards the outlet tray 110 at the simplex copying operation, is accommodated within the intermediate tray 113 with a transfer image face being upward through the switch back route 112 at the duplex copying operation. Thereafter, the paper is fed by the sheet feeding roller 114 on the lower side from the intermediate tray 113, is carried with the vertical face of the sheet being inverted so that the second images may be transferred on the second face (the reverse face). Thereafter, the sheet having images formed on its both faces is delivered onto the offset tray 110 through the discharging route 111.

FIG. 11(II) explains each program step in the flow chart of the portion, wherein various types of copying modes are selected in a program used in the automatic duplex copying apparatus of the present invention. In the drawings, the (D) mark shows the both faces, the (S) mark shows the single face. The mark described in the first place shows the document, while the mark described later shows the copying condition of the sheet. The DD1 mode shows a mode, wherein the duplex copies are made by two circulations of the duplex documents, the DD2 mode shows a mode, wherein the duplex copies are made by one circulation of the duplex documents, the DS1 mode shows a mode, wherein the duplex copies are made by two circulations of the duplex document, the DS2 mode shows a mode, wherein the simplex copying is made by one circulation of the duplex document. The SD mode shows a mode, wherein the duplex copies are made from the simplex document. The SS mode shows a mode, wherein simplex copy is made from the simplex document.

The select switches SSW 1 through SSW 4 are selection switches for the modes. Namely, the SSW 1 switch is one for selecting a face down and a face up, the SSW 2 is a switch for selecting RDH (copying mode for circulating, recirculating the document) and ADF (Automatic Document Feeder: a plurality of modes for exposing the same document a plurality of times), the SSW 3 is a switch for selecting the SW1 mode and the DS2, the SSW 4 is a switch for selecting the DD1 mode and the DD2 mode. These functions of the switches SSW 1 through SSW 4 are shown in the following Table 1.

TABLE 1

|  | ON | OFF |
| --- | --- | --- |
| SSW 1 | face down | face up |
| SSW 2 | RDH | ADF |
| SSW 3 | DS1 | DS2 |
| SSW 4 | DS1 | DS2 |

FIG. 11(I) is a flow chart for illustrating the flow of the program. Namely, after the program has been started, the program advances from the top to the bottom. The signal of the program step n1000 surrounded by the frame of a diamond is a program step for effecting the judgement. The CPU 204 makes its judgement in accordance with the condition of the contents described within the frame to effect a downward advance in the case of YES, and to effect a lateral advance in the case of NO. In the case of the program step n1001 (hereinafter omitted as "nXXX" simply in the case of the program step nXXX) surrounded by a square, the contents surrounded by the square are processed. Then, the description of the flow chart will be concretely described in accordance with FIG. 11(II).

At first, at the n0, the power-supply switch (not shown) of an automatic duplex copying machine of the present invention is put to work, so that the program accommodated in the ROM 205 is actuated by the CPU 204. Thereafter, at the n1, the CPU 204 reads the inputting of the various copying conditions by the keys 211 - 1 through 211 - 5 of the operation panel, SSW 1 through SSW 4, or the like so as to store the contents thereof within the RAM 206.

At the n2, it is judged whether or not the print switch (PSW) 211 4 instructing the copy start of the operation panel has been turned on. When the print switch 211 - 4 has not been turned on, it is returned to n1 again to check the existence or absence of the input of the copying conditions. When the print switch 211 - 4 has been turned on, thereafter the copying conditions are not checked again before the program end of the respective modes comes after the various types of copying modes have been completed. It is to be noted that the copying conditions at the n1 are referred to as the following.

(1) The number of the copies to be inputted by 10 keys 211 - 1.

(2) Various types of copying modes inputted, combined by the SSW 1 through the SSW 4. When all the SSW 1 through SSW 4 are turned on, it means that a mode that the document is set up in the document hopper with its face being down is selected, with the selection of the RDH and the ADF being the RDH copying mode. Likewise, the RDH of the present invention may be used as an automatic document feeding apparatus which performs a copying operation on the side of the copying modes of the DD1, DS1 (see Table 1).

(3) Four types of copying modes are selected in accordance with the fact as to whether the document and the duplicate are respectively of a single face (S) or both faces (D) by each one-time depression of the RDH SELECT key 211 - 3 (the modes are referred to as SS mode, SD mode, DS mode, DD mode as described hereinabove in accordance with the combination, one among the LED 213 3 through the selection mode). However, when the print switch 211 - 4 has been turned on, with the ADF key 211 - 5, the RDH key 211 - 3 being not on, it is judged as NO at the n11 or the n17 to mean that the copying mode for performing the scanning exposure in the third exposure portion 105 has been selected.

When the sensor S1 of the document hopper has detected the document, the mode becomes the RDH mode, so that the copying mode which is more used in frequency from among the four types of copying modes is adapted to be automatically set, thus saving the key inputting trouble of the copying conditions.

4) One among the sheet feeding cassettes 106A, 106B, 106C, 106D, is selected by the key not shown) of the operation panel 210. Then, at the n3, the data within the RAM 206 memorized at the n1 is read to judge whether or not the ADF mode is selected by the SSW 2 or the ADF key 211 - 5. When the ADF mode is selected, the n3 moves to the n4 to carry out the production program of the ADF mode, in which the same document is repeatedly exposed by the number of the required copies.

When things are judged as NO at the n3, the n3 moves to the n5. At the n5, it is judged whether or not the SSW 1 is turned off. When it is on, the program moves to the copying mode selection program in a case where the document has been set with the face up of the n6 through n11. When the SSW 1 is on, the program moves to the copying mode selection program in a case where the document has been set with the face down of the N12 through n17. At the n6 through n11 and the n12 through n17, the DD1 mode, DD2 mode, DS1 mode, DS2 mode, SD mode, SS mode during the face-up are selected respectively by the depressed number of the RDH SELECT key 211 - 3 or the ON, OFF condition of the SSW 3, SSW 4. When the CPU 204 judges which one of the respective copying modes has been selected at the n17, the selected program is carried out.

The relationships between the flow charts in the respective copying modes and the operation pattern views of the automatic duplex copying apparatus are shown in Table 2.

TABLE 2

Figure 13:
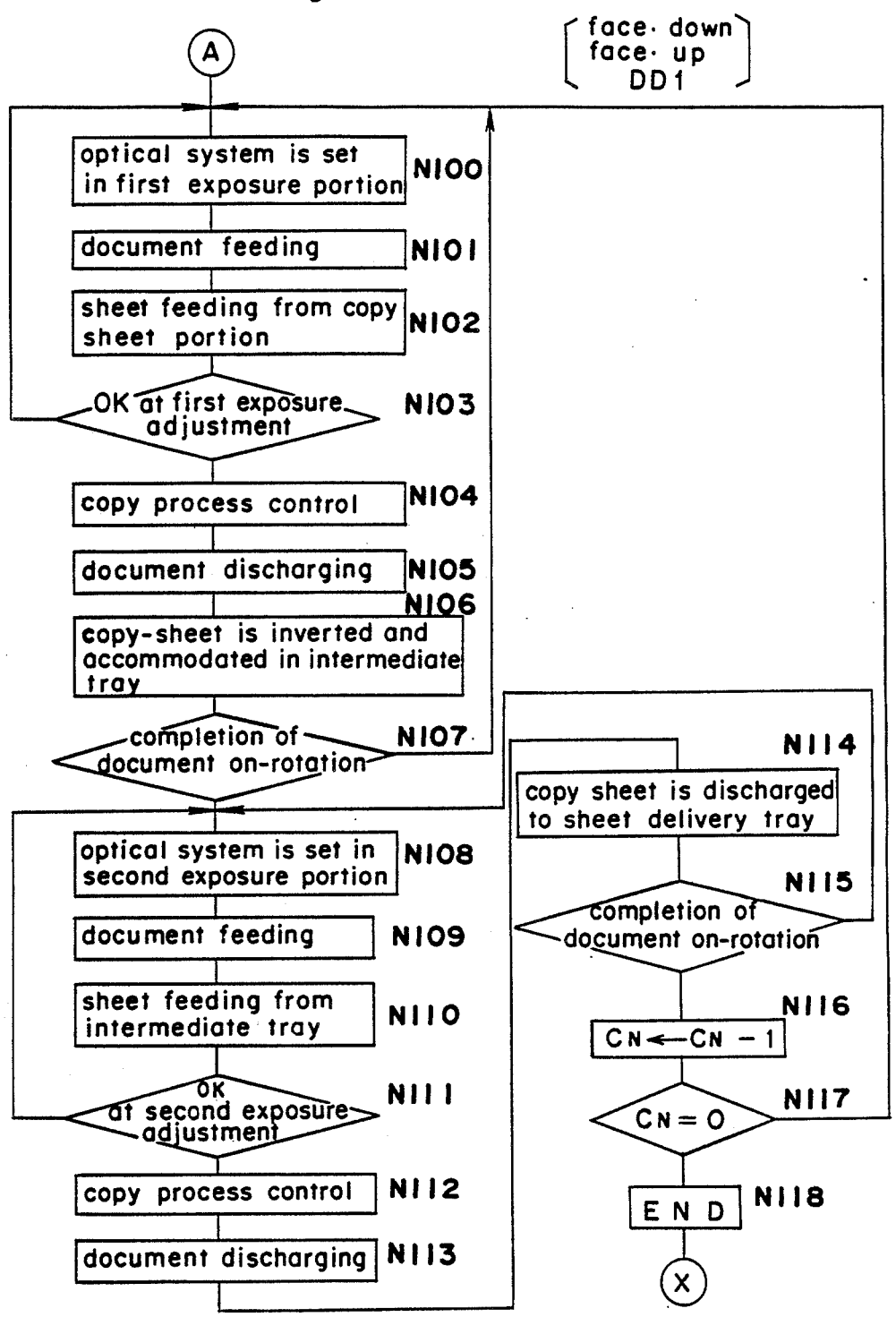
FIG. 13 is a flow chart of the DD1 mode of the face-down and the face-up in the first embodiment.
Figure 16:
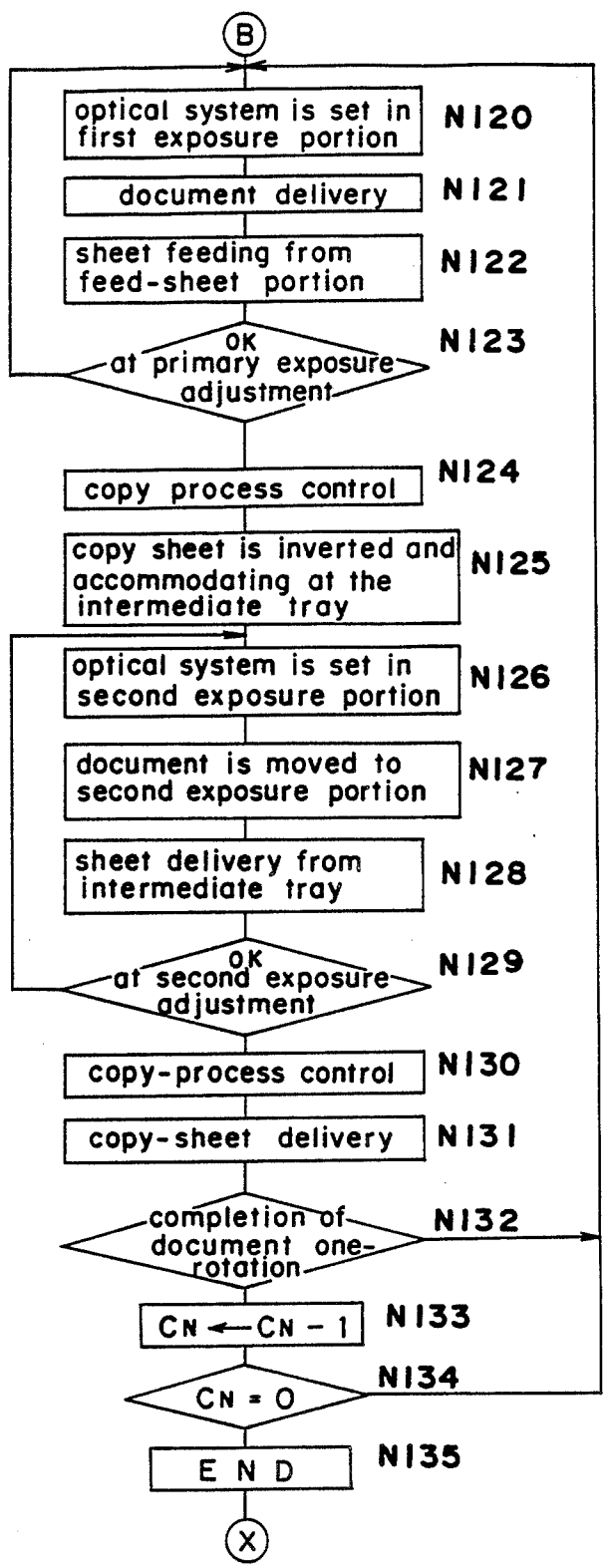
FIG. 16 is a flow chart of the DD2 mode of the face-down and the face-up in the first embodiment.
Figure 20:
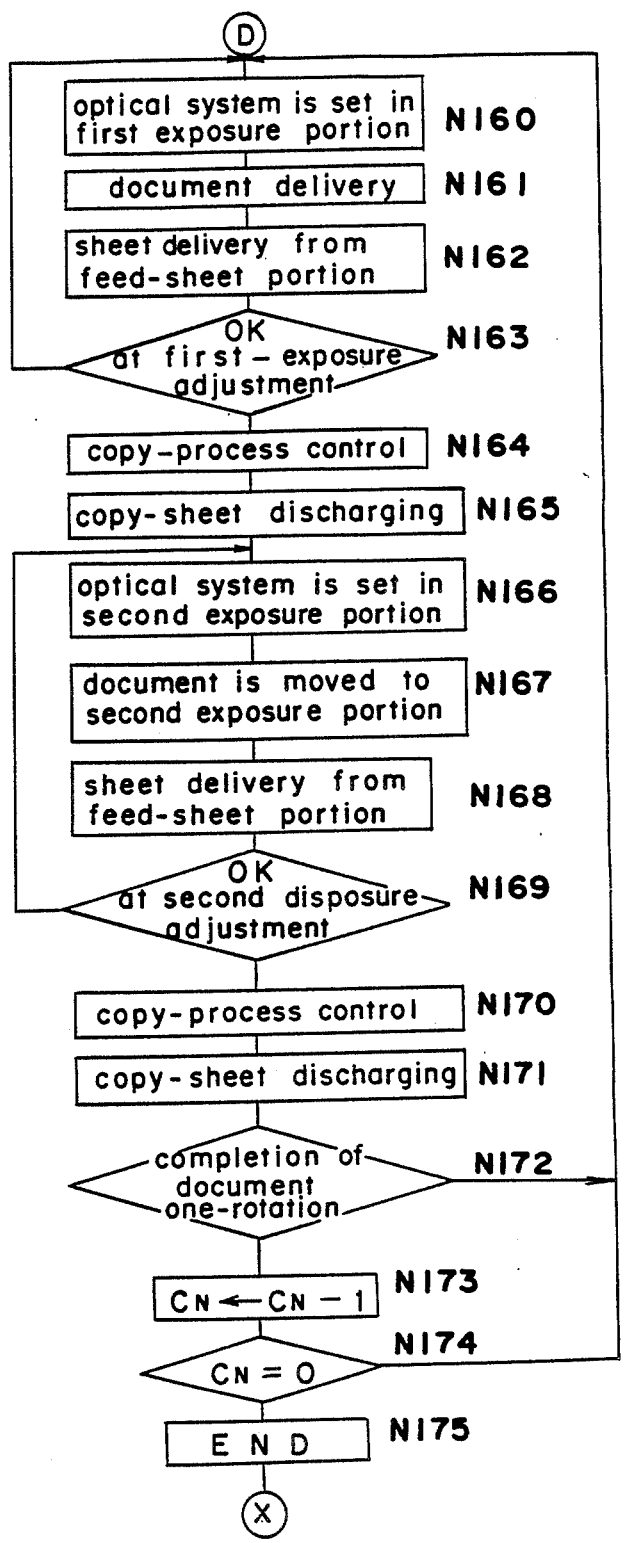
FIG. 20 is a flow chart of the DS2 mode.
Figure 22:
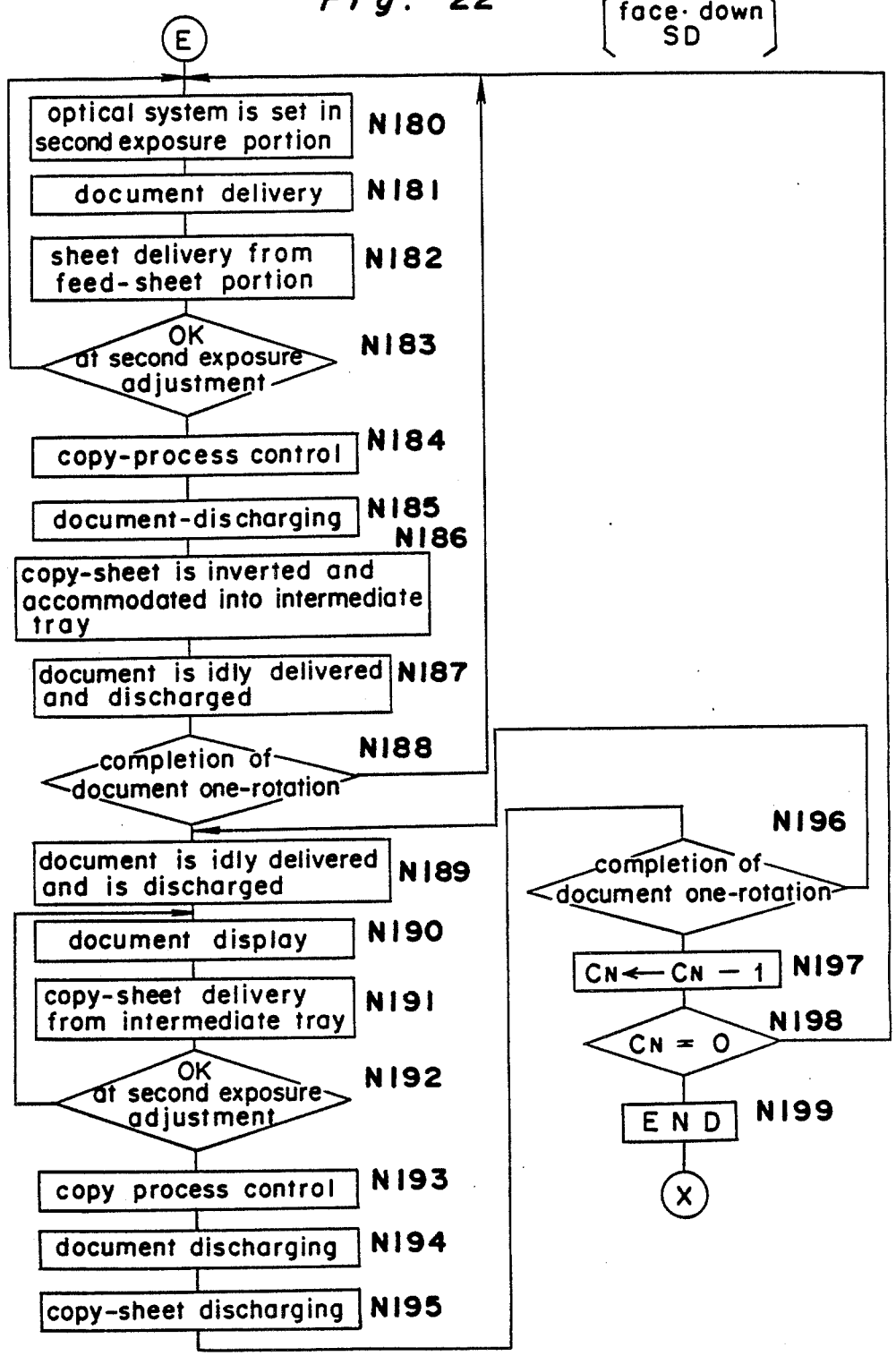
FIG. 22 is a flow chart of the SD mode.
Figure 30:
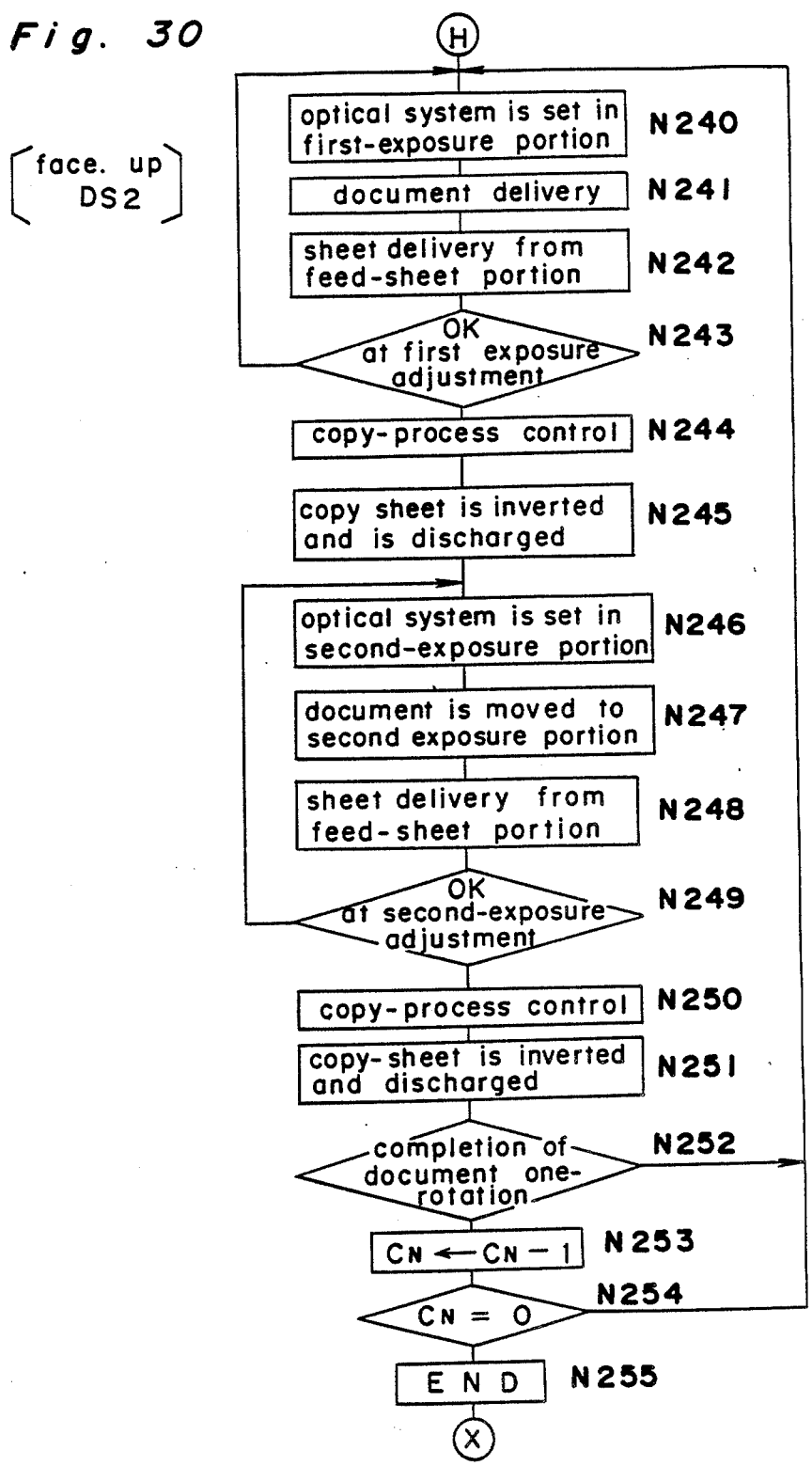
FIG. 30 is a flow chart of the DS2 mode.
Figure 32:
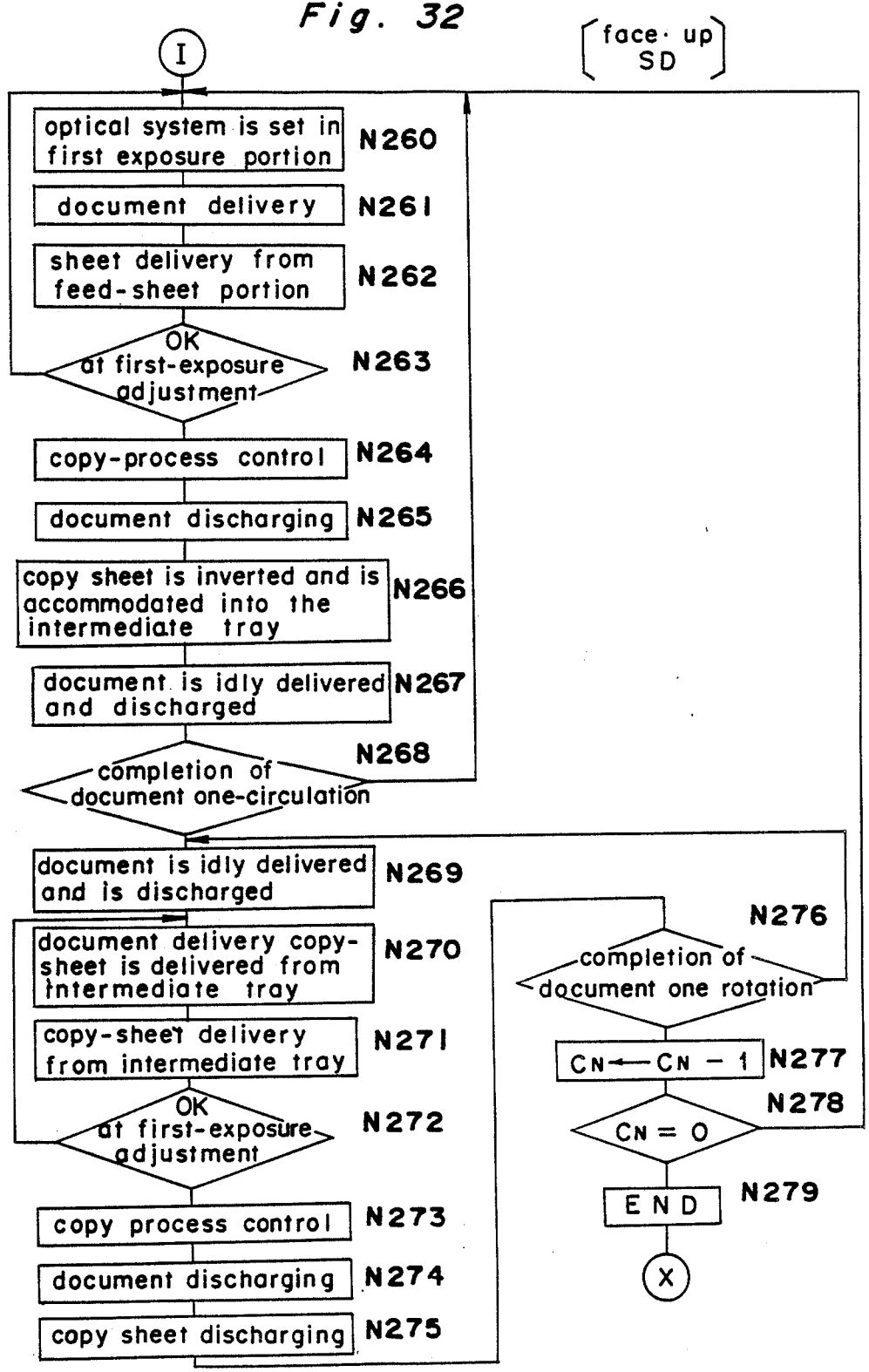
FIG. 32 is a flow chart of the SD mode.
Figure 33:
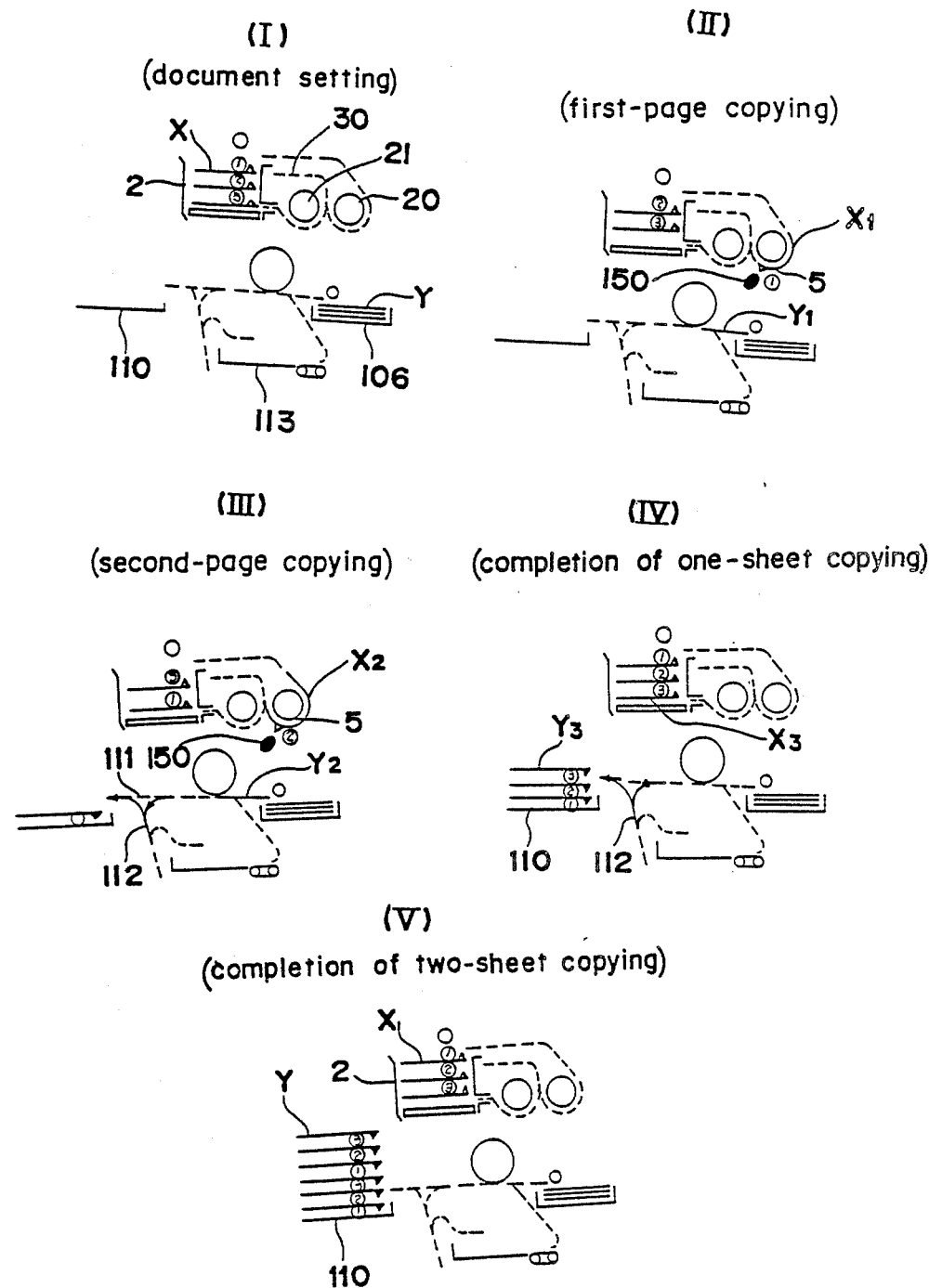
FIGS. 33(I) through 33(V) are operation pattern views of the SS mode of the face-up in the first embodiment.
Figure 34:
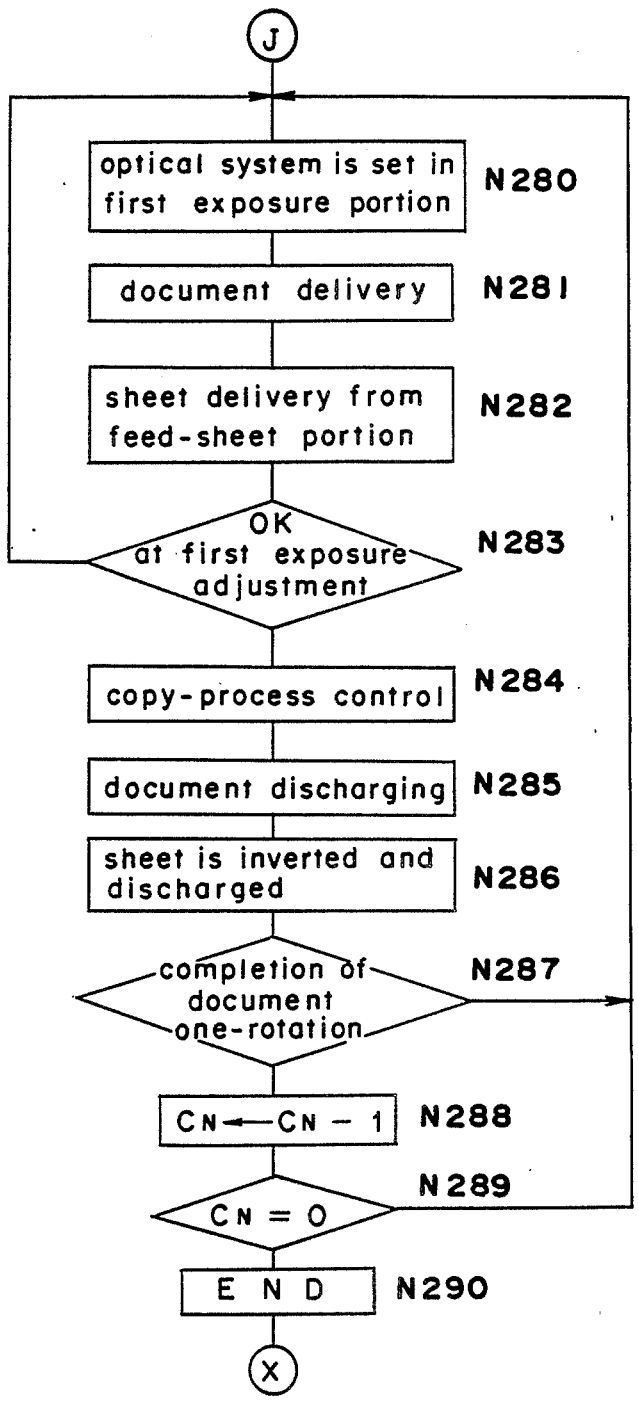
FIG. 34 is a flow chart of the SS mode.

| How to Take Out Document | Copying Mode | Document Setting Method | | | |
| --- | --- | --- | --- | --- | --- |
| | | Operation Pattern View | Flow Chart | Operation Pattern View | Flow Chart |
| Taking out from topmost face | DD1 | FIG. 12 | FIG. 13 | FIG. 25 | FIG. 13 |
| | DD2 | FIG. 15 | FIG. 16 | FIG. 26 | FIG. 16 |
| Returning to bottommost face | DS1 | FIG. 17 | FIG. 18 | FIG. 27 | FIG. 28 |
| | DS2 | FIG. 19 | FIG. 20 | FIG. 29 | FIG. 30 |
| | SD | FIG. 21 | FIG. 22 | FIG. 31 | FIG. 32 |
| (1st Embodiment) | SS | FIG. 23 | FIG. 24 | FIG. 33 | FIG. 34 |
| Taking out from bottommost face | DD1 | FIG. 38 | | FIG. 44 | |
| | DD2 | FIG. 39 | | FIG. 45 | |
| Returning to topmost face | DS1 | FIG. 40 | | FIG. 46 | |
| | DS2 | FIG. 41 | | FIG. 47 | |
| | SD | FIG. 42 | | FIG. 48 | |
| (2nd Embodiment) | SS | FIG. 43 | | FIG. 49 | |

The above Table 2 shows a method of setting the document hopper 2 (face down or face up), copying modes (DD1, DD2, DS1, DS2, SD, SS), an embodiment 1 in which the documents X are picked up from the side of the topmost face from the document hopper 2 and are returned to the bottommost face, or an embodiment 2 in which the documents X (to be described later) are picked up from the side of the bottommost face and are returned to the topmost face, the pages of the operation pattern views, of the flow charts shown in accordance with the respective combinations. As described in Table 2, the operation pattern view is shown in FIG. 17 and its corresponding flow chart is shown in FIG. 18 when the copying operation is effected in the DS1 mode with the document being face down in, for example, embodiment 1. Likewise, the operation pattern view is shown in FIG. 33 and its corresponding flow chart is shown in FIG. 34 when the copying operation is effected in the SS mode with the document being face up in embodiment 1. The same flow charts of FIG. 13 and FIG. 16 are used regardless of the respective document setting method (face up and face down) even in either the DD1 mode and the DD2 mode.

(Illustration of the Operation Pattern Views)

FIG. 12 through FIG. 34 show the flow charts of the operation patterns and the operation patterns of the first embodiment. The operation patterns will be described hereinafter with reference to the respective views.

FIGS. 12(I) through 12(VIII) are the operation pattern view of the face-down DD1 mode, showing the first embodiment for the duplex copying operation with the duplex document being face down, i.e., the operation pattern in the DD1 mode.

FIG. 12(I) is a view wherein the documents X are set up with the face being downward. A case in which the minimum two documents are required to understand the operation will be described hereinafter. When the copying operation is started, the document $X_1$ (fourth page and third page) on the topmost side is picked up by the sheet feeding roller 12 at first by the automatic document feeding apparatus 1 (hereinafter referred to as RDH) as shown in FIG. 12(II) so as to be inverted, and the exposing operation is started in the first exposure portion 5 by an optical system located downwardly of the first document cylinder 20. And on the side of the copying main body hereinafter referred to simply as main body 100), a first copy sheet $Y_1$ is fed towards the photosensitive member drum 101 from the sheet feeding cassette 106 to copy the document fourth page on the copy sheet $Y_1$.

In FIG. 12(III), the first copy sheet $Y_1$ is changed in the advancing direction of the copy sheet in the switch back route 112 so as to be accommodated into the intermediate tray 113. At this time, on the RDH side, the second document $X_2$ is taken out from the document hopper 2 as the document $X_1$ is so as to expose the second page thereof in the first exposure portion 5. Even on the side of the main body 100, the second copy sheet $Y_2$ is taken out from the sheet feeding cassette 106 as the $Y_1$ is, and is carried towards the photosensitive member drum 101. FIG. 12(IV) shows the operation pattern, wherein the copying operation of all the even pages has been completed through such a repeated operation as described hereinabove. At this time, all the documents X effect their one rotation through the carrying passage of the RDH and are returned to the document hopper 2 in the same order of the pages set up originally. On the other hand, the copied sheets of all the even pages have the imageless face of the initially copied sheet $Y_1$ downward, with the copy sheets of all the even pages being accommodated in an intermediate tray 113 as shown in FIG. 12(IV) in the order of the even pages. In FIG. 12(V), an optical system exposure lamp 150 and so on are moved to a portion rightly under the second exposure portion 6, the document $X_1$ on the topmost side is taken out again from the document hopper 2 and is inverted to pass without being exposed in the first exposure portion 5. And the copy sheet $Y_1$ picked up from the bottommost portion of the sheets accommodated in the intermediate tray 113 is inverted to the imageless face on the side of the photosensitive member drum 101 so as to effect the carrying operation so that the images may be met with the timing in order to copy the third page of the document $X_1$ on the copy sheet $Y_1$. In FIG. 12(VI), the copy sheet $Y_1$ makes a straight advance on the discharge route 111 and is discharged onto the offset tray 110. And the next document $X_2$ is taken out from the document hopper 2 as the document $X_1$ is so as to expose the first page in the second exposure portion 6. Also, the copying sheet $Y_2$ within the intermediate tray is carried so that the face of the copy sheet with no images being formed thereon, as in the $Y_1$, may be exhibited on the photosensitive drum 101 to copy the images of the first page on the face of the photosensitive member side of the copy sheet $Y_2$.

When all the documents have completed their second rotation as described hereinabove, the documents are returned and accommodated in the page order as when they were originally set up in the document hopper 2.

On the other hand, on the offset tray 110, the copied sheets corresponding to all the documents X have the one sheet completed with their first page being upward as shown in FIG. 12(VII). Thereafter, the offset tray is kept shifted.

By the repetition of the operations of the above-described FIG. 12(II) through FIG. 12(VII) by the number of the required sheets, the duplicates of the required number are provided in the page order without being changed in the page order of the documents.

FIG. 13 is a flow chart in a case where the duplex document with its face being up or down is set up in the document hopper to effect an automatic duplex copying operation of the DD1 mode, and is used to effect an operation corresponding to the operation pattern view of FIG. 12.

FIG. 14 is the further detailed description of the flow chart of FIG. 13, with the corresponding portion being surrounded by a broken line to show the same control contents. For example, the steps from n100 to n103 of FIG. 14(A) are equivalent to step N100 of FIG. 13. Also, the steps from n104 to to n113 of FIG. 14(B) are equivalent to N101 of FIG. 13. The rest is the same.

As the respective processings (N120, N121, . . . ) of each flow chart to be described later use the same words as those in the respective processings of FIG. 13, with such a detailed flow chart as in FIG. 14 being omitted.

The flow chart of FIG. 14 will be described hereinafter.

N100 (processing for setting the optical system in the first exposure portion The n100 judges the existence or absence of the A flag which is a flag to be erected in a case where the optical system (a mirror base unit including an exposure lamp 150, a first mirror 151A, thereinafter the rest is similar) exists directly under the first exposure portion 5. When the A flag is not erected, i.e., in the case of NO, the program advances to the n101. When the A flag is erected, i.e., in the case of YES, the program advances to the n104.

At the n101, it is judged whether or not the sensor S8 is on, which detects whether or not the optical system is arranged directly under the first exposure portion 5. When the S8 is not on, the program advances to the n102 to turn on the optical-system moving motor M13. Also, when the S8 is on, the program advances to the n103 to turn off the optical system and also, the flag A Flag showing that the optical system is arranged directly under the first exposure portion 5 is set, i.e., "1" is set.

N101 (document feeding)

The n104 judges the existence or absence of the flag B Flag, which shows whether or not the exposure start preparations have been completed by the document X arriving at the resist rollers 19A, 19B located before the first exposure portion. At first, it is judged as NO as the document is still being fed. The program advances to the n105 to judge the existence or absence of the C Flag showing whether or not the delivery of the document has been completed. Even here, as the document is not fed, it is judged as NO. The program advances to the n106 to judge whether or not the document feed detecting sensor S2 is on. When the S2 is off, the program advances to the n107 to turn on the feeding motor M2 and the carrying motor M3. Also, when the document reaches the S2 to turn on the S2 after the motors M2, M3 have been turned on, it is judged as YES at the n106. The program advances to the N108 to turn off the feeding motor M2 and also to set the feed completion flag C Flag as "1". After the C Flag has become "1", it becomes YES when the judgement of the n105 is performed again. The program advances to the n109 to judge whether or not the sensor S3 is on which detects whether or not the document has reached the first exposure portion 5. When the sensor S3 is off, it is judged as NO to advance the program to the N114. Thereafter, at the time when the sensor S3 turns on, the document sensor S3 is turned on at the N110 and thereafter a timer (1) which is adapted to measure time required for the document to be applied upon the resist rollers 19A, 19B judges whether or not the time counting has been started. In the case of NO, the timer (1) is started at the n111. If the timer (1) has already started the time counting, at the n112 it is judged whether or not the timer has completed the time counting, i.e., whether or not it is an end. When it is NO, the program comes to the n114. When it is YES, the timer (1) is cleared to set a flag B Flag (namely "1") that the preparation for the document to be able to start exposing before the first exposure portion 5 has been completed. At the same time, the copying motor M3 is turned off to stop the carrying operation of the document.

Figure 14A:
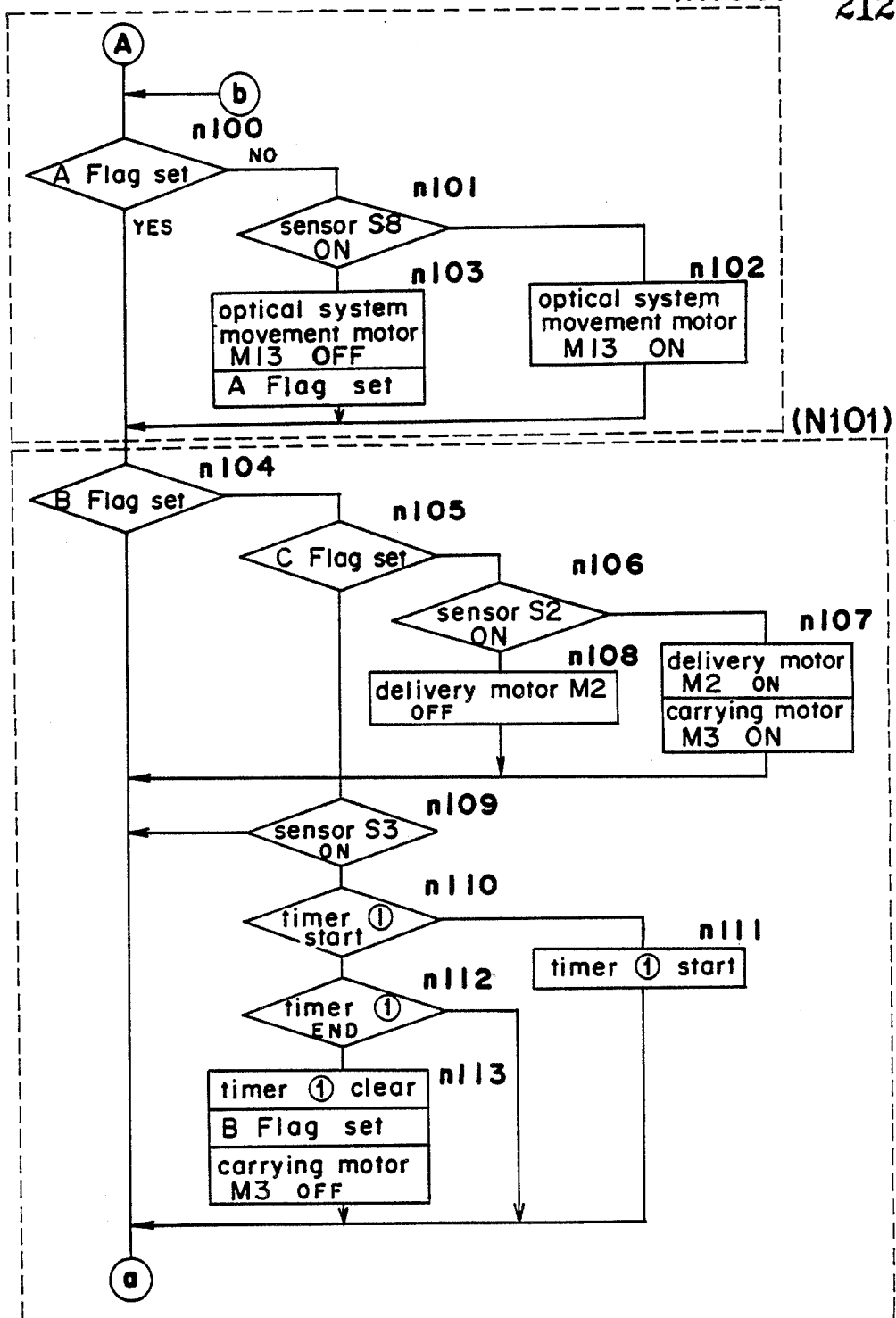
FIGS. 14(A) through 14(I) show a flow chart of the controlling portion of the DD1 mode.

The above-described n110 through n113 shown in FIG. 14(A) shows a flow chart that a direction correcting operation is effected (hereinafter referred to as skew correcting operation), which returns, into a parallel feeding even when the document tip and has been fed slantly with the document tip-end being applied against the resist rollers 19A, 19B.

N102 (sheet feeding from a sheet-feeding portion)

Figure 14B:
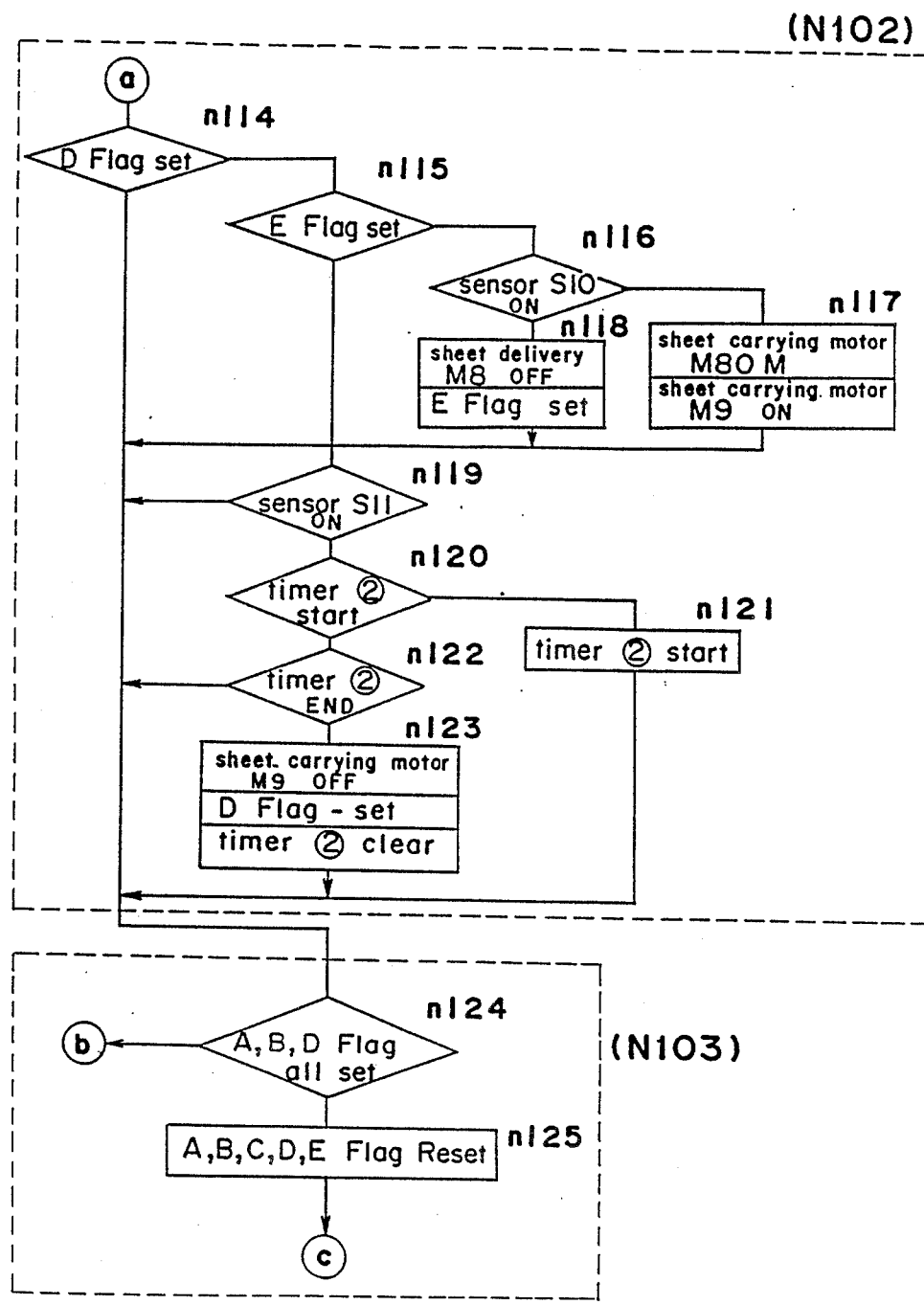

The n114 through n123 shown in FIG. 14(B) is a flow chart that the copy sheet Y is taken out from one selected by an operator among the sheet-feeding cassettes 106A through 106D and is carried to the resist rollers 160A, 160B.

As, at first, the copy sheet Y does not exist on the carrying passage from the sheet-feeding cassette 106 to the resist rollers 160A, 160B, the D Flag showing the preparation completion before the transfer of the copy sheet Y is not set at the n114, so that it is judged as NO. Then, as the E Flag showing the sheet feeding completion of the copy sheet Y is judged as NO at the n115. As the sensor S10 for the copy sheet disposed at the entrance of the sheetfeeding cassette 106 does not detect the copy sheet at the n116 either, it is judged as NO, so that the program advances to the n117. At the n117, a sheet feeding motor M8 and a sheet carrying motor M9 are turned on the copy sheet Y fed by one from the sheet-feeding cassette 106 in this way reaches S10 soon, so that it is judged as YES at the n116 and the program moves to the n118. The sheet-feeding motor M8 is turned off to set E Flag as "1", showing the sheet feeding completion of the copy sheet Y.

When the judgement is made at the n115 after the E Flag has become 1, the program advances to the n119 so as to judge whether or not the transfer sheet has reached a sensor S11 disposed immediately before the resist rollers 160A, 160B. When the S11 has been turned on, the skew correcting operation of the copy sheet is effected with respect to the resist rollers 160A, 160B at n120 through n123 as the document has been adjusted at its tip end with respect to the resist rollers 19A, 19B at n110 through n113.

N103 (judgement of OK at the first exposure adjusting time)

At the n124, it is judged whether or not three of an A Flag showing that the above-described optical system has moved immediately under the first exposure portion 5 to complete the arrangement, a B Flag showing that the document X has been completed in its tip end adjustment by the resist rollers 19A, 19B through reaching immediately before the first exposure portion 5, and a D Flag showing that the copy sheet Y has been completed in its tip end adjustment by the portions of the resist rollers 160A, 160B through reaching immediately before the copy process portion are all "1". When it is judged as YES, the program advances to the n125 to reset the A through E flags.

When even one among the Flag A, the Flag B, the Flag D is 0 (namely, it is not set), the copy start in the first exposure portion can not be effected, so that the program returns to the n100 again to make arrangements for each flag to become 1.

N104 (copy process control)

Figure 14C:
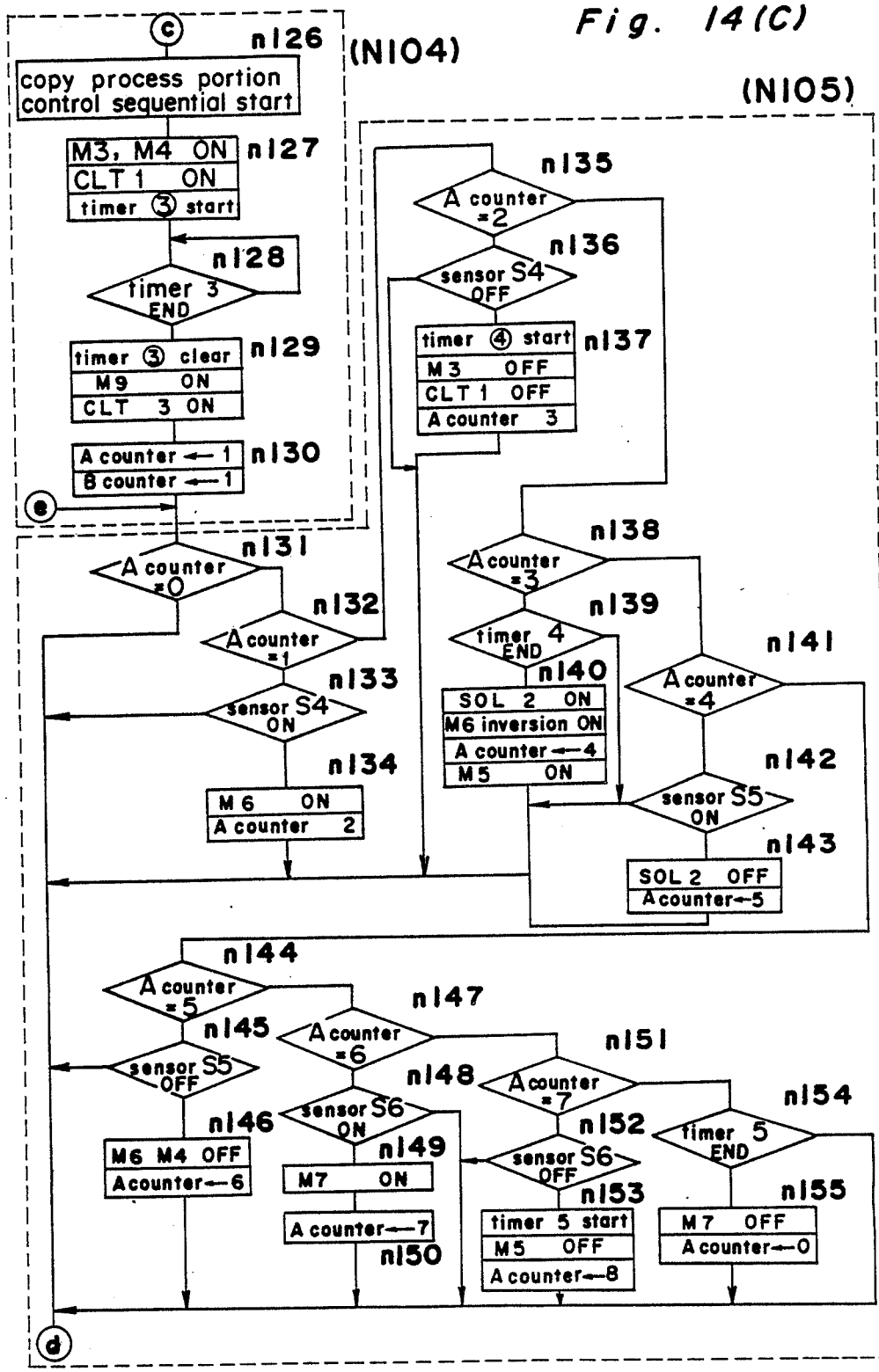

The flow chart of n126 through n130 shown in FIG. 14(C) is provided to sequentially turn on each control element of the copy process portion and also to provide the document X in synchronization with the copy sheet Y. At the n126, the charging charger 102, the exposure lamp 150, the developing apparatus 103 and so on which are the respective controlling elements of the copy process portion are sequentially turned on at the n126. Then, at the n127, the carrying motors M3, M4 and the clutch CLT 1 are turned on to start carrying the document from the resist rollers 19A, 19B, and also, the top ends of the documents are started in exposure in the first exposure portion 5 to form the images of the document X on the photosensitive member drum 101. Thereafter, the timer (3) is started, which is provided to cause the tip end of the image to conform to the tip end of the copy sheet Y when the above-described images are copied on the copy sheet Y in the process portion.

At the n128, the timer (3) is cleared at the n129 after the waiting operation till the end of the timer (3), and also, the clutch CLT 3 is turned on, after the sheet carrying motor M9 has been turned on, so as to start carrying the copy sheet Y from the resist rollers 160A, 160B.

Thereafter, at n130, 1 is respectively put into an A counter provided to judge the carrying condition of the document X in the first exposure portion 5 and a B counter to judge the condition when the sheet Y is carried from before the transfer to the intermediate tray 113.

N105 (document discharge)

The n131 through n155 shown in FIG. 14(C) is a flow chart that the document X is carried from the resist rollers 19A, 19B to the document hopper 2.

In Case the A Counter is 1

At first, at the n131, it is judged as NO as 1 is kept inputted in the A counter at the n131. The program advances to the n132, where is is judged as YES, and the program advances to the n133. When a document detection sensor S4 provided on the side downwardly of the first exposure portion 5 is not kept on at this time, the program advances to the n156. When the document X reaches S4, the program advances to the n134 to turn on the carrying motor M6 of the route 30 to input 2 into the A counter.

In Case the A Counter is 2

After the sensor S4 has been turned on, at the n132, it is judged as NO, and the program advances to the N135, where it becomes YES, and advances to the n136. At the n136, the sensor S4 judges whether or not the next one becomes off. With the carrying motor M6 being turned on, the document X is carried in the direction of the $Z_1$ towards the rollers 37A, 37B along the inversion route 30. Soon the sensor S4 is turned off. It is a time point when the sensor S4 has been turned on, it is judged as YES at the n136 and the program advances to the n137. At the n137, the rear end of the document starts the timer (4) which counts the time required for the rear end of the document to pass the gate flapper 35 after the passing of the S4, and also the carrying motor M3 and the CLT 1 are turned off so as to input 3 into the A counter.

In Case the A Counter is 3

After 3 has been inputted into the A counter, the n131, n132, n135 are continuously judged as NO. At the n138, it is judged as YES, so that the program advances to n139.

At the n139, it is judged as NO till the timer (4) comes to an end, so that the step jumps over the n140 to advance to n156 and its subsequent. When the timer (4) comes to an end, it is judged as YES at the n139 to advance to the n140 so as to turn on the solenoid SOL 2 for driving the gate flapper 35. When the SOL 2 has been turned on, the document may be advanced in the direction of a route 30b if the document is carried along the Z2 direction in the route 30c. Then, the M6 is inverted to start carrying the document in the $Z_2$ direction to put 4 into the A counter for turning on the motor M5.

In Case the A Counter is 4

The n131, n132, n135, n138 become NO, the n141 becomes YES so as to judge whether or not the document sensor S5 located immediately before the second exposure portion 6 is on. Unless the sensor S5 is turned on, the step advances to n156. When the S5 is on, the SOL 2 is turned off to put 5 into the A counter.

In Case the A Counter is 5

At the n145, the sensor S5 is judged to watch whether or not the document has passed the sensor S5. When the sensor S5 is turned off, the carrying motors M6, M4 are turned off to put 6 into the A counter.

In the same way, hereinafter, the following respective flow charts are selected by the value of the A counter.

In Case the A Counter is 6

Whether or not the document has reached immediately before the document hopper 2 through passing the second exposure portion 6 is watched at the n148 by the on of the sensor S6. When the document X reaches the S6, the carrying motor M7 for returning the document is turned on at the n149 to put 7 into the A counter.

In Case the A Counter is 7

As it is judged as YS at the n151, it is watched whether or not the document X has passed the S6 at the n152. When the sensor S6 has turned off, the timer 5 which counts the time required for the document to return to the document hopper 2 is started at the n153 to turn off the carry motor M5 and also, to put 8 into the A counter.

In Case the A Counter is 8

At the n151, it is judged as NO, and it is watched that the timer (5) comes to an end at the n154. When the timer (5) comes to an end, the carrying motor M7 for returning the document is turned off at the N155 to put 0 into the A counter.

In Case the A Counter is 0

At the n131, it is judged as YES to mean that the processing of returning the document to the document hopper 2 has been completed.

N106 (copy sheet Y is inverted and is accommodated in the intermediate tray 113

Figure 14D:
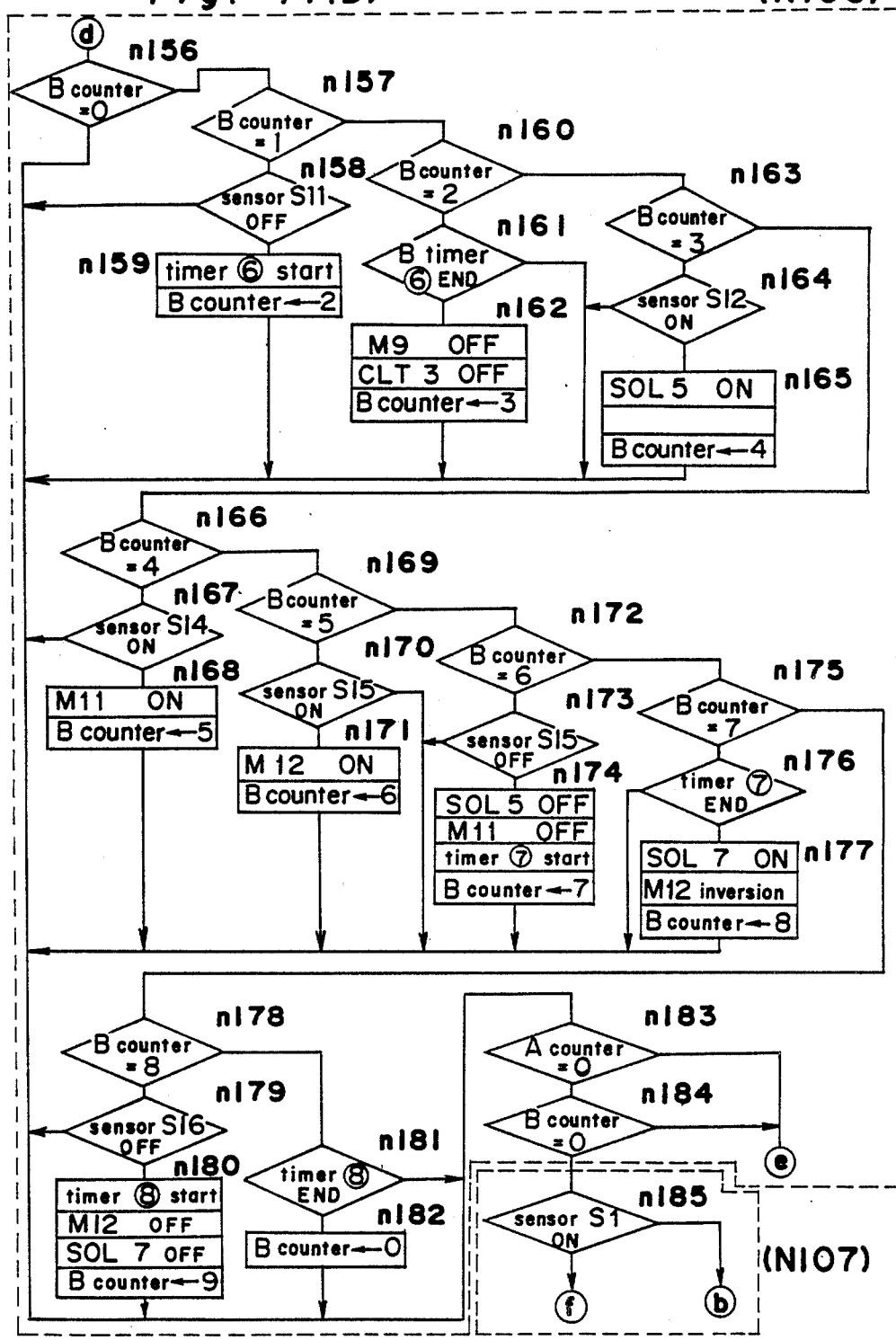

The n156 through n184 of FIG. 14(D) show a flow chart for carrying the copy sheet Y from the resist rollers 160A, 160B to the intermediate tray 113. In the flow chart, a B counter is provided to judge the condition or the position of the copy sheet Y, with the respective JOBs to be described hereinafter being effected in accordance with the contents 0 through 8 of the B counter.

In Case the B Counter is 1

At the n158, is is watched whether or not the copy sheet Y has passed the position of the sensor S11 located immediately before the copy process portion. When the sensor S11 is turned off, a timer (6) which counts the time required for the copy sheet Y to pass to the resist rollers 160A, 160B is started later at the n159 to input 2 into the B counter.

In Case the B Counter is 2

At the n161, the end of the timer (6) is watched. When the timer (6) comes to an end, the carrying motor M7 and the CLT 3 are turned off at the n162 to put 3 into the B counter.

In Case the B Counter is 3

At the n164, the one of the copy sheet sensor S12 provided on the side downstream of the fixing apparatus 104 is watched. When the S12 is turned on, the SOL 5 is turned on at the n165 to lift the flapper 115 onto the upper side. Thus, the copying sheet Y which has been carried through passing the fixing apparatus 104 is carried in the direction of the switch back route 112. And 4 is inputted into the B counter.

In Case the B Counter is 4

At the n167, the sensor S14 watches whether or not the copy sheets has been carried to the switch back route 112. When the sensor S14 is turned on, the driving motor M11 of the roller 120 is turned on at the n168 and also, 5 is inputted into the B counter.

In Case the B Counter is 5

At the n170, the S15 is watched. When the sensor S15 is turned on, the driving motor M12 of the roller 121 is turned on and also, 6 is inputted into the B counter.

In Case the B Counter is 6

At the n173, it is watched that the copy sheet Y completes the passing of the sensor S15. When the sensor S15 is turned off, the SOL 5, the carrying motor M11 are turned off at the n174 and also, the timer (7) which counts the time required for the copy sheet to pass the gate flapper 117 is started later to put 7 into the B counter.

In Case the B Counter is 7

In the n176, the end of the timer (7) is watched. When the timer (7) comes to an end, the driving solenoid SOL 7 of the gate flapper 117 is turned on, and also the M12 is inverted to carry the copy sheet Y to the route 112d. And 8 is inputted into the B counter.

In Case the B Counter is 8

At the n179, it is watched whether or not the copy sheet Y has passed the sensor S16. When the sensor S16 is turned off, a timer (8) which counts the time required for the copy sheet Y to be completely accommodated in the intermediate tray 113 started later at the n180 to turn off the carrying motors M12, SOL 7 and also, to put 9 into the B counter.

In Case the B Counter is 9

At the n181, the end of the timer (8) is watched. When the timer (8) comes to an end, 0 is inputted into the B counter with the copy sheet Y being completely accommodated into the intermediate tray 113.

In Case the B Counter is 0

When the copy sheet Y has been completely carried from the carrying rollers 160A, 160B to the intermediate tray 113, it is judged as YES at the n156, so that the step advances to the n183, n184.

At the n183, n184, both the A counter and the B counter become 0. It is watched whether or not the respective JOBs of the N105, N106 have been completed. When either the A counter or the B counter is not 0, the step is restored to the n131 to complete both the JOBs of the N105, N106.

N107 (judgement of one rotation completion of the document)

At the n185, the on of the sensor S1 is watched. It becomes NO till the document completes one rotation, and the step returns to the n100. When the steps from the n100 to the n184 are repeated by the number of a few documents, all the documents which have been set up in the document hopper 2 are completely exposed in the first exposure portion 5 and are returned into the document hopper 2 in the order of the pages.

Also, the corresponding images are copied on the copy sheet Y at each page on the upper side of the document X exposed by the repetition of the above-described operation, with only the copy sheets as many in number as the documents being accommodated in the intermediate tray 113. As the copy sheet Y accommodated within the intermediate tray 113 is accommodated through the switch back route 112, the images are provided upward in face, so that the copy sheets Y copied later are accommodated so as to be piled on the previously copied sheets.

When one face of the document X makes one rotation within the RDS after it has finished exposing in the first exposure portion 5 in this manner, the sensor S1 which detects one rotation of the document is turned on, so that the step advances to the n186.

N108 (optical system is set in the second exposure portion)

Figure 14E:
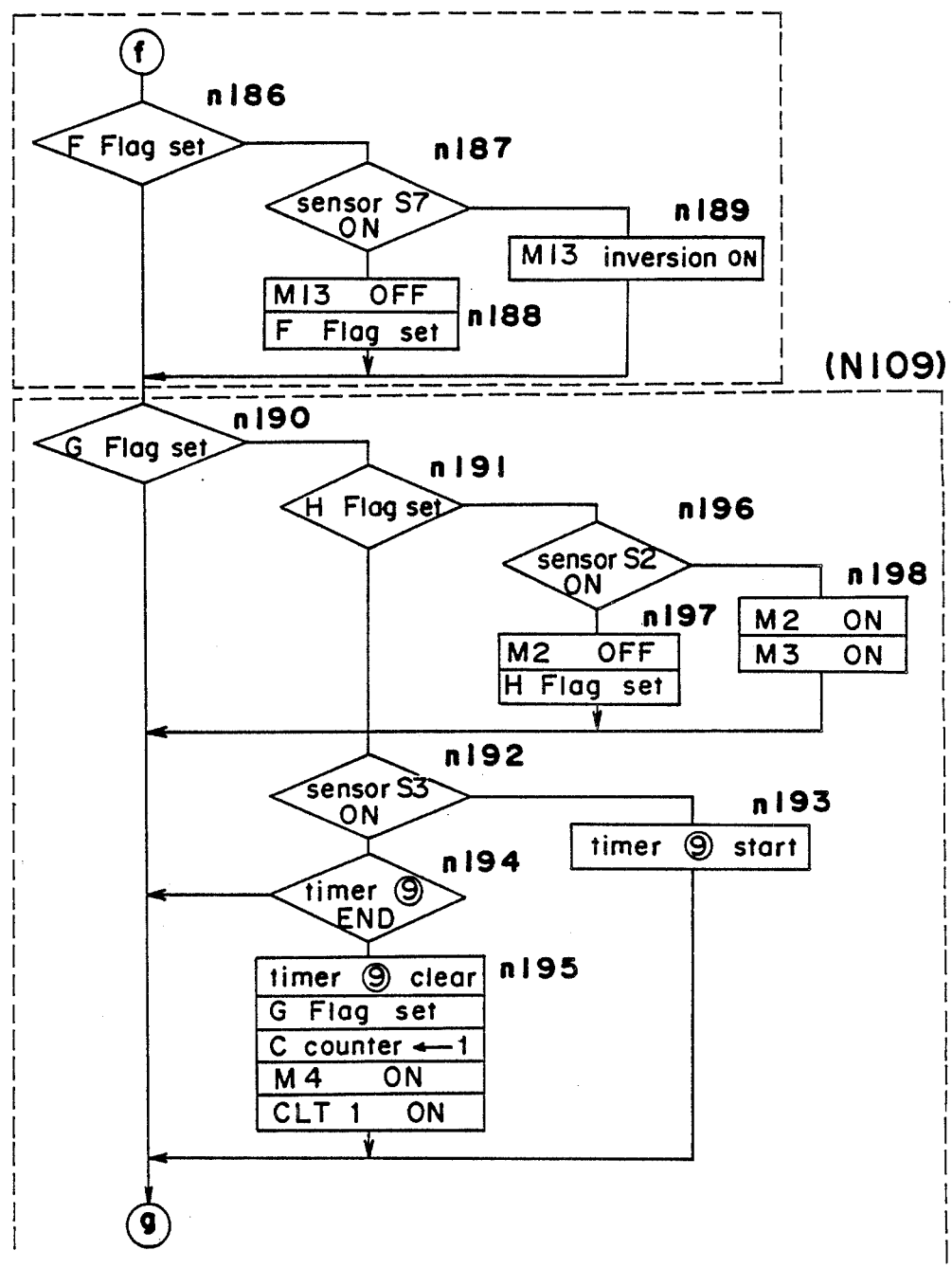

The n186 through n189 shown in FIG. 14(E) show a flow chart for moving the optical system immediately under the second exposure portion 6 to arrange it.

This flow chart is extremely similar to the flow chart of the N100. The difference between it and the N100 (n100 through n103) is that an F Flag showing that the optical system has completed its movement to portion immediately under the second exposure portion. The A Flag is provided with a sensor S7 for detecting the provision of the optical system immediately under the second exposure portion 6 corresponding to the sensor S8. As the control flow chart is similar in the other aspects, the detailed description is omitted.

N109 (document feeding)

Figure 14F:
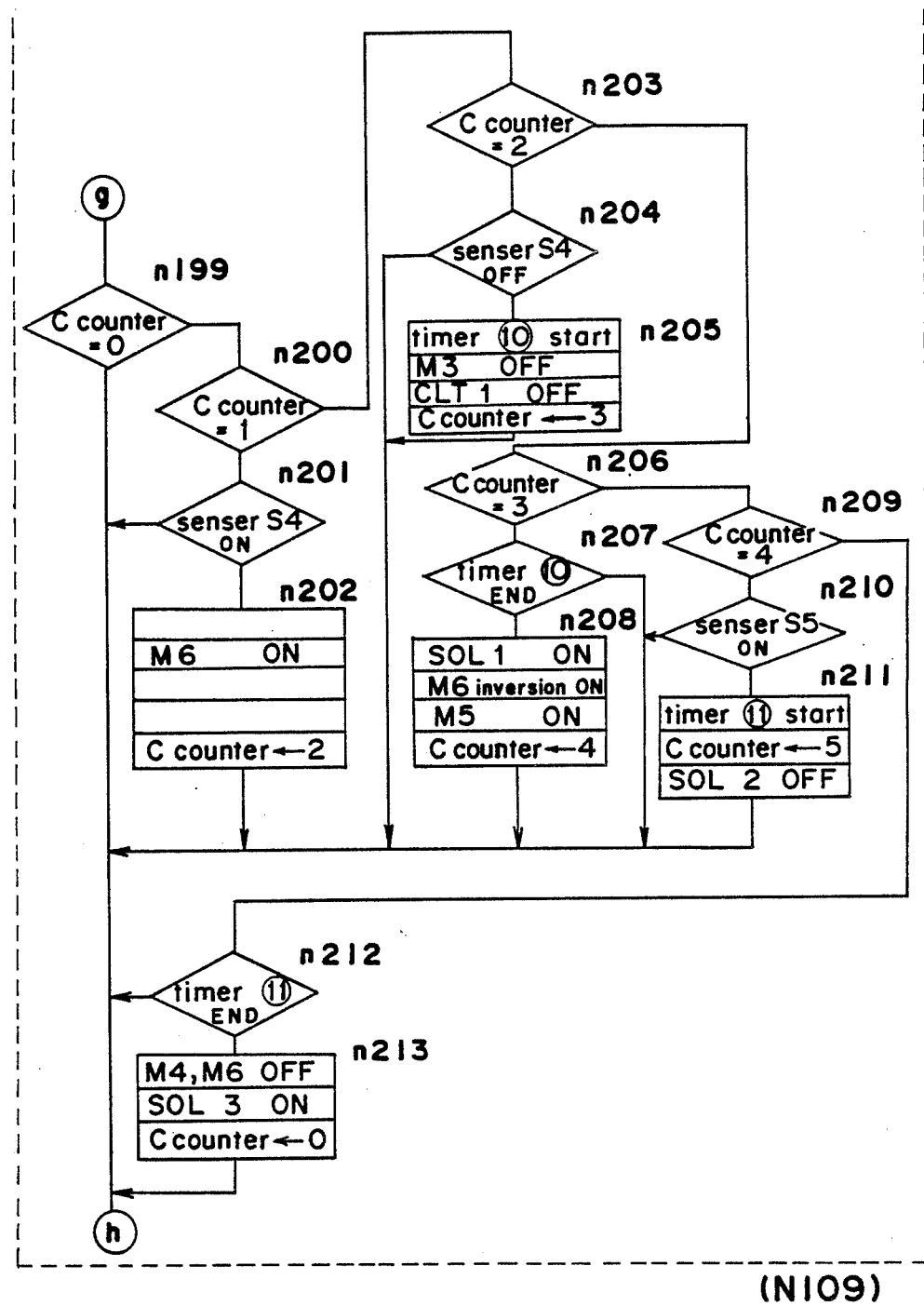

The n190 through n213 shown in FIG. 14(E) and FIG. 14(F) show a flow chart that the document X is carried from the document hopper 2 to the resist rollers 59A, 59B located immediately before the second exposure portion 6.

The n190 through n198 show a flow chart that the document X is carried from the document hopper 2 to the resist rollers 19A, 19B, they are operated almost similarly as the N101 (n104 through n113) are.

The difference from N101 is that in the case of N101, the skew correcting operation of the document is effected by the resist rollers 19A, 19B at the n109 through n113, while at the n192 through n196 of the N109, the S3 passing of the document is watched.

The detailed description will be omitted, because the flow chart is extremely similar in other respects.

The n199 through n213 show a flow chart that the document X is carried from the resist rollers 19A, 19B to the resist rollers 59A, 59B located immediately before the second exposure portion 6. The n199 through n213 are performing almost the same control as in the flow chart of the n131 through n143 of the N105.

At the n131 through n143, the condition of the document was judged by the A counter, while at the n196 through n213, the condition of the document is judged by the C counter, with the control contents corresponding to the number of the counts in the respective counters being equal when they are the same in the number of the counts. The difference between them is that the document is carried towards the document hopper 2 without the stopping of the resist rollers 59A, 59B of the document in the case where the A counter is 5, while in the case where the C counter is 5, it is stopped after the skew correcting operation of the document in the resist rollers 59A, 59B at the n212, n213. As in the other respects, it is a similar flow chart which may be easily understood by the explanation of the flow chart of the n131 through n143, the detailed description will be omitted.

N110 (sheet feeding from intermediate tray)

Figure 14G:
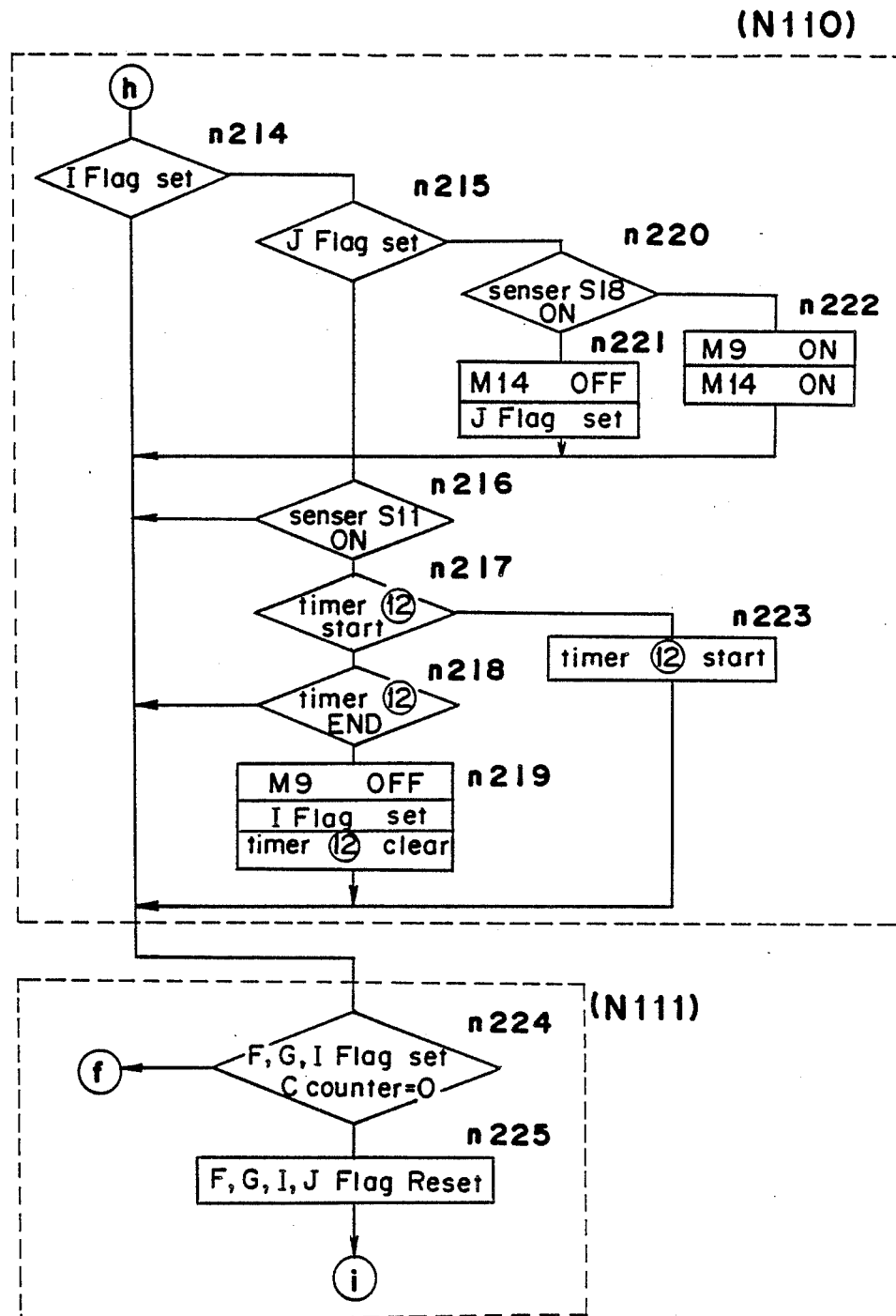

The flow chart of the n214 through n223 shown in FIG. 14(G) is one where the copy sheet Y, with images formed on its single face, accommodated in the intermediate tray 113, is carried from the intermediate tray 113 to the resist rollers 160A, 160B.

The flow chart performs a controlling which is almost similar to that of the flow chart of the n114 through n123 of the N102. At the N102, the copy sheet Y is fed from the sheet-feeding cassette 106. However, it is different at the N110 that the copy sheet Y is fed from the intermediate tray 113. The other controlling operation is similar to that of the N102, with the detailed description being omitted.

N111 (judgement of OK at the second exposure adjusting time)

The judgement at the n224 is that as in the judgement in the N103, an F Flag showing the completion of the operation where the optical system has moved to and arranged in a location immediately under the second exposure portion 6, a G Flag showing that the skew correcting operation has completed through the reaching of the document X to the resist rollers 59A, 59B located immediately before the second exposure portion 6, an I Flag showing that the skew correcting operation has been completed through the reaching of the copy sheet Y to the resist rollers 160A, 160B located immediately before the transfer portion through the delivery of the copy sheet Y from the intermediate tray 113, become respectively "1", and C counter is 0. When the F Flag of each F, G, I is turned on, and the C counter becomes 0, the program advances to the n225 to reset each Flag of the F, G, H, I, J into "0". When either of the Flag of each F, G, I is "0" or the C counter is a numeral except for "0", the step returns to n186 again.

N112 (copy process control)

The flow chart of the n226 through n230 shown in FIG. 14{H} is a control flow chart, wherein the document X starts feeding from the resist rollers 59A, 59B, the copy sheet Y is carried so that the tip end of the document image may be brought into synchronization with the tip end of the copy sheet Y from the resist rollers 160A, 160B.

As the flow chart is of approximately similar construction to that of the N104 (n126 through n130), the detailed description will be omitted.

N113 (document discharge)

Figure 14H:
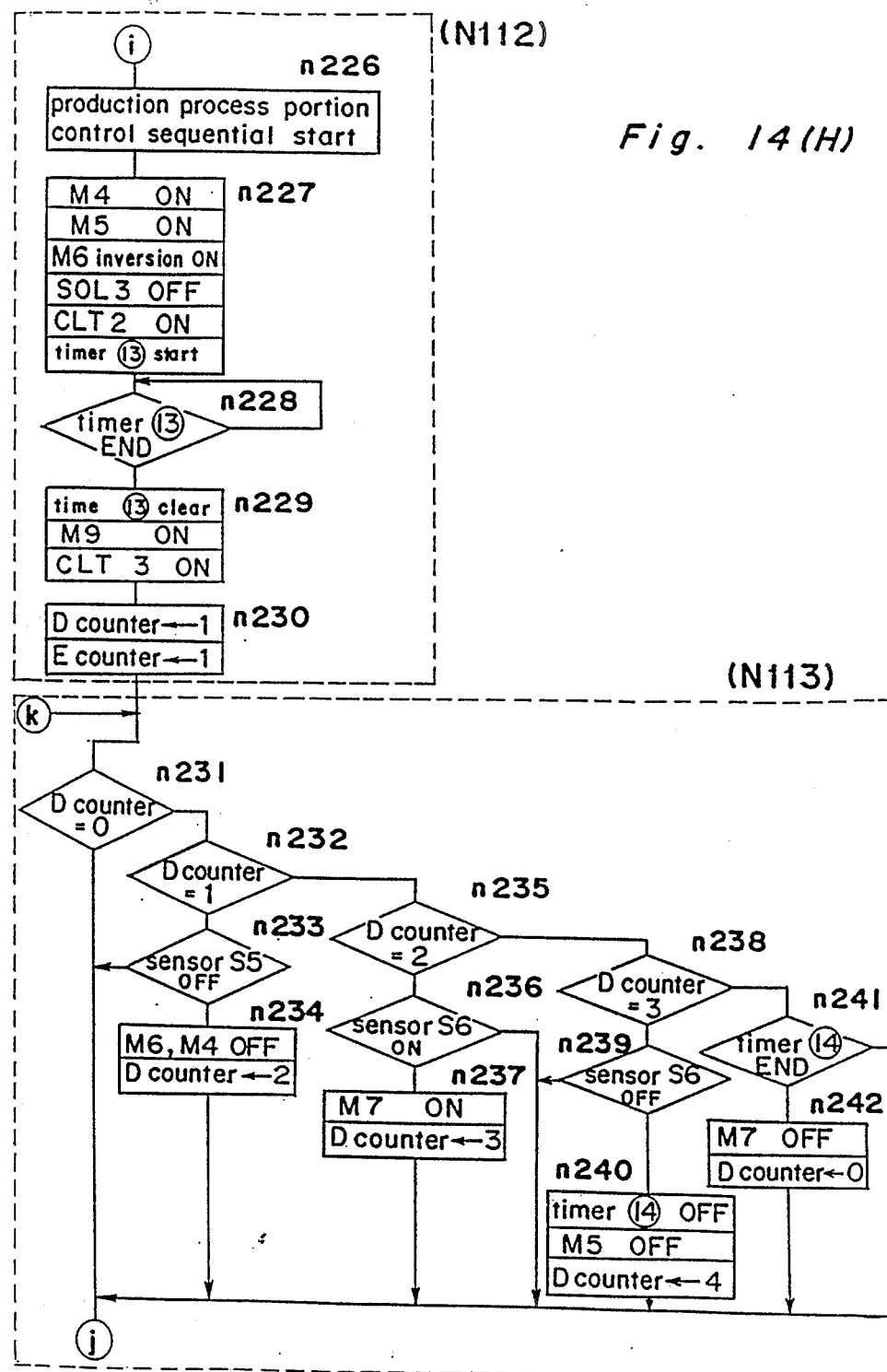

Likewise, the n231 through n242 shown in FIG. 14(H) is effecting a carrying control of returning the document X into the document hopper 2 from the resist rollers 59A, 59B.

Here, the control of the n231 through n242 effects the similar control that that of the n144 through n155 of the N105, with the detailed description being omitted.

N114 (copy sheet Y is discharged to an offset tray)

Figure 14I:
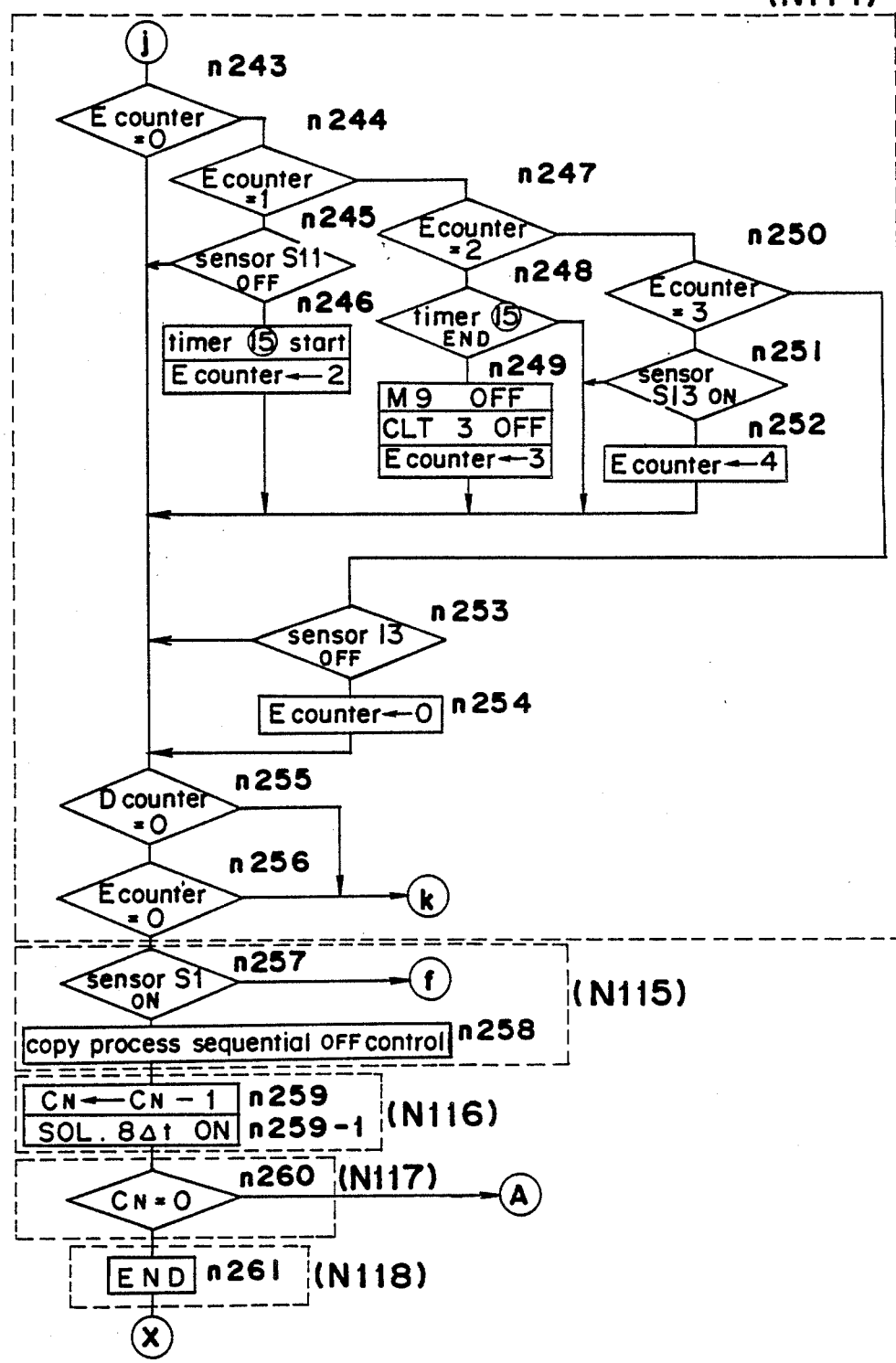

The n243 through n256 shown in FIG. 14(I) is a flow chart, wherein the copy sheet Y is discharged and controlled into the offset tray 110 from the resist rollers 160A, 160B.

The n243 through n252 show a flow chart, wherein the copy sheet Y is carried to the sensor S13 provided downstream of the fixing apparatus 104 from the resist rollers 160A, 160B. As the flow chart of the n243 through n252 show the controlling operation which is similar to that in the n156 through n165 of the N106, with the detailed description being omitted.

As the SOL 5 is not turned on, the gate flapper 115 is located in the position of the solid line. The copy sheet Y makes a straight line along the route 111.

At the n243 through n252, the copy sheet Y reaches the position of the sensor S13 with images being formed on both the faces.

At the n253, it is watched that the copy sheet Y completes its passing the sensor S13. When the S13 is turned off, 0 is inputted into the E counter for distinguishing the condition of the copy sheet Y at the carrying operation of the copy sheet Y to the sheet delivery from before the transfer. As it is judged that the copy sheet Y has completed its passing the S13 at the n253, the program advances to the n255. The program returns to the n231 till it is judged by the "0" of the D counter that the document X has returned to the document hopper 2 from the second exposure portion 6, also till it is judged by the "0" of the E counter that the copy sheet Y has completed its carrying operation from the resist rollers 160A, 160B to the offset tray 110, respectively at the n255, n256. It is watched till the respective operations are completed.

When the D counter and the E counter become "0", the step advances to the n257.

N115 (judgement of document one-rotation completion)

At the n257, the document is circulated by the repetition of the operation of the N108 through N114, all the copy sheets Y accommodated within the intermediate tray 113 are discharged into the offset tray 110, with the images corresponding to the document X being copied on both faces. When the document X completes its second one-circulation, the sensor S1 for detecting one-circulation of the document X provided with the document hopper 2 is turned on, it becomes YES at the n257. The program advances to the n258 to sequentially turn off the respective control elements (charging charger 102, exposure lamp 150, developing apparatus 103, etc.) of the copy process.

N116 (CN←CN−1)

At the n259, one sheet of copy has been completed by the n100 through n258, so that 1 is subtracted from the number counter CN for counting the number of the copies N inputted by key from the operation panel 210 by an operator. And the solenoid SOL 8 for shifting the offset tray 110 is turned on for a given time Δt at the n259-1 to shift the offset tray 110.

N117 (CN=judgement of 0), N118 (END)

At the n260, it is watched whether or not all the copying operations of the number of the copies N set by the operator has been completed. When it has not been completed, the step returns to the n100 to carry out the JOB again shown in the flow chart of the n100 through n259-1.

As all the copying JOBs have been completed, in the case of the CN=0, the step returns to the n1 of FIG. 11 waiting for the instructions of the following operation through the END processing the operating completion of the whole copying apparatus at the n261.

In the above described embodiment, the document is adapted to be taken out from the document hopper for the exposing operation of the next document after the document has been taken out from the document hopper, exposed in the first or second exposure portion, accommodated in the document hopper. Higher speed of the copying operation is provided by the side by side performance of the following operations (1) through (3).

(1) While the first document is passing through the third carrying route 45, the second document is moved to the second exposure portion 6 from the switch back carrying route 30 (N112 "copy process control" during the processing of the N113 "document discharge" of FIG. 13).

(2) While the second document is moving, the third document is carried to the sensor S4 of the second carrying route (During the processing of the N112 "copy process control" of FIG. 13, the n213 is processed from the n199 which is one portion of the N109 "document feeding" of FIG. 14(F).

(3) During the movement of the third document, the fourth document is moved to the resist rollers 19A, 19B of the first carrying route 7 (During the processing operation of the n213 from the n199 of FIG. 14(F), i.e., "movement process of the document from the first exposure portion to the resist rollers 59A, 59B", the processing operation of "the movement of the document from the document hopper to the resist rollers 19A, 19B" shown in the flow chart of the n19 from the n190 of FIG. 14(E)).

FIG. 15 is an operation pattern view of a face down DD2 mode. Namely, this is an operation pattern view showing the second copying mode (hereinafter referred to as DD2 mode) in which the duplex copying is effected from the duplex document X when the duplex document X has been set up in the document hopper 2 with its face being downward.

The description of FIG. 15 of the operation pattern view will be explained through the comparison with the DD1 mode of FIG. 12 which is the basic operation pattern view already described.

In FIG. 15(I) document set-up, (II) 4-page copying are the same in operation as the (I), (II) of the DD1 mode of FIG. 12. In FIG. 15(III), the first document $X_1$ exposed in FIG. 15(II) is inverted in the switch back carrying route 30. On the side of the copying machine main body 100, the first copy sheet $Y_1$ is accommodated in the intermediate tray 113 as shown in FIG. 12(III)>. In FIG. 15(IV), the operation which is similar to that of FIG. 12(V) is effected. Namely, the third page the face on the exposure-finished reverse side of the first document) of the first document $X_1$ is exposed in the second exposure portion 6 to effect the copying operation on the face wherein the images of the first copy sheet $Y_1$ with images being formed on both the faces is discharged onto the offset tray 110 with the images of the third page being upward in the face. In FIG. 15(VI), the even page (second page) of the next document $X_2$ is copied in the first exposure portion as shown in FIG. 15(II). In FIG. 15(VII), the second document $X_2$ is inverted in the switch back carrying passage 30 and also the second copy sheet $Y_2$ accommodated within the intermediate tray 113 as shown in FIG. 15(III). In FIG. 15(VIII), the face (first page) not exposed of the second document $X_2$ is exposed, the images are formed, copied on the imageless face of the second copy sheet $Y_2$ accommodated in the intermediate tray 113, as shown in FIG. 12(VI), to complete the duplex copying operation. In FIG. 15(IX), the document X is placed in the document hopper 2 or the copy sheet Y, with images corresponding to the document X being formed, copied on both the faces thereof are by one set completed and placed on the offset tray 110. The duplex document X is rotated by one time by the repetition of the operations of FIGS. 15(II) through (IX) to complete the duplex copying of one sheet. FIG. 15(X) is a view of the duplex copying operation of two sheets completed in the same manner.

FIG. 17 is an operation pattern view of the SD1 mode of the face down. Namely, it shows the first copying mode, in which the sheet of simplex copy is provided from the duplex document (D) through two rotations of the document. The (I) through (IV) of FIG. 17 are the same as the even-number page copying operation in the DD1 mode described in FIGS. 12(I) through 12(IV), with the description being omitted.

In FIG. 17(V), the copy sheet $Y_1$ with the last even-number page (fourth page) piled on the underside within the intermediate tray 113 being formed is inverted and fed to the photosensitive member drum 101, is passed without being copied in the process portion, furthermore is inverted on the switch back route 112, and is discharged onto the offset tray 110 so that the last even-number page (4 page) may become upward. In FIG. 17(VI), the first document $X_1$ is taken out from the document hopper 2 again to expose the last odd-number page (third page) in the second exposure portion 6, to operate the copy process portion to copy the last odd-number page on the new third copy sheet thereafter is discharged without being inverted onto the offset tray 110. In FIG. 17(VII), the copying operation is not effected as in FIG. 17(V), the copy sheet $Y_2$ (which is formed on the second page) accommodated within the intermediate tray 113 is discharged with the image face being upward towards the offset tray 110 through the switch back route 112. In FIG. 17(VIII), the odd-number page (first page) of the second document is exposed in the second exposure portion 6 to form the images on the photosensitive member drum 101, as in FIG. 17(IV), to copy the images on the copy sheet $Y_4$. FIG. 17(IX) is a view wherein the operation of FIG. 7(VIII) is completed, the document $X_2$ is accommodated in the same order of the original page again in the document hopper or the copy sheet $Y_4$ has completed discharging with the image faces being upward on the copy sheet $Y_3$ on the offset tray. Namely, the duplex document X is rotated two times by the operation of FIGS. 17(II) through 17(X) to provide the simplex duplicates $Y_1$ through $Y_4$. FIG. 17(X) is a view completing the two-sheet copying operation through again repeating the operation of FIGS. 17(II) through 17(IX).

FIG. 19 is an operation pattern view of the DS2 mode of the face down showing a case where the copying operation is effected in a copying mode for providing one sheet of the simplex duplicate through the rotation of the duplex document X.

In FIG. 19(II), the same operation is effected as that in FIG. 12(II), so that the last even-number page (fourth page) of the document is copied on the first copy sheet $Y_1$. In FIG. 19(III), the copy sheet Y is discharged into the offset tray 110 without being inverted. Thereafter, the document $X_1$ taken out in FIG. 19(II) is inverted on the switch back carrying passage 30. Then, the reverse face (third page) is exposed in the second exposure portion 6 to copy the images (images of the third page on the second copy sheet $Y_2$ taken out from the sheet-feeding cassette 106. In FIG. 19(IV), the copy sheet $Y_2$ is discharged to the offset tray 110 without being inverted. The second page of the second document X is exposed in the first exposure portion 5 as shown in FIG. 19(II) to copy the images of the second page on the third copy sheet $Y_3$. In FIG. 19(V), the copy sheet $Y_3$ is discharged to the offset tray 110 without being inverted. After the second document $X_2$ has been inverted in the switch back passage 30 as shown in FIG. 19(III). the first page is exposed in the second exposure portion 6 to copy the images of the first page on the fourth copy sheet $Y_4$. In FIG. 19(VI), the document $X_2$ is returned from the bottommost face side of the document X to the document hopper 2 so that the document $X_2$ may become the same in its vertical direction. Also, the copy sheet $Y_4$ is discharged without being inverted onto the offset tray 110.

One sheet of the simplex duplicates $Y_1$ through $Y_4$ may be provided by one circulation of the duplex document X from the above described operation. FIG. 19(VII) is a view showing how two sheets of the duplex duplicates are provided through the repeated operation of FIGS. 19(II) through 19(VI).

FIG. 21 is an operation pattern view of an SD mode of the face down. It is a copying mode, in which the duplex duplicate Y (which is shown by $Y_1$, $Y_2$ in FIG. 21) from the simplex document X (which is shown by four sheets $X_1$ through $X_4$ in FIG. 21).

In FIG. 21(I), the simplex document X of four pages is placed in the document hopper 2 with its face being downward.

The document is even in the number of the sheets

In FIG. 21(II), a first document $X_1$ is picked up from the bottommost face of the document hopper 2, is inverted one time along the carrying route of the RDH, is passed without being disposed in the first exposure portion 5, is switched back in the switch back carrying passage 30 and thereafter the four-page are exposed in the second exposure portion 6. On the other hand, the sheet is taken out from the sheet-feeding cassette 106 onto the first copy sheet $Y_1$ to copy the images located on the photosensitive member drum with the images of four pages being formed thereon.

The document is odd number in page

By the detection of the odd number of the document (the detection in the similar manner even in the even number) through the known method of detecting the number of documents by one circulation of the document before the copying operation is effected or of using the keys (not shown) on the operation panel, the document odd-number page on the topmost face as shown in FIG. 21(III) is fed idle (namely, the document X is carried along the carrying route of the RDH without being exposed or being copied, and is returned to the bottommost face of the document of the document hopper 2).

When the copy sheet $Y_1$ which has the even-number page copied exists in FIG. 21(III), the copy sheet $Y_1$ is accommodated with the image face being upward on the intermediate tray 113 in FIG. 21(II).

In FIGS. 21(IV) and 21(V), the operation of FIGS. 21(II) and 21(III) is repeated to copy the two-page of the document on the second copy sheet $Y_2$ to accommodate it onto the intermediate tray 113. FIG. 21(VI) shows a view when the copying operation of the documents of all the evennumber pages has been completed by the above-described operation. FIG. 21(VII) shows the condition in which the document is the second circulation.

The document is even number in page

As shown in FIG. 21(VII), the document (four-page) on the topmost face is fed idle as described hereinabove, and advances to FIG. 21(VIII).

The document is odd number in page

As shown in FIG. 21(VIII), the document on the side of the topmost is carried up to the second exposure portion 6, as in FIG. 21(II), to expose the images of the odd-number page. On the other hand, the copy sheet $Y_1$ on the side of the bottommost which is accommodated in the intermediate tray is fed to copy the images of the three-page on the face of the copy sheet $Y_1$ with no images being formed thereon. In FIGS. 21(IX) and 21(X), the copy sheet $Y_1$ is discharged onto the offset tray 110 without being inverted and the images of the one page are formed on the imageless face of the copy sheet $Y_2$ and are copied by the operation of FIGS. 21(VII) and 21(VIII). FIG. 21(XI) is a view in which the operation of FIG. 21(X) is completed. Namely, the document $X_4$ is returned without being changed in its original vertical direction from the bottommost face of the document hopper 2 and the copy sheet $Y_2$ is discharged without being inverted onto the offset tray 110. The copying operation of all the odd-number pages is completed by FIGS. 21(VII) through 21(XI) in this manner. The duplex copying operation has been completed from the simplex document by the operation of the above-described FIGS. 21(II) through 21(XI). FIG. 21(XII) is a view in which the two sheets of copying operation is completed by the repetition of the operations of FIGS. 21(II) through 21(XI).

FIG. 23 is an operation pattern view of an SS mode of the face down, wherein the two sheets of simplex copying operation is effected from two simplex documents.

In FIG. 23(I), the simplex document X is put into the document hopper 2 with its face being downward. In FIG. 23(II), the document on the topmost face is taken out from the topmost face of the document hopper 21 is inverted in accordance with the carrying route of the RDH. Thereafter, the document is directed to pass the first exposure portion to pass and is switched back to the switch back carrying passage 30 so as to expose the two-page in the second exposure portion 6. The copy sheet $Y_1$ fed from the sheet-feeding cassette 106 is carried towards the photosensitive member to copy the images of the two-page and is carried towards the offset tray 110. In FIG. 23(III), the copy sheet $Y_1$ is discharged into the offset tray 110 without being inverted, and the one page of the document X is exposed in the second exposure portion 6 by the repetition of the operation of FIG. 23(II). Or the one-page of images are copied on the second copy sheet $Y_2$. In FIG. 23(IV), the copy sheet $Y_2$ is discharged without being inverted onto the offset tray 110. By the above-described operation, the simplex document is caused to make one rotation so as to be restored to the document hopper 2 in the original order of the pages, with the simplex duplicate of the sheet corresponding to the document X being provided. FIG. 23(V) is a view in which two sheets of copying operation is completed through the repetition of FIGS. 23(II) through 23(IV).

FIGS. 25, 26, 27, 29, 31 and 33 are operation pattern views, wherein the document X with its face being upward is placed in the document hopper 2 in the duplex copying apparatus of the first embodiment, showing the DD1 mode through SS mode as shown respectively in Table 2.

The operation patterns of the above-described face up show operations corresponding to the operations shown respectively in FIGS. 12, 15, 17, 19, 21 and 23, which are the operation pattern views in a case where the document X has been placed with its face being downward in the document hopper 2 of the duplex copying apparatus in the above described first embodiment.

In the case of the face up in FIG. 25, it subsequently will be described through comparison with FIGS. 12 through 23.

FIG. 25 is an operation pattern view of the DD1 of the face up, wherein the duplex document X is placed with its face being upward on the document hopper 2, showing the flow of the operation of the first copying mode for effecting the duplex copying operation on the copy sheet Y.

As in FIG. 25, the method of setting the document is inverted in top and bottom with respect to FIG. 12.

(1) The first page of the document X in FIG. 12 is replaced by the fourth page in FIG. 25. In the same manner, the second, third and fourth pages of FIG. 12 are respectively replaced by the third, second and first pages of FIG. 25.

(2) The document X and the copy sheet Y on the offset tray 110 is replaced reversely in direction by FIG. 12.

(3) The odd number is replaced by the even number.

Through the respective operations of the above-described items (1) through (3), the operation patterns of FIGS. 25(I) through 25(VIII) and the operations of the respective portions may be replaced by the same operation, corresponding respectively to (I) through (VIII) of FIG. 12. Thus, the detailed description of the individual operation patterns is omitted.

FIG. 26 is an operation pattern view of the DD2 mode of the face up, wherein the duplex documents X are set up with its face being upward on the document hopper 2, showing the flow of the operation when the duplex duplicate may be provided in the DD2 mode.

FIGS. 26(I) through 26(X), as in FIG. 25, become respectively the same as the operation pattern as FIGS. 15(1) through 15(X) by:

(1) the first through the fourth pages are respectively replaced by the fourth through first pages; and (2) the direction of the document X within the document hopper 2 is replaced by the top and bottom direction of the copy sheet Y on the offset tray 110, with the detailed description of each operation being omitted.

FIG. 27 is an operation pattern view of the DS1 mode of the face up, where the duplex document X is set up on the document hopper 2 with its face being upward, showing the flow of the operation when the simplex duplicate is provided.

FIGS. 27(I) through 27(X) effect approximately similar operation as in FIGS. 17(I) through 27(X), wherein the copying operation is performed by the use of the DS1 mode with the face being downward in the document setting.

Even in FIG. 27, as in FIG. 25, (1) the first page is replaced by the fourth page with the page order of the document being reversed; (2) the direction of the document within the document hopper 2 and the top and bottom of the copy sheet Y on the offset tray 110 are reversed; and (3) the operations become those approximately corresponding to FIGS. 17(I) through 17(X) by the replacement between the odd numbers and the even numbers. In FIG. 17(V) and FIG. 17(VII), the copy sheets $Y_1$ and $Y_2$ are inverted and discharged by the switch back 112 at the idle discharging operation of the even-number pages, while in FIG. 27(V) and FIG. 27(VII), the copy sheets $Y_1$ and $Y_2$ are discharged onto the offset tray 110 without being inverted at the idle discharging operation of the odd-number pages. The copy sheets $Y_3$ fed in FIG. 17(VI) and the copy sheets $Y_4$ fed in FIG. 17(VIII) are discharged onto the offset tray 110 without being inverted, while the copy sheet $Y_3$ fed in FIG. 27(VI) and the copy sheet $Y_4$ fed in FIG. 27(VIII) are inverted and discharged in the switch back route 112, which is different from FIG. 17.

FIG. 29 is an operation pattern view of the DS2 mode of the face up, wherein the duplex documents are placed on the document hopper 2 with faces being upward, showing the flow of the operation when the simplex copying operation is effected.

FIGS. 29(I) through 29(VII) show that the operations are approximately the same through the replacement of the following two points that (1) the order of the first through fourth pages is inverted, and (2) the document X within the document hopper 2 and the copy sheet Y on the offset tray 110 are inverted in the top and bottom in the operation pattern views of FIGS. 19(I) through 19(VII). The difference between them is that in FIGS. 19(III) through 19(IV), all the copy sheets $Y_1$ through $Y_4$ are inverted through the use of the switch back route 112 and are discharged onto the offset tray 110 so that the images ay become downward. As the other operations are similar to those of FIG. 19, the detailed described will be omitted.

FIG. 31 is an operation pattern view of the SD mode of the face up, wherein the simplex documents X are set up with the faces being upward on the document hopper 2, showing the flow of the operation for effecting the duplex copying operation.

FIG. 31(I) shows a condition wherein the simplex documents X of the fourth page are set up with their faces being upward on the document hopper 2 in the order of the pages. In FIG. 31(II), the document $X_1$ on the topmost face of the document hopper 2 is fed and inverted along the route of the RDH, and is carried to the first exposure portion 5 so as to expose the first page. On the other hand, the first copy sheet $Y_1$ is taken out from the sheet-feeding cassette 106 to copy the first page of images formed on the photosensitive member drum 101. In FIG. 31(III), the first document X is inverted in the switch back carrying passage is inverted, then is passed without being exposed in the second exposure portion 6 so that it is returned to the document hopper 2 from the side of the bottommost face of the document hopper 2 without being changed in the direction of the original page. The next document $X_2$ is taken out from the topmost face of the document hopper 2, at this time is carried along the route of the RDH without being exposed even in the first exposure portion 5, the second exposure portion 6 and is returned (loose feeding operation is effected) onto the bottommost face of the document hopper 2 without being changed in the direction of the original page.

The first copy sheet Y is inverted by the switch back route 112 so that it is accommodate with its image face being upward in the intermediate tray 113. In FIG. 31(IV), the third page is exposed in the first exposure portion 5 by the operation similar to that of FIG. 31(II)

to copy the images on the second copy sheet $Y_2$. In FIG. 31(V), the fourth document is idly fed by the operation similar to that of FIG. 31(III) so that it is returned in its original page orientation onto the side of the bottommost of the document hopper. The images of the third page are formed on the second copy sheet $Y_2$ so that the copy sheet is accommodated onto the intermediate tray 113. It follows that the copying operations of all the odd-number pages of the four simplex documents X have been completed through one rotation (FIG. 31(VI)) by the operation of FIGS. 31(II) through 31(V). In FIG. 31(VII), the first page of the document X is idly fed as described hereinabove. In FIG. 31(VIII), the second page of the document X is taken out from the document hopper 2, is exposed in the first exposure portion 5, while the first copy sheet $Y_1$ accommodated on the bottommost face of the intermediate tray 113 is carried so that the imageless face may be exhibited with respect to the document drum 101 from the intermediate tray 113 to copy the images on the second page. In FIG. 31(IX), the copy sheet $Y_1$ is discharged onto the offset tray 110 without being inverted, while the document $X_3$ of the third page with the topmost face being provided on the document hopper 2 is idly fed and is returned in the orientation of the original page onto the bottommost face of the document hopper 2. In FIG. 31(X), the fourth page of the document is exposed in the first exposure portion as in FIG. 31(VIII), while the second copy sheet $Y_2$ accommodated in the intermediate tray 13 has the fourth-page images of the document copied on the imageless face. When the last page of all the documents is odd in number, the document of the last operation of FIG. 31(X) is not fed, and the copy sheet within the intermediate tray 113 is discharged with the image face being provided downward without being copied. In FIG. 31(XI), the copying operation of the even-numbered page is completed in FIGS. 31(VII) through 31(X), and simultaneously duplex duplicate is completed by one sheet on the offset tray 110. In FIG. 31(XII), two duplex duplicates are provided by the repetitions of FIGS. 31(II) through 31(XI).

FIG. 33 is an operation pattern view of the SS mode of the face up, wherein three simplex documents X are set up with their face being upward in the document hopper 2, showing the operation of providing the single-face duplicates.

FIG. 33(I) is a view wherein the simplex document X is set up with its face being upward in the document hopper 2. In FIG. 33(II), the document $X_1$ on the topmost face of the document hopper is taken out, is carried to the first exposure portion 5 to effect the exposing operation. The first copying sheet $Y_1$ is taken out from the sheetfeeding cassette 106 to copy the images (one page) of the document $X_1$ formed on the photosensitive member. In FIG. 33(III), the copy sheet Y is inverted by the switch back 112 and is discharged onto the offset tray 110. The second document $X_2$ is then exposed in the first exposure portion 5 as shown in FIG. 33(II) to copy the images on the second copy sheet $Y_2$. In FIG. 33(IV), the images of the third document $X_3$ are copied on the third copy sheet $Y_3$ as shown in FIG. 33(III), with the copying operation being completed by one sheet. In FIG. 33(V), the copying operation of two sheets is completed by the repetition of FIGS. 33(II) through 33(IV).

The relationship between each copying mode of the face-down of the first embodiment and each copying mode of the face-up and the flow chart is shown in Table 2. Namely, flow charts in a case where the copying operations are performed in the respective copying modes of DD2, DS1, DS2, SD, and SS with the face being downward are shown in the drawings next to the respective operation pattern views, i.e., FIGS. 16, 18, 20, 22 and 24. Similarly, the flow charts in a case where copying operations are effected in the respective copying modes of DS1, DS2, SD and SS with the face being upward are shown in the drawing next to the respective operation patters, i.e., in FIGS. 28, 30, 32 and 34.

The above-described flow charts are made in accordance with the flow charts of FIG. 13 and FIGS. 14(A) through 14(I) with respect to the operation pattern view of the DD1 mode of FIG. 12. As they are fully explained in the description of FIGS. 13 and 14, the description of the flow charts will be omitted.

It is to be noted that the flow charts of FIGS. 13 and 16 are used commonly with the face being upward and the face being downward.

Second Embodiment (Construction of the Second Embodiment)

FIGS. 35 through 49 show the second embodiment of the present invention.

Figure 35:
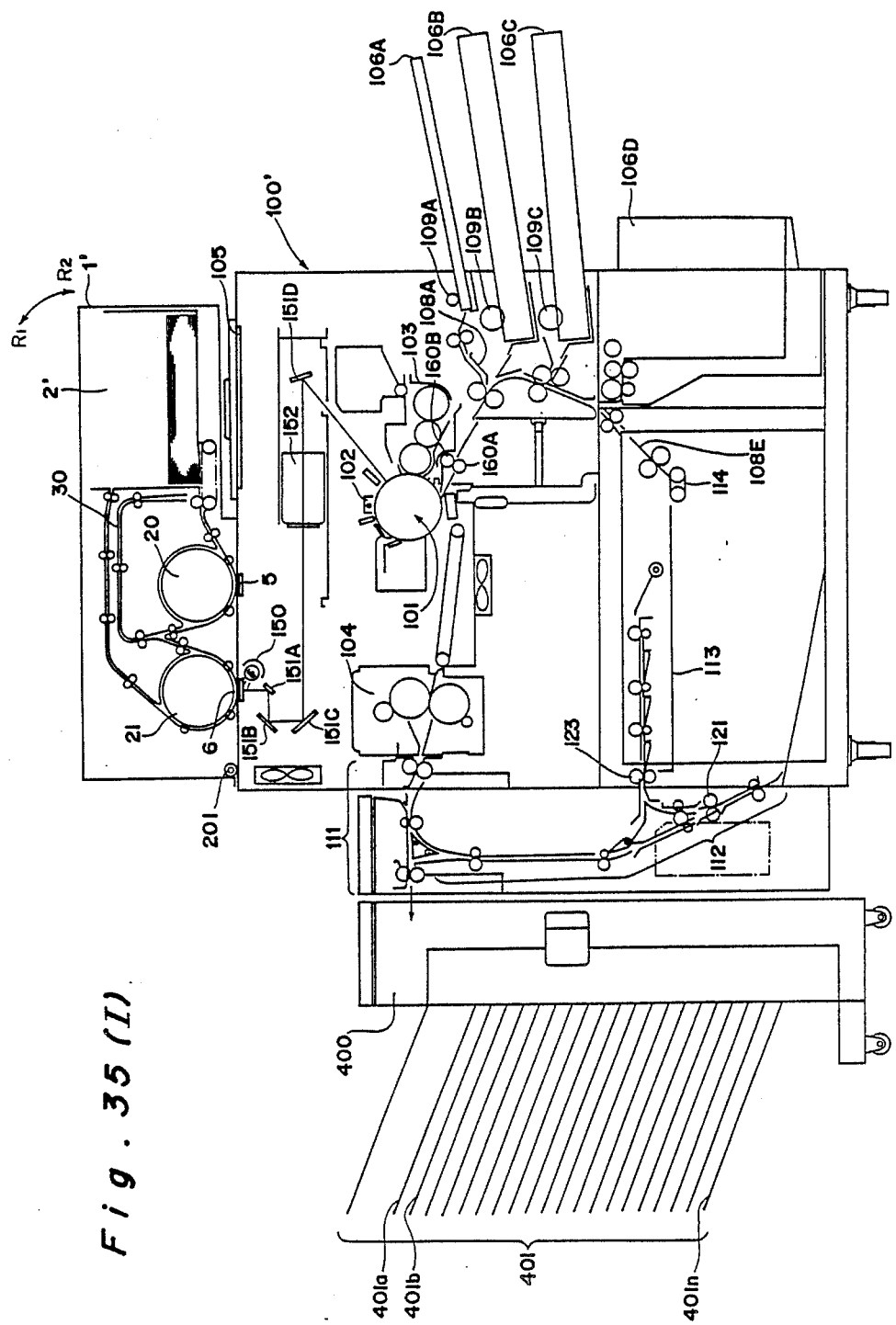
FIG. 35(I) is a whole construction view of the duplex copying apparatus provided with a circulating type of automatic document feeding apparatus showing the second embodiment of the present invention, and FIG. 35(II) is a partially enlarged view of FIG. 35(I)
Figure 35:
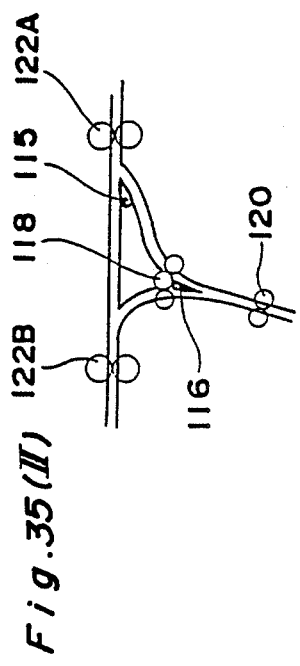
Figure 36:
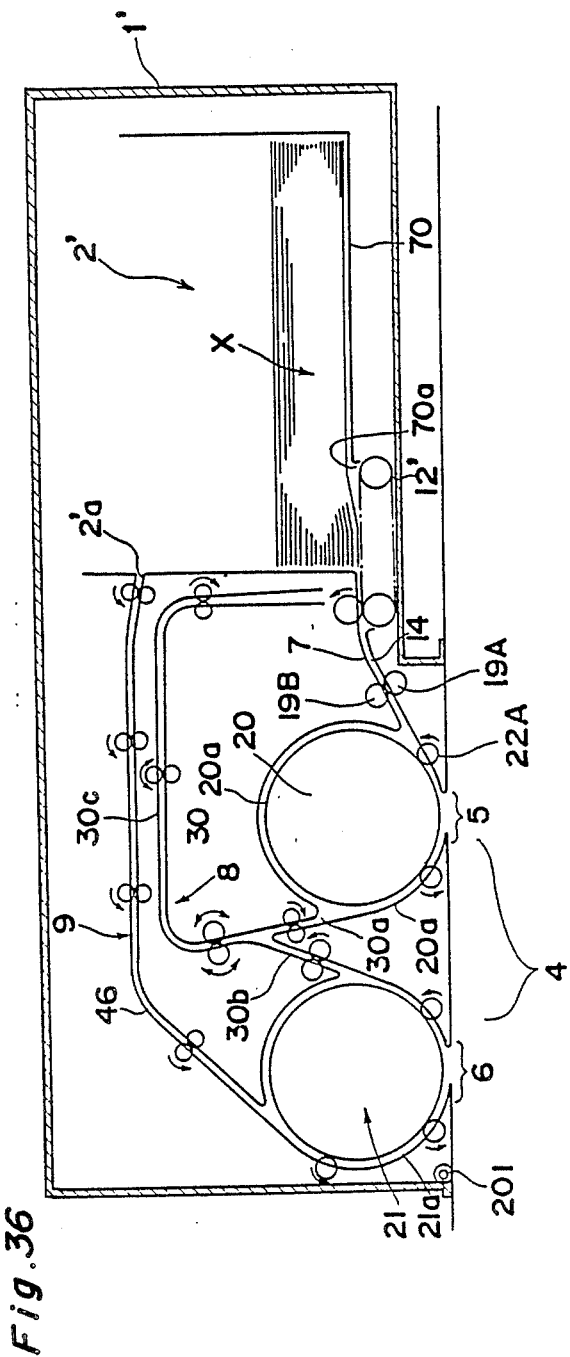
FIG. 36 is an enlarged construction view of a circulating type of automatic document feeding apparatus in the second embodiment.

In the automatic duplex copying apparatus with a circulating type of automatic document feeding apparatus (RDH) of the second embodiment attached thereon, the construction of the document hopper 2' of the RDH1' changes a style in which the document X is picked up from the bottommost face and is returned onto the topmost face, and the document hopper 2' is arranged on the right side of the first exposure portion 5 as shown in FIGS. 35(I) and 35(II), and FIG. 36. In the carrying passage 14 between the document hopper 2' and the first exposure portion 5, the document X is carried to be once inverted in the first embodiment, while the document X is adapted to be carried to the first exposure portion 5 without being inverted in the second embodiment. Also, in the carrying passage 9 of the document returning to the document hopper 2' from the second exposure portion 6, the document X is returned without being inverted, in contrast with the above description, in the first embodiment, while the document X is inverted and is adapted to return to the document hopper in its original page orientation in the second embodiment.

The construction of the automatic duplex copying apparatus of the second embodiment will be described hereinafter.

The basic construction of the copying machine main body 100' of the second embodiment is similar to that of the copying machine main body in the first embodiment as shown in FIG. 35, with the same reference characters being given to the portions of the functions as those of FIG. 1, showing the copying apparatus of the first embodiment.

A sorter 400 which is mounted on the left side of the copying machine main body 100' is functionally important in the different construction between the second embodiment and the first embodiment. The sorter 400 is effective in the sorting operation of the duplicates performed in a shorter time, when the RDH1' has been used in the ADF mode to be described later or when a plurality of sheets are copied in the third exposure portion.

Also, the RDH1' is rotatably supported through the shaft in the directions of R1 and R2 through the rotary shaft 201 with respect to the copying machine main body 100'. It is adapted to be vertically split and opened along the carrying passages 14, 30a and 30b of the bottommost face when the document X is copied in the third exposure portion 105, if the exposure X has the JAM caused in the first exposure portion 5 or the second exposure portion 6 or for services. The other constructions are almost similar to the construction of the first embodiment, with the description being omitted.

The size of the copying machine main body 100' becomes larger. The light path of the optical system is made longer so that the third exposure portion 105 may be arranged on the further right-hand side of the document hopper 2 or the light path is changed so that the third exposure portion 105 may be arranged on the left-hand side of the second exposure portion 6. In this case, when the document X is copied in the third exposure, it is not required to have the third exposure portion 105 through the rotating operation of the RDH1'.

The construction of the RDH (circulating type of automatic document feeding apparatus) of the second embodiment is adapted through the selection when necessary in the mechanism or the like of the document drum described in FIGS. 3 through 6 showing the construction of the RDH of the first embodiment in that the document X placed within the document hopper 2 is adapted to be taken out from the bottommost side and is fed onto the carrying passage on the side of the exposure. Namely, an opening 70a for taking out use is provided in the lower end document stand 70 on which the documents X of the document hopper 2' are placed, a sheet-feeding roller 12' is provided in opposition to the opening 70a so that the sheet documents X are delivered one by one onto the carrying passage 14 of the first carrying means 7 by the sheet-feeding roller 12'. The sheet documents X are carried into the first exposure portion 5 of the document presentation portion 4 by the first carrying means 7. After the carrying direction has been inverted in the switch face carrying passage 30 of the second carrying means 8, they are carried to the second exposure portion 6. Then, by the carrying passage 46 of the third carrying means 9, the sheet documents X are returned above the document hopper 2' so as to feed the circulated document X onto the accumulated topmost end document X.

In the second embodiment schematically described, the construction thereof is similar to that of the first embodiment except for the construction that the documents X are picked up from the bottom from the document hopper 2' to feed them, with the same reference characters being given to omit the description. Namely, various sensors, motors, clutches and solenoids are provided in the similar positions as in FIGS. 1, 2 and 7 shown in the first embodiment. As the controlling circuit in the second embodiment, the controlling circuit shown in FIG. 8 of the first embodiment is used, with the operation panel of FIG. 9 being similarly used. The selection mode of the select switches SSW 1 through SSW 4 which performs the respective copying mode selections of Table 1, and the flow chart showing the mode-selection condition shown in FIG. 11 are used even in the second embodiment.

(Operation Pattern of Second Embodiment)

Figure 37:
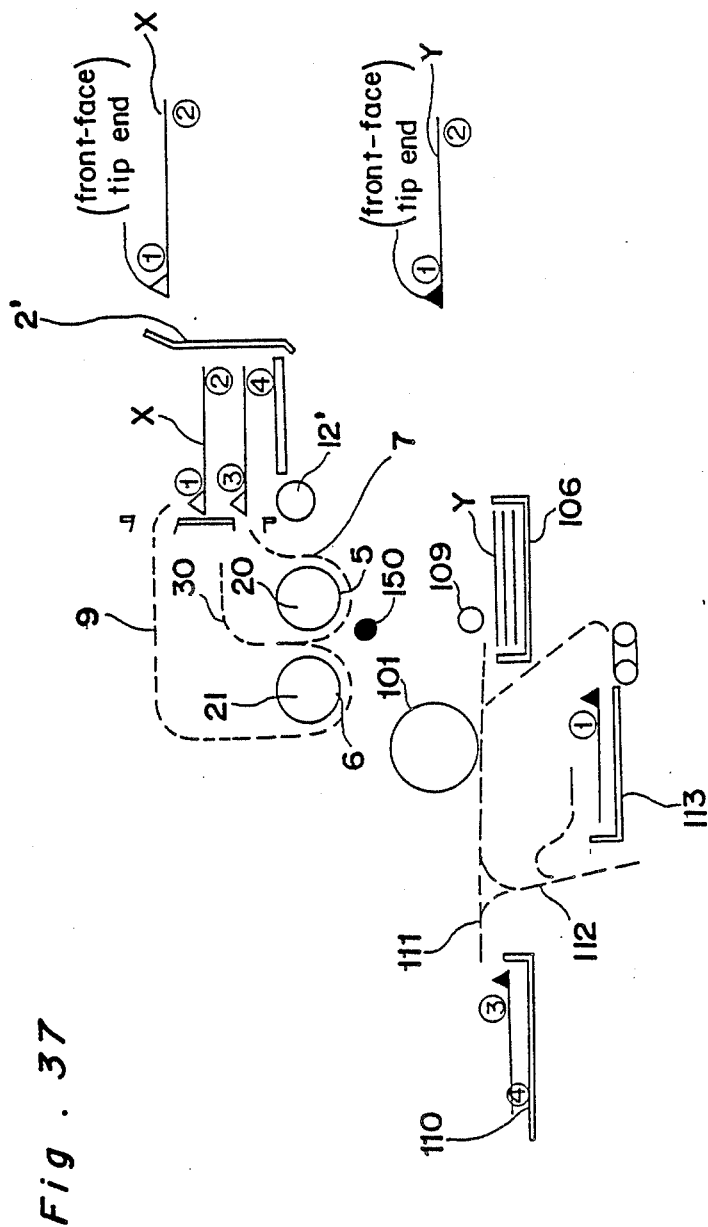
FIG. 37 is a view for illustrating the basic operation pattern in the second embodiment.

The basic shape of the operation pattern in the second embodiment is shown in FIG. 37.

FIG. 37 shows only the representative mechanism portion for illustrating the relationship between the movement of the document X and the copy sheet Y in the second embodiment, and the timing thereof as in the operation pattern in the first embodiment. The difference between FIG. 37, which is a basic operation pattern view of the second embodiment, and FIG. 10, which is a basic operation pattern view of the first embodiment, is that the document hopper 2' arranged on the right side of the first exposure portion 5 and the document X placed within the document hopper 2' is taken out from the bottommost face and is carried along the carrying passage of the RDH1', thereafter it is returned (namely, the document hopper of taking out from the bottom and returning to the top) without being changed in its original orientation from the side of the topmost face of the document hopper 2'. Also, the sorter 400 will be briefly described as the mode of the basic operation mode, instead of the offset tray 110 described in the first embodiment. The other constructions are similar to those of FIG. 10.

FIGS. 38 through 43 are operation pattern views showing the flow of the operations in a case where the copying operations are effected in the respective copying modes of the DD1, DD2, DS1, DS2, SD and SS, with the documents X being set up with their faces being downward with respect to the document hopper 2' in the second embodiment as shown in Table 2. The operation pattern view with the documents X being set up with their faces being downward in the document hopper 2' in the second embodiment shows that the extremely similar operations are effected in the respective same copying modes as compared with a case where the documents have been set up with their faces being upward in the document hopper 2 in the first embodiment.

Namely, on the RDH side, (1) the order of taking out the document X or returning it; (2) the exposing order of the taken out document X; and (3) the exposure portions become the same in the above-described embodiment. The operation of the copy sheet Y in the copying machine main body 100' corresponds to the operation of the document X within the above-described RDH. In the second embodiment of the face-down, the operation of is the same in the same copying mode as in the first embodiment of the face-up.

FIG. 38 shows the face-down DD1 mode in the second embodiment. The mode is the same in operation as FIG. 25 showing the face-up DD1 mode of the first embodiment with the exception of the document hopper portion.

FIG. 39 shows the face-down DD2 mode in the second embodiment. The mode is almost similar to FIG. 26 showing the DD2 mode of the face up in the first embodiment.

FIG. 40 shows the face-down DS1 mode in the second embodiment. The mode is almost similar to that of FIG. 27 of the first embodiment.

FIG. 41 shows the face-down DD2 mode in the second embodiment. The mode is almost similar to that of FIG. 29 in the first embodiment.

FIG. 42 shows the face-down SD mode in the second embodiment, the mode is almost similar to that of FIG. 31 in the first embodiment.

FIG. 43 shows the face-down SS mode in the second embodiment. The mode is almost similar to that of FIG. 33 in the first embodiment.

The above respectively show the same operation except for the neighboring portion of the document hopper portion. The difference in the operation pattern view between both modes of the second embodiment and the first embodiment is only one between the position of the document hopper, and the face-up setup thereof.

As in the flow charts of the respective modes of the face-down in the second embodiment, FIG. 13 may be used in the DD1 mode. Likewise, in the respective modes of DD2, DS1, DS2, SD and SS, the flow charts of FIGS. 16, 28, 30, 32 and 34 in the first embodiment may be used.

As shown in Table 2, FIGS. 44 through 49 are operation pattern views showing the flow of the operation in a case where the copying operations are effected in the respective copying modes of DD1, DD2, DS1, DS2, SD and SS, with the documents X of the face-up being set up in the document hopper 2' in the second embodiment.

Each operation pattern with the face-up in the second embodiment is extremely similar to the operation pattern in the same copying mode of the face down in the first embodiment. Namely, as described in accordance with FIGS. 38 through 43 in the operation pattern of the face down in the second embodiment, the characteristic difference between them is the position of the document hopper and the face-up setting of the document or the face-down setting thereof.

Namely, FIG. 44 shows the face-up DD1 mode in the second embodiment. The operation pattern of the mode is almost similar in operation in accordance with FIG. 12, showing the operation pattern of the face down in the first embodiment, with the flow chart of the operation pattern being shown in FIG. 13.

FIG. 45 shows the face-up DD2 mode in the second embodiment. The flow chart which corresponds to, likewise, FIG. 15 becomes FIG. 16.

FIG. 46 shows the face-up DS1 mode in the second embodiment. The flow chart which corresponds to, likewise, FIG. 17 becomes FIG. 18.

FIG. 47 shows the face-up DS2 mode in the second embodiment. The flow chart which corresponds to, likewise, FIG. 19 becomes FIG. 20.

FIG. 48 shows the face-up SD mode in the second embodiment. The flow chart which corresponds to, likewise, FIG. 21 becomes FIG. 22.

FIG. 49 shows the face-up SS mode in the second embodiment. The flow chart which corresponds to, likewise, FIG. 23 becomes FIG. 24.

Third Embodiment

FIGS. 50 through 55 show a third embodiment of a duplex copying apparatus provided with a circulating type of automatic document feeding apparatus in accordance with the present invention.

(Construction of the Third Embodiment)

Figures 50, 51:
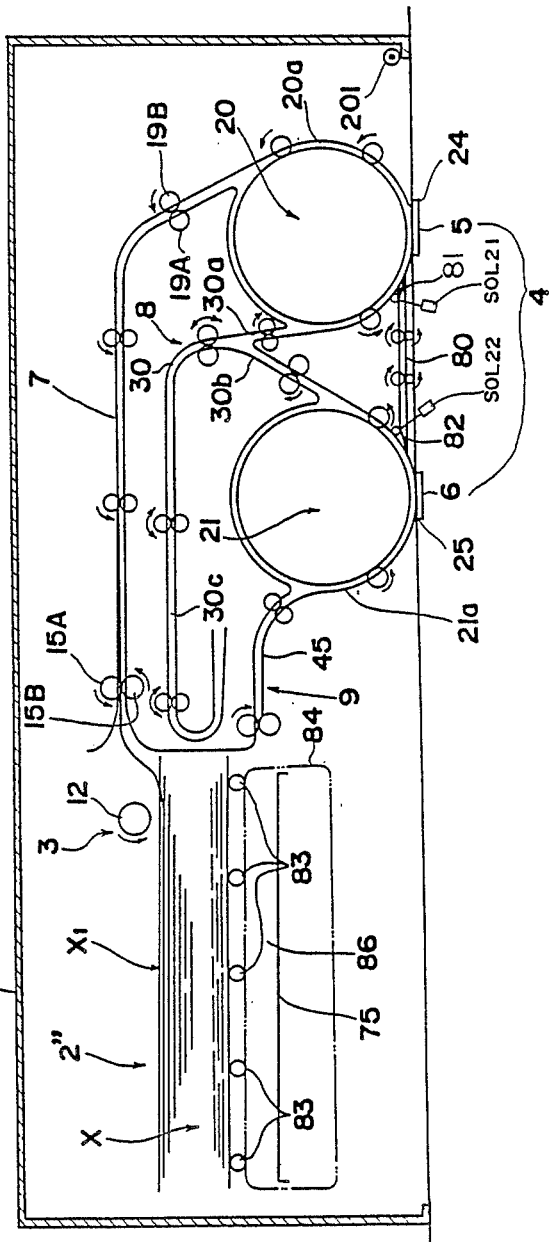
FIG. 51 is an enlarged construction view of a circulating type of automatic document feeding apparatus in the third embodiment.

FIG. 50(I) shows a central section of an automatic duplex copying apparatus having a circulating type of automatic document feeding apparatus 1" (hereinafter referred to as RDH 1") of the third embodiment mounted and using the copying machine main body of the second embodiment. FIG. 50(II) is a partially enlarged view of a route 111 connecting the copying machine main body 100' of FIG. 5(I) with the sorter portion 401.

A circulating type of automatic document feeding apparatus 1" of the third embodiment is composed of the construction shown in FIG. 51, wherein a switch back carrying passage 30 which inverts the carrying direction of the sheet document X is provided between the first exposure portion 5 of the document presentation portion 4 and the second exposure portion 6 thereof is provided, a bypass route 80 which does not invert it is provided.

Namely, the bypass route 80 is provided which causes the first exposure portion 5 of the lower end of the first document cylinder 20 to almost linearly communicate with the second exposure portion 6 of the lower end of the second document cylinder 21. The bypass route 80 may be a route which returns to the document hopper without being inverted, and is not required to go from the first exposure portion 5 to the second exposure portion 6. The gate flapper 81 is provided at the connection portion between the bypass route 80 and the external periphery carrying passage 20a of the first document cylinder 20. Also, a gate flapper 82 is provided at the connection portion of the external periphery carrying passage 2a of the second document cylinder 21. When the sheet document X is carried to the bypass route portion 80, both the gate flappers 81, 82 are operated to open the passage. The gate flappers 81, 82 are operated to open the passage. The gate flappers 81, 82 are respectively operated closed by solenoids SOL 21, SOL 22 (not shown). These solenoids SOL 21, SOL 22 are operated by the detection signal of a rotate on-number detecting sensor (not shown) disposed on the document cylinders 20, 21. The document cylinder is rotated by the set number through the instructions of the operation so that the gate flappers 81, 82 are adapted to open, close as the document X is exposed.

Also, in the document hopper 2", the sheet documents X placed therein are picked up from the top and are fed one by one to the first carrying means 7. But in the present embodiment, the sheet documents X are supported by a plurality of document support roller 83. These document support rollers 83 are mounted at intervals like the rungs of a ladder on the endless belt or chain 84 so as to support the sheet documents X. The sheet document stand 75 is located under the document support roller 83 to form the space 86 so that the sheet documents X, which are exposed and discharged after having passed the carrying passage 46, may be naturally accommodated thereinto. When the sheet documents X discharged are accommodated in the space 86, the belt 84 is rotated by 180 degrees. When the document support roller 83 moves, a plurality of sheet documents X supported by the document support roller 83 are lowered on the sheet document stand 75 so as to lie on the discharged sheet documents. Thereafter, the belt 84 is further rotated to return the document support roller 83 into its original position to support the sheet documents, with the discharged sheet document and a plurality of sheet documents being piled up, by the document support roller 83 so that the following sheet document to be discharged may be accommodated onto the sheet document stand 75.

As the other constructions of the third embodiment ar almost the same, the reference characters are given to omit the description.

When the bypass route portion is used in the present embodiment, the top face of the sheet document X is exposed in the first exposure portion 5 by the required number, thereafter it is drawn into the bypass route portion 80 through the gate flapper 82, is wound on the second document cylinder 21 through the gate flapper 82, so that the sheet document X is accommodated onto the sheet document stand 75 from the carrying passage 45 of the third carrying means 9 without being exposed in the second exposure portion 6. In the accommodating condition, the sheet documents X are accommodated in the condition with the bottom face of the sheet document X being upward, which is opposite to a condition (having the top face of the sheet document X upward), wherein the operator has, at first, placed within the hopper 2". In this manner, the top face of one sheet document X is exposed in the first exposure portion 5, thereafter the top face of the next sheet document is exposed in the first exposure portion 5, the sheet documents X which have the top-face exposing operations of all the sheet documents X completed are piled up with the bottom faces of the original setting condition being upward within the document hopper 2". On the other hand, the copy sheet (not shown) which has the top face of the sheet document X copied in the first document portion 5 is accommodated in the intermediate tray 113 within the copying machine main body 100". At a time point when the exposing operation of the top faces of all the sheet documents X has been completed, all the copy sheets with their top faces copied are temporarily stored with their image faces being up in the intermediate tray 113.

In the next cycle, the bottom face of the sheet document is copied in the first exposure portion 5 with respect to the imageless face of the copy sheet to be carried from the intermediate tray, so that the sheet document X is restored, in the original setting condition with the top face of the sheet document X being upward, into the document hopper 2'. This process is performed with respect to all the bottom faces of the sheet documents X, so that the bottom faces of the documents are copied upon the bottom faces of the copy sheets.

Even when the bottom face (reverse face) copying operation is effected by the use of the above-described bypass route 80, the exposing operation may be effected in the first exposure portion 5. As the sheet is not required to be reflected in the switch back carrying passage 30, the danger of causing the document jam is reduced. The copying speed may be increased by the shorter exchange time of the documents.

(Operation Pattern of the Third Embodiment)

Figure 52:
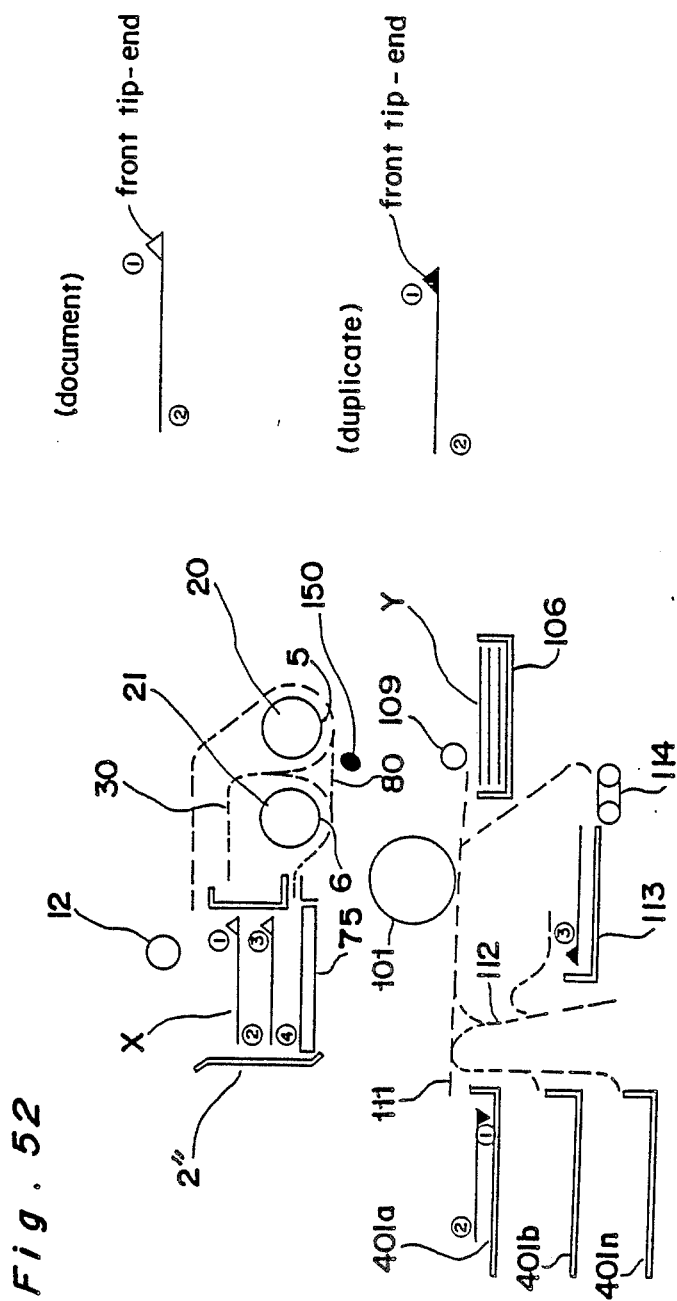
FIG. 52 is a basic operation pattern view in the third embodiment.

FIG. 52 shows a model view of the major construction portion for illustrating the operation of the circulating type of automatic document feeding apparatus in the third embodiment. The difference from FIG. 10, which is an operation pattern view of a circulating type automatic document feeding apparatus of the first embodiment, is as follows.

(1) In the third embodiment, the document X was returned by the carrying belt 11 with respect to the document hopper 2, while in the third embodiment, the document is restored onto the document stand 75.

(2) A bypass route 80 is provided between the first exposure on portion 5 and the second exposure portion 6.

(3) In the third embodiment, a sorter 400 is provided on the side of the copying machine main body 100', with the respective bottles 40a through 401n of the sorter 400 being provided. The copy sheets are adapted to be discharged one by one from the first copy sheet in the sequential order from above, when the copying operation is effected in the ADF mode, into each bottle of the sorter 400.

As the other portions are approximately similar to FIG. 10 in the first embodiment, the same reference characters are given to omit the illustration.

Figure 53:
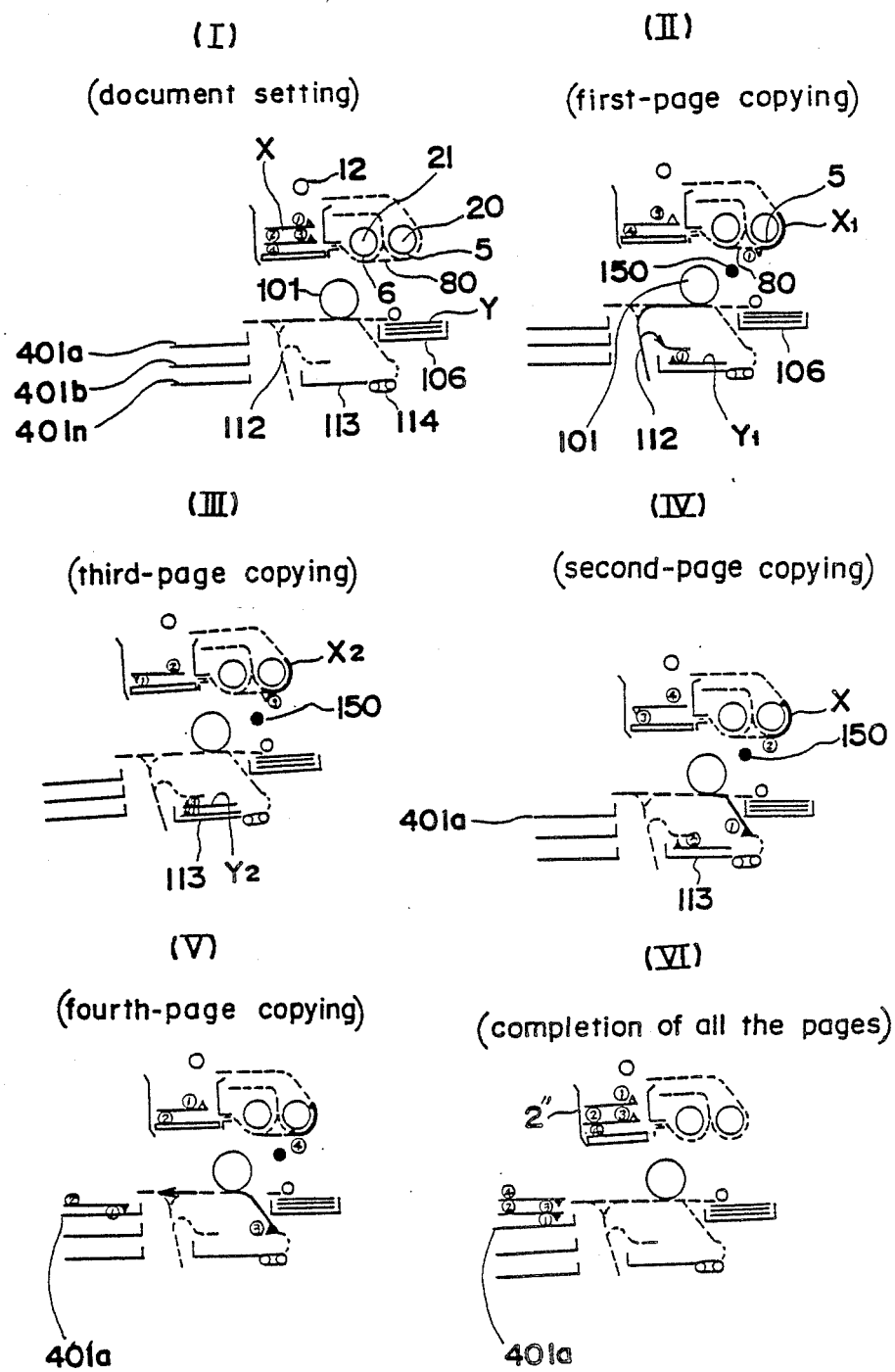

FIG. 53 describes the flow of the operation of a case (DD1 mode) where the document X is rotated two times by the use of the bypass carrying route 80 to perform the duplex copying operation with the duplex document X being set up with the face being upward in the document hopper 2" in the automatic duplex copying apparatus of the third embodiment.

FIG. 53(I) is a view with a document X being set up with the faces being up in the document hopper 2".

In FIG. 53(II), the documents X are taken out one by one from the topmost face of the document hopper 2", are inverted and carried along the carrying route of the RDH1", and thereafter the first page is exposed in the first exposure portion 5. On the side of the copying machine main body 100', the first copy sheet $Y_1$ is taken out from the sheet-feeding cassette 106 to transfer the images on the first-page face from the photosensitive body drum 101. Thereafter, the advancing direction of the copying sheet Y is inverted by the switch back route 112 so that it is accommodated in the intermediate tray 113.

In FIG. 53(III), as in FIG. 53(II), the second document $X_2$ is taken out from the document hopper 2", is inverted, then is exposed in the first exposure portion 5, so that the images are copied on the second copy sheet $Y_2$ so as to accommodate the copy sheet $Y_2$ into the intermediate tray 113 through the switch back route 112. At this time, the document $X_2$ which has completed its exposing in FIG. 53(II) is not passed through the switch back carrying passage 30, but is passed through the bypass route 80 and is returned to the document hopper 2". Thereafter, the second document $X_2$ is also exposed, likewise, in the first exposure portion 5, thereafter is returned to the document hopper 2" from the side of the bottommost face of the document through the bypass carrying passage 80 without passing through the switch back carrying passage 30. The copying operation of all the odd-number pages is completed by the above-described operation. At this time, the document X within the document hopper 2" is different in the order of the pages from the document X set up, in FIG. 53(I), with its face being upward in the document hopper 2". (Namely, the order becomes the second page, the first page, the fourth page, the third page from the top.) It follows that the document X has made one rotation of the RDH carrying route.

In FIG. 53(IV), the first document which has been inverted in the order of the pages is taken out from the topmost face of the document hopper 2", and is inverted so as to expose the second page in the first exposure portion 5. On the other hand, the first copy sheet $Y_1$ which has been taken out from the bottommost face of the intermediate tray 113 has the second-page images copied on its non-image face. The copy sheet $Y_1$, with the first page being provided under, is discharged into the sorter bottle 401. Thereafter, the document $X_1$ passes through the bypass route 80 again, passes without being exposed in the second exposure portion, and is returned in the same orientation as that provided in FIG. 53(I) from the side of the bottommost face to the document hopper 2", i.e., without being inverted. In FIG. 53(V), the fourth page of the second document $X_2$ is exposed as in FIG. 53(IV) to copy the images of the fourth page on the non-image face of the second copy sheet $Y_2$ Then, the document $X_2$ is returned from the side of the bottommost face of the document X to the document hopper 2" in the same orientation as that in the setting up of the document, so that the copy sheet $Y_2$ with its fourth page being above is discharged onto the sorter bottle 40a. In FIGS. 53(II) through 53(V), the duplex document makes two rotations to provide the duplex duplicate. FIG. 53(VI) is a view showing the completion of two-sheet copying operation through the repetition of FIGS. 53(II) through 53(V).

In the third embodiment, the bypass route 80 is used without the use of the inverting route 30 in the DS1 mode as in the DD1 mode, so that the optical system is not required to be moved, and time required for switch back operation is shortened in the route 30, thus reducing all the copying time.

It is to be noted that things are similar to those in the first embodiment in the copying mode, except for the DD1 and DS1 modes, with the detailed description thereof being omitted.

Figure 54:
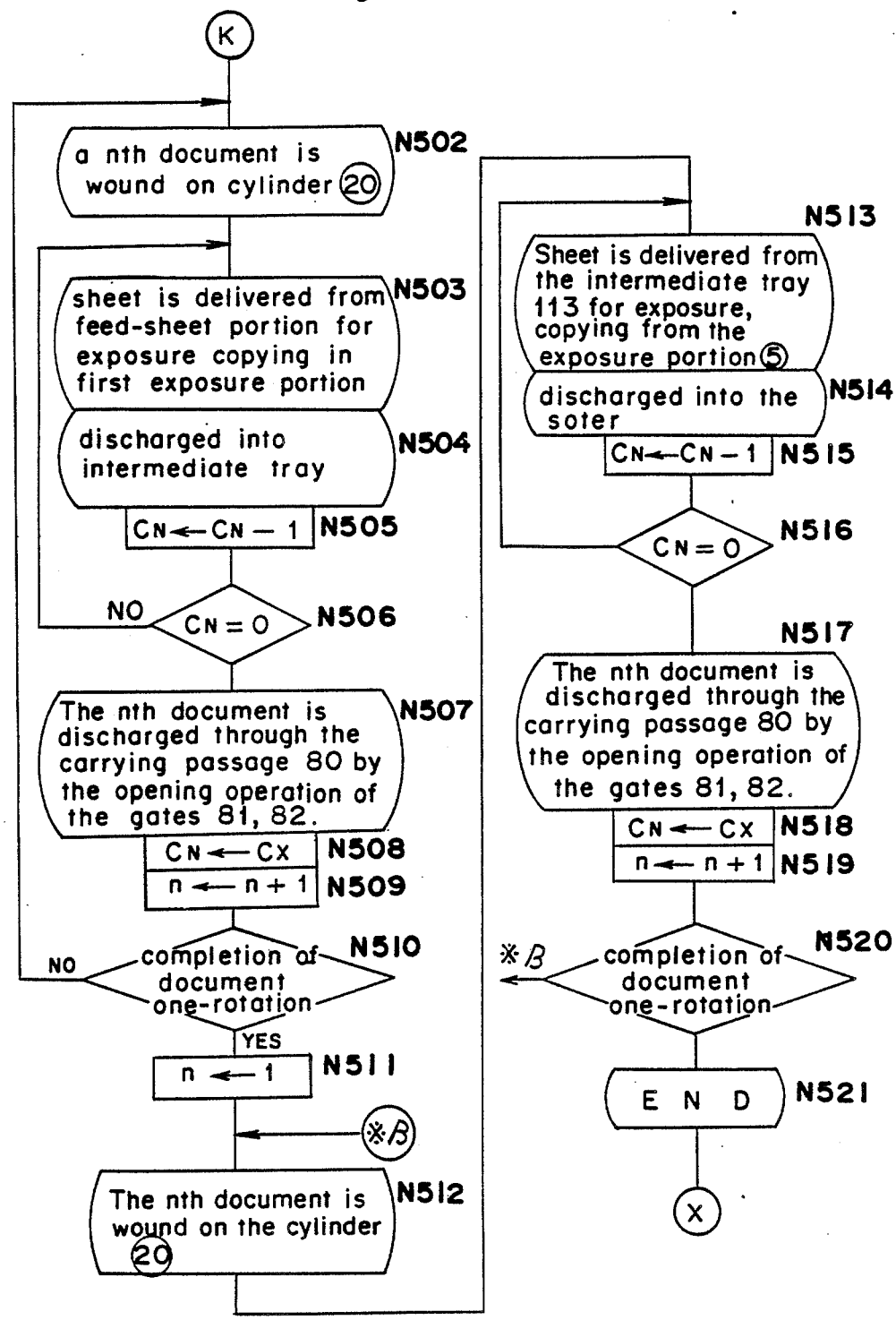
FIG. 54 is a flow chart of the copying operation in the ADF mode in the third embodiment.

FIG. 54 is a flow chart in a case where the copying operation is operated in the ADF mode in the apparatus of the third embodiment. The flow chart will be fully described with reference to the drawings.

At N502, the third document is wound on the first document cylinder 20.

At N503, the copy sheet Y is fed from the sheet-feeding cassette 106 and is carried in the direction of the photosensitive drum. The nth document is exposed in the first exposure portion 5 to copy the images of the nth document on the copy sheet Y through the operation of the respective control element of the copying process.

At N504, the copy sheet Y is accommodated through the switch back route 112, which inverts the direction of the copying sheet Y.

Then, at N505, 1 is subtracted from the counter CN to watch whether or not the counter CN has become 0 at N506. It returns to N503 till the counter CN becomes "0", so as to repeat the operations of N503 through N506. Namely, the document X is wound on the document drum 20 by N502 through N506 to rotate the exposure cylinder by the desired number (Cx times to perform the exposing operation so as to copy the images of the first document by the Cx sheets, so that they are accommodated in the intermediate tray 113.

At N507, the nth document is carried to the bypass route 80 through the opening operation of the gate flappers 81, 82 to be returned from the side of the bottommost face of the document of the document hopper 2". At N508, the number of the copies is inputted again into the copy-number counter $CN_1$.

Then, at N509, 1 is added into a condition counter n. At N510, it is watched whether or not the document has completed one rotation to return to the N502 when the document X is not rotated by one. When the document X has completed one rotation, 1 is inputted again into the condition counter n at N511 to advance to N512.

At N512, the first document $X_1$ is again wound on the first exposure cylinder 20. Then, at N513, the copy sheet Y whose single face is already copied is taken out form the bottommost face from the intermediate tray 113 to feed so that the non-image face may be exhibited on the photosensitive member 101. At the same time, the nth document wound on the first exposure cylinder 20 as exposed to copy the images formed by the copy process portion on the copy sheet Y feed through the operation of the copy process portion. At N514, the copy sheet Y copied already at N513 is discharged into the sorter.

At N515, "1" is subtracted from the counter CN, and it is watched at N516 whether or not the copying operation of the nth document of the desired number of sheets has been completed.

After the copying operation of the nth document is completed by the desired number, the step advances to N517. At N517, the gate flappers 81, 82 are opened again, the nth document hopper 2" through the bypass route 80. At N518, the number of the copy sheets Cx is again inputted into the counter CN to add 1 to the condition counter n at N519.

At N520, one rotation of the document X is watched. In the case of NO, the step returns to N512 to continue the feeding operation from the intermediate tray 113. When the document X makes one rotation, YES is provided at N520. At N521, the various processes are effected for the completion of the copying operation to return again to FIG. 11(II) so as to wait for the next copying process.

The copy sheet Y which is discharged for the sorter 400 at the N514, is accommodated one after another into the respective bins 40a through 401n of the sorter 400. When the CN becomes 0 at the N516, the sheets start to be accommodated again from the first bin of the sorter.

FIG. 55 is an operation pattern view of the ADF mode of the face up, showing a series of operations of the ADF mode of performing the duplex copying operation by the use of the sorter with the duplex document X set up in the document hopper 2" with the face being upward. The ADF mode will be described hereinafter with reference to FIG. 55.

In FIG. 55(I), two duplex documents X are set up with the face being upward with respect to the document hopper 2".

In FIG. 55(II), the document on the side of the topmost face of the manuscript hopper 2" is fed by one, is inverted by one time in accordance with the carrying route to be wound on the first document cylinder 20, so that the first page is exposed by the same Cx time (twice in the illustration) as the set number of copies. The copy sheet Y starts to be fed with respect to the photosensitive member drum 101 from the sheet-feeding cassette 106. After the images of the first page have been copied, the advancing direction is inverted by the switch back 112 to accommodate the copy sheet Y with the image faces on it into the intermediate tray 113. The second copy sheet $Y_2$ is likewise accommodated in the intermediate tray 113.

In FIG. 55(III), the document $X_1$ already exposed in FIG. 55(II) is separated from the document cylinder 20 and is passed into the bypass route 80 so as to return to the document hopper 2" from the side of the bottommost face of the document in the orientation inverted from the direction set up in FIG. 55(I). The second document $X_2$ is taken out from the document hopper 2" to be wound up on the first document cylinder 20 as in FIG. 55(II) to expose the third page by the set number of the copies Cx. namely, the first document cylinder 20 is rotated by Cx times for the copying operation. The copy sheets $Y_3$, $Y_4$ are also accommodated in the intermediate tray 113 in the same manner as in FIG. 55(II). The document $X_2$ which has completed exposing the set number of sheets is returned to the document hopper 2" as the above-described document $X_1$ is.

In FIG. 55(IV), the document $X_1$ which is inverted from the original orientation is taken out from the document hopper 2" and is wound on the first exposure cylinder 20 as described hereinabove so as to expose the second page by the Cx time. The copy sheet $Y_1$ on the side of the bottommost face, which is accommodated in the intermediate tray 113, is inverted and fed so that the non-image face thereof may be exhibited on the photosensitive member drum 101. After the second-page images are copied, the copy sheet $Y_1$ is fed without being inverted in the route 111 and is accommodated in the first bin 40a of the sorter 400. Then, the copy sheet $Y_2$ reaches the route 111 as the copy sheet $Y_1$ does, and is accommodated in the next bin 401b in the sorter 400. On the other hand, the document $X_1$ passes through the bypass 80 and is returned from the side of the bottommost face of the document X into the document hopper 2" in the same direction as the orientation of the document X set up in FIG. 55(I).

In FIG. 55(V), the fourth page of the document $X_2$ is copied in the same manner as in FIG. 55(IV) to copy the images of the fourth page on the copy sheets $Y_3$, $Y_4$ to be accommodated into the bins 40a, 401b of the sorter.

FIG. 55(VI) is a view showing the completion of the operation in FIG. 55(V). The document X is returned to the orientation at the set up of the document and the page order thereof. The copy sheets Y, which have images corresponding to the document X formed, are accommodated one by one into the bins 40a, 401b of the sorter 400.

The ADF mode may be used to increase the total JOB speed by the joint use of the RDH as described hereinabove.

The ADF mode shown in the above-described FIGS. 54 and 55 may be used, likewise, by the engagement of the sorter 400 even in the second embodiment.

Also, when a book or a document too thin to be carried by the RDH is used, or a plurality of duplicates are required to be provided from the too thick document, the multiple copies may be used with a book or the like being set up in the third exposure portion, and the sorter may be used.

As is clear from the foregoing description, according to the arrangement of the present invention, in a circulating type of automatic document feeding apparatus comprising a document hopper which is adapted to take out the top document from the hopper or take it out from the bottom to return it onto the topmost side, a first carrying means for carrying the document from the document hopper to a first exposure portion, a document presentation portion having the first exposure portion and the second exposure portion, a second carrying means which is equipped with an inside and outside inverting means for inverting the carrying direction of the document between the first exposure portion and the second exposure portion, a third carrying means for returning the document to the document hopper from the second exposure portion, one face of the duplex document may be exposed in the first exposure portion to continuously expose the other face thereof in the second exposure portion, so that the copying operation of the duplex document may be effected at higher speeds and furthermore with considerably reduced operations on the part of the operator. Also, various advantages are provided in that a plurality of documents in the sequential page order may be returned into the document hopper in the arranged order. Furthermore, a case where the continuous exposing operation is effected by both the first exposure portion and the second exposure or a case where only the one face of the document is exposed in one exposure portion may be selected. The various copying modes of duplex copying from the duplex document to the copy sheet, simplex copying from the duplex document, duplex copying from the simplex document, and simplex copying from the simplex document may be efficiently effected with simpler switching operations through the simpler construction. Especially when the duplex copying operation is effected from the duplex document, labor and time is reduced.

Also, the first mode in which the second face is copied after all the first faces of the respective document have been copied with respect to a plurality of documents set up in the document hopper, and the second mode in which the first face and the second face are sequentially copied with respect to each document may be switched to each other. In the mode for effecting the second-face copying operation after having copied all the first faces of each document with respect to a plurality of documents set up in the document hopper, the order of the documents on the document hopper remains unchanged when one circulation of the document has been completed. In the conventional apparatus, the complicated page inside and outside arranging operation was required when the document jam was caused. However, in the present apparatus, the problem may be avoided.

In the document presentation portion of the circulating type of automatic document feeding apparatus, the first exposure portion and the second exposure portions are provided downwardly in the vertical direction on the same plane with two cylinders being provided in parallel. The effects are as follows.

(1) A switching gate for switching the simplex document and the duplex document, and a carrying route may be removed.

(2) A switching operation between the exposure portion may be effected only by the movement of the scanner (the exposure lamp 150 and the first mirror 151A integrated).

(3) As a retaining mechanism for passing the exposure portion through the rotation with the documents being wound with respect to these cylinders, various proper mechanisms such as a mechanism for carrying the document with respect to the carrying roller disposed on the outer periphery through the rotation of the cylinder itself, a mechanism for carrying the document through the rotation of the carrying roller with the cylinder being fixed, an electrostatic adhering mechanism or the like may be adopted.

(4) The switching operation between a face-up specification and a face-down specification may be effected in accordance with the specification of the copying apparatus itself.

An inside and outside inverting route and an inverting roller, which are adapted to invert the document between the first exposure portion and the second exposure, are provided on the second carrying means of the circulating type of automatic document feeding apparatus, a mechanism which can select the carrying passage of the document passage the first exposure portion between the inverting route and the route for passing the first exposure portion again through the rotation along the outer periphery of the first cylinder, and a mechanism which can select the carrying passage of the document passing the first exposure portion between the discharging route and the route for carrying it to the second exposure portion again through the rotation along the second cylinder outer periphery are provided, so that the necessary plurality of sheets may be continuously copied with the same-face exposure of the document as the given number.

The higher copy speed may be effected when the bypass route, together with the inverting route, for carrying the document from the first exposure portion to the second exposure portion without the inverting operation of the document is disposed on the second carrying means, when the single faces of a plurality of duplex documents are exposed in the first exposure portion, thereafter the other faces thereof are exposed in the second exposure by the use of the bypass route, and when the simplex documents are copied.

As the duplex copying apparatus provide with the above-described circulating type of automatic document feeding apparatus is adapted to carry the copy sheet in synchronization with the carrying operation of the document of the circulating type of automatic document feeding apparatus, the four types of copying operations described above may be effected. Also, the size may be made smaller through the simpler construction, thus resulting in the considerable decrease in the cost.

As the above-described controlling apparatus is provided on the duplex copying apparatus equipped with the circulating type of automatic document feeding apparatus, the switching operation may be effected through simpler operation by the operator, so that the operation load on the operator may be reduced, the copy time may be shortened, and the accuracy may be improved.

Various switching means, which are switched by the operation of the selection switches, are provided on the above-described controlling apparatus. A copying mode for copying one face of the document in the first exposure portion and thereafter the other face thereof in the second exposure portion, and a copying mode for copying the single faces of all the documents in the first exposure and thereafter the other faces thereof in the second second exposure portion may be selected between them in the case of the switching between the face up specification and the face down specification, the duplex copying operation from the duplex document and the simplex copying operation from the duplex document. The copying machine may be used with various advantages in accordance with characteristics, etc. of the functions of the machine main body.

Also, when the third exposure portion has been provided on the duplex copying machine main body, the document which can not be fed to the circulating type of automatic document feeding apparatus, such as a book, a sheet or the like may be copied.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A circulating type of automatic document feed, comprising:
   document hopper means for supporting a plurality of documents thereon,
   document feeding means for feeding the documents from said document hopper means;
   document presentation means responsive to said document feeding means for exposing light to the documents, said document presentation means having at least two light-exposure portions placed substantially in a plane; and
   document returning means responsive to said document presentation means for returning the documents to said document hopper means.

2. The feeder of claim 1, wherein said light-exposure portions are placed side-by-side.

3. A circulating type of automatic document feeding apparatus for automatically circulating and carrying a plurality of documents, comprising:
   a document hopper for receiving documents of the sequential order of pages, which are upward in face;
   sheet-feeding means for feeding the documents from the topmost side one by one from the document hopper;
   document presentation means, which is located away from the document hopper, having a first presentation portion and a second presentation portion each having the document presented respectively to a first exposure portion and a second exposure portion, wherein the respective documents of the first presentation portion and the second presentation portion are exposed, said first and second exposure portions being provided in approximately the same plane; and
   in nearby position, a first carrying means for carrying the documents from the hopper to the first presentation portion and a second carrying means located between the first presentation portion and the second presentation portion which includes a document inverting means for inverting the document presentation face; and
   a third carrying means for returning the documents to the bottommost side from the second presentation portion to the document hopper.

4. A circulating type of automatic document feeding apparatus for automatically circulating and carrying a plurality of documents, comprising:
   a document hopper for receiving documents of the sequential order of pages, which are upward in face;
   sheet-feeding means for feeding the documents from the bottommost side one by one from the document hopper;
   document presentation means, which is located away from the document hopper, having a first presentation portion and a second presentation portion each having the documents presented respectively to a first exposure portion and a second exposure portion, wherein the respective presentation portion are exposed, said first and second exposure portions being provided in approximately the same plane; and
   in nearby position, a first carrying means for carrying the documents from the hopper to the first presentation portion and a second carrying means located between the first presentation portion and the second presentation portion which includes a document inverting means for inverting the document presentation face; and a third carrying means for returning the documents onto the topmost side when the documents are fed from the bottom side.

5. A circulating type of automatic document feeding apparatus for automatically circulating and carrying a plurality of documents, comprising:

a document hopper for receiving documents of the sequential order of pages, which are downward in face;

sheet-feeding means for feeding the documents from the topmost side one by one from the document hopper;

document presentation means, which is located away from the document hopper, having a first presentation portion and a second presentation portion each having the documents presented respectively to a first exposure portion and a second exposure portion, wherein the respective documents of the first presentation portion and the second presentation portion are exposed, said first and second exposure portions being provided in approximately the same plane; and in nearby position, a first carrying means for carrying the documents from the hopper to the first presentation portion and a second carrying means located between the first presentation portion and the second presentation portion which includes a document inverting means for inverting the document presentation face; and a third carrying means for returning the document to the bottommost side from the second presentation portion to the document hopper.

6. A circulating type of automatic document feeding apparatus for automatically circulating and carrying a plurality of documents, comprising:

a document hopper for receiving documents of the sequential order of pages, which are downward in face;

sheet-feeding means for feeding the documents from the topmost side or the bottommost side one by one from the document hopper;

document presentation means, which is located away from the document hopper, having a first presentation documents presented respectively to a first exposure portion and a second exposure portion, wherein the respective documents of first presentation portion and the second presentation portion are exposed, said first and second exposure portions being provided in approximately the same plane; and in nearby position, a first carrying means for carrying the documents from the hopper to the first presentation portion and a second carrying means located between the first presentation portion and the second presentation portion which includes a document inverting means for inverting the document presentation face; and a third carrying means for returning the documents onto the topmost side when the documents are feed from the bottom side.

7. A circulating type of automatic document feeding apparatus described in claim 3, 4, 5 or 6, wherein the first presentation portion and the second presentation portion of the document presentation means are composed of two first and second cylinders arranged in parallel, the first exposure portion and the second exposure portion are respectively formed downwardly of the respective cylinders, the respective cylinders themselves are rotated and carrying rollers disposed on the outer periphery of each cylinder are rotated to wind the fed documents around the cylinders to carry them to the exposure portions.

8. The feed of claim 7, further comprising attraction means for attracting documents to said cylinder means, said attraction means comprising charge supply means and charge removing means.

9. The feeder of claim 3, 4, 5 or 6, further comprising still paper guide means instead of the rotative cylinder means.

10. The feeder of claim 8, wherein said attraction means comprises plus-voltage supply means and minus-voltage supply means.

11. A circulating type of automatic document feeding apparatus described in claim 7 wherein the inverting means of the second carrying means is provided with an inside and outside inverting route composed of a first route which is branched from the document carrying passage of the outer periphery of the first cylinder after having passed the first exposure portion so as to extend;

a second route which is branched from the document carrying passage of the outer periphery of the second cylinder before passing the second exposure portion so as to extend;

a third route having the two branch routes merged, normal and reverse carrying means provided in said carried from the first route by the reverse carrying means is inverted to carry the document to the second route so as to make it possible to expose in the second exposure portion the other face opposite to the one face of the document exposed in the first exposure portion; and carrying route selecting means respectively provided at a branch point between the first route and the carrying passage on the outer periphery of the first cylinder, and at a branch point between the document carrying passage on the outer periphery of the second cylinder after having passed the second exposure portion and the carrying passage of the third carrying passage means, to make it possible to select the exposing operations of the same face of the document in each exposure portion may be selected.

12. A circulating type of automatic document feeding apparatus described in claim 11 wherein a bypass route for carrying the document without passing the inside and outside inversion route from the first exposure portion to the document hopper is provided on the second carrying means.

13. An electrophotographic copying machine including a circulating type of automatic document feeder, comprising:

document hopper means for supporting a plurality of documents thereon;

document feeding means for feeding the documents from said document hopper means;

document presentation means responsive to said document feeding means for exposing light to the documents, said document presentation means having at least two light-exposure portions placed substantially in a plane; and document returning means responsive to said document presentation means for returning the documents to said document hopper means.

14. The machine of claim 13, wherein said light-exposure portions are placed side-by-side.

15. A duplex copying apparatus provided with a circulating type of automatic document feeding apparatus comprising:

a circulating type of automatic document feeding apparatus provided with a document hopper for receiving the documents in the sequential page order, sheet feeding means for feeding the documents one by one from the document hopper, document presentation means which is located away respectively from the document hopper having a first presentation portion and a second presentation portion for exhibiting the documents, a first carrying means for carrying the documents from the hopper to the first presentation portion, a second carrying means which is located between the first presentation portion and the second presentation portion and includes a document inverting means for inverting the document presentation face, a third carrying means for carrying the documents from the second presentation portion to the document hopper engaged with the duplex copying machine main body, an optical system having a light source or the like which is selectively moved into the first exposure portion and the second exposure of the circulating type of automatic document feeding apparatus, a copy sheet accommodating portion, a copy sheet feeding means for feeding sheets one by one from the copy sheet accommodating portion, copy process processing means arranged on the periphery of a photosensitive member, discharge carrying means for discharging onto the tray a copy sheet with an image copied thereon by the copy process processing means copy sheet circulation means which is branched from the discharge carrying means for carrying the copy sheets to circulate the copy sheets to the copy process processing means again after the copy sheets have been accommodated on an intermediate tray, copy sheet inverting means which is provided as part of the copy sheet circulation carrying means which inverts the carrying direction of the copy sheet to exhibit the other face of the copy sheet having images copied on its one face when the document is exhibited again at the copy process step, carrying passage selecting means for selecting whether or not a copy sheet should circulate to the copy sheet circulation carrying means.

16. A duplex copying apparatus provided with a circulating type of automatic document feeding apparatus described in claim 15, wherein a controlling apparatus is provided which receives key input signals corresponding to the copying contents of the operation and also detection signals from a document detection sensor provided in a desired position of the circulating type of automatic document feeding apparatus and the duplex copying machine to select the carrying route of the document and the carrying route of the copy sheet so as to control carrying, driving means of respective documents, and copy sheets;

the controlling apparatus has copying modes which includes copying operation from a duplex document to both faces of the copy sheet, simplex copying from a duplex document, duplex copying from a simplex document, simplex copying from a simplex document or the like and is adapted to selectively operate any of the copying modes.

17. A duplex copying apparatus provided with a circulating type of automatic document feeding apparatus described in claim 16, wherein the controlling apparatus is provided with switching means for selecting the copying mode in accordance with the construction of the circulating type of automatic document feeding apparatus, or in accordance with a case where the document is accommodated with the face being upward within the document hopper, and a case where the document is accommodated with the face being downward.

18. A duplex copying apparatus provided with a circulating type of automatic document feeding apparatus described in claim 16, wherein a switching means for the copying mode composed of a selection switch or the like is provided on the controlling apparatus, when the duplex copying operation is effected from the duplex document, a copying mode in which copy sheets accommodated in the intermediate tray are circulated again to the copying process means after the one face of each document has been copied on one face of the copying sheet in the first exposure portion so as to copy the other face of each document on the other face of the copy sheet in the second exposure portion, and a copying mode in which after the document has been copied from one face of each sheet on one face of the copy sheet in the first exposure portion, the document is inverted to copy the other face on the other face of the copy sheet in the second exposure portion, the step is sequentially performed for each document sheet, may be selected.

19. A duplex copying apparatus provided with a circulating type of automatic document feeding apparatus described in claim 16, wherein a switching means such as selection switch or the like for the copying mode is provided on the controlling apparatus, when the simplex copying operation is effected from the duplex document, a first copying mode in which these copying sheets are accommodated in the intermediate tray after the one face of the whole document has been copied on the copy sheet in the first exposure portion, then the other face of the whole document is copied on the copy sheet in the second exposure portion alternately with the discharging operation of the copy sheet accommodated in the intermediate tray to discharge the copy sheet with the document being copied thereon in the sequential order of the pages to the offset tray, and a second copying mode in which a first step of discharging the copy sheet after the documents have been copied from each first face on face of a copy sheet, in the first exposure portion, a second step of inverting the document to carrying the other face to the second exposure portion to copy the other face on the following sheet being carried to discharge it sequentially effected for each document, may be selected.

20. A duplex copying apparatus provided with a circulating type of automatic document feeding apparatus in accordance with claim 15, further comprising a duplex copying machine main body having a third exposure portion for exposing the document which is provided separately from the circulating type of automatic document feeding apparatus, and has an optical system provided with a light source which may be selectively moved for arrangement to the first exposure portion, the second exposure portion and the third exposure portion of the circulating type of automatic document feeding apparatus.

21. A circulating type of automatic document feeder, comprising:
   a plate for supporting a plurality of documents;
   a feeder for feeding the document from said plate;
   first and second light-exposure stations responsive to said feeder for exposing light to the documents, said first and second light-exposure stations being placed substantially in a plane; and
   a guide responsive to said first and second light-exposure stations for guiding the document to said plate.

22. An electrophotographic copying machine including a circulating type of automatic document feeder, comprising:
   a plate for supporting a plurality of documents;
   a feeder for feeding the documents from said plate;
   first and second light-exposure stations responsive to said feeder for exposing light to the documents, said first and second light-exposure stations being placed substantially in a plane; and
   a guide responsive to said first and second light-exposure stations for guiding the documents to said plate.

* * * * *